United States Patent
Xiao et al.

(10) Patent No.: US 12,483,604 B2
(45) Date of Patent: Nov. 25, 2025

(54) COMMUNICATION METHOD AND APPARATUS, DEVICE, SYSTEM, CHIP AND STORAGE MEDIUM

(71) Applicant: CHINA SATELLITE NETWORK EXPLORATION CO., LTD., Chongqing (CN)

(72) Inventors: Hong Xiao, Chongqing (CN); Hao Wu, Chongqing (CN)

(73) Assignee: CHINA SATELLITE NETWORK EXPLORATION CO., LTD., Chongqing (CN)

( * ) Notice: Subject to any disclaimer, the term of this patent is extended or adjusted under 35 U.S.C. 154(b) by 0 days.

(21) Appl. No.: 19/245,479

(22) Filed: Jun. 23, 2025

(65) Prior Publication Data

US 2025/0323956 A1    Oct. 16, 2025

Related U.S. Application Data

(63) Continuation of application No. PCT/CN2024/129673, filed on Nov. 4, 2024.

(30) Foreign Application Priority Data

Mar. 22, 2024    (CN) .......................... 202410341259.6

(51) Int. Cl.
*H04L 65/1016*    (2022.01)
*H04W 28/02*    (2009.01)
(Continued)

(52) U.S. Cl.
CPC ..... *H04L 65/1016* (2013.01); *H04W 28/0268* (2013.01); *H04W 64/00* (2013.01); *H04W 84/06* (2013.01)

(58) Field of Classification Search
CPC ......... H04W 4/90; H04W 76/50; H04W 4/18; H04W 80/10; H04W 12/08;
(Continued)

(56) References Cited

U.S. PATENT DOCUMENTS

| | | | | |
|---|---|---|---|---|
| 11,140,581 B2* | 10/2021 | Oyman | ................. | H04W 28/22 |
| 2019/0037518 A1* | 1/2019 | Russell | ............... | H04L 65/1016 |
| 2020/0220905 A1* | 7/2020 | Park | ................ | H04W 36/00226 |
| 2022/0046478 A1* | 2/2022 | Oyman | ................. | H04W 28/22 |

(Continued)

FOREIGN PATENT DOCUMENTS

| CN | 112543172 A | 3/2021 |
|---|---|---|
| CN | 115842578 A | 3/2023 |

(Continued)

OTHER PUBLICATIONS

International Search Report (PCT/ISA/210) and Written Opinion (PCT/ISA/237) with machine translation mailed on Feb. 8, 2025, by the China National Intellectual Property Administration (ISA/CN) as the International Searching Authority for International Application No. PCT/CN2024/129673. (16 pages).

*Primary Examiner* — Joseph Arevalo
(74) *Attorney, Agent, or Firm* — .Buchanan Ingersoll & Rooney PC

(57) ABSTRACT

The present disclosure provides a communication method and apparatus, a device, a system, and a chip. The method includes: a first network element determining whether a first terminal and a second terminal are connected to the same satellite when the first terminal requests to perform an IMS call with the second terminal. The satellite hosts a first UPF. The first network element transmits an indication message to a second network element upon determining that the first terminal and the second terminal are connected to the same satellite. The indication message is used to indicate that a condition for the first terminal and the second terminal to perform the IMS call via the satellite is met. As a result, the second network element can easily determine through the (Continued)

indication message that the condition for the first terminal and the second terminal to perform the IMS call via the satellite is met.

15 Claims, 25 Drawing Sheets

(51) Int. Cl.
*H04W 64/00* (2009.01)
*H04W 84/06* (2009.01)

(58) Field of Classification Search
CPC ... H04W 36/00226; H04W 4/02; H04W 4/14; H04W 4/20; H04W 64/00; H04W 76/16; H04W 8/06; H04W 88/16
USPC ................................ 370/352, 259, 260, 401
See application file for complete search history.

(56) References Cited

U.S. PATENT DOCUMENTS

| | | | |
|---|---|---|---|
| 2022/0264278 A1* | 8/2022 | Edge | H04B 7/18547 |
| 2022/0330104 A1* | 10/2022 | Lee | H04L 65/1016 |
| 2023/0121634 A1* | 4/2023 | Shrestha | H04B 7/18513 |
| | | | 455/427 |
| 2023/0180074 A1* | 6/2023 | Ma | H04W 76/20 |
| | | | 370/331 |
| 2023/0199911 A1* | 6/2023 | Jung | H04W 8/186 |
| | | | 370/329 |
| 2025/0016858 A1* | 1/2025 | Yuan | H04W 76/14 |
| 2025/0081066 A1* | 3/2025 | Khoshkholgh Dashtaki | ............. |
| | | | H04W 36/083 |

FOREIGN PATENT DOCUMENTS

| | | |
|---|---|---|
| CN | 115915072 A | 4/2023 |
| CN | 116250360 A | 6/2023 |

* cited by examiner

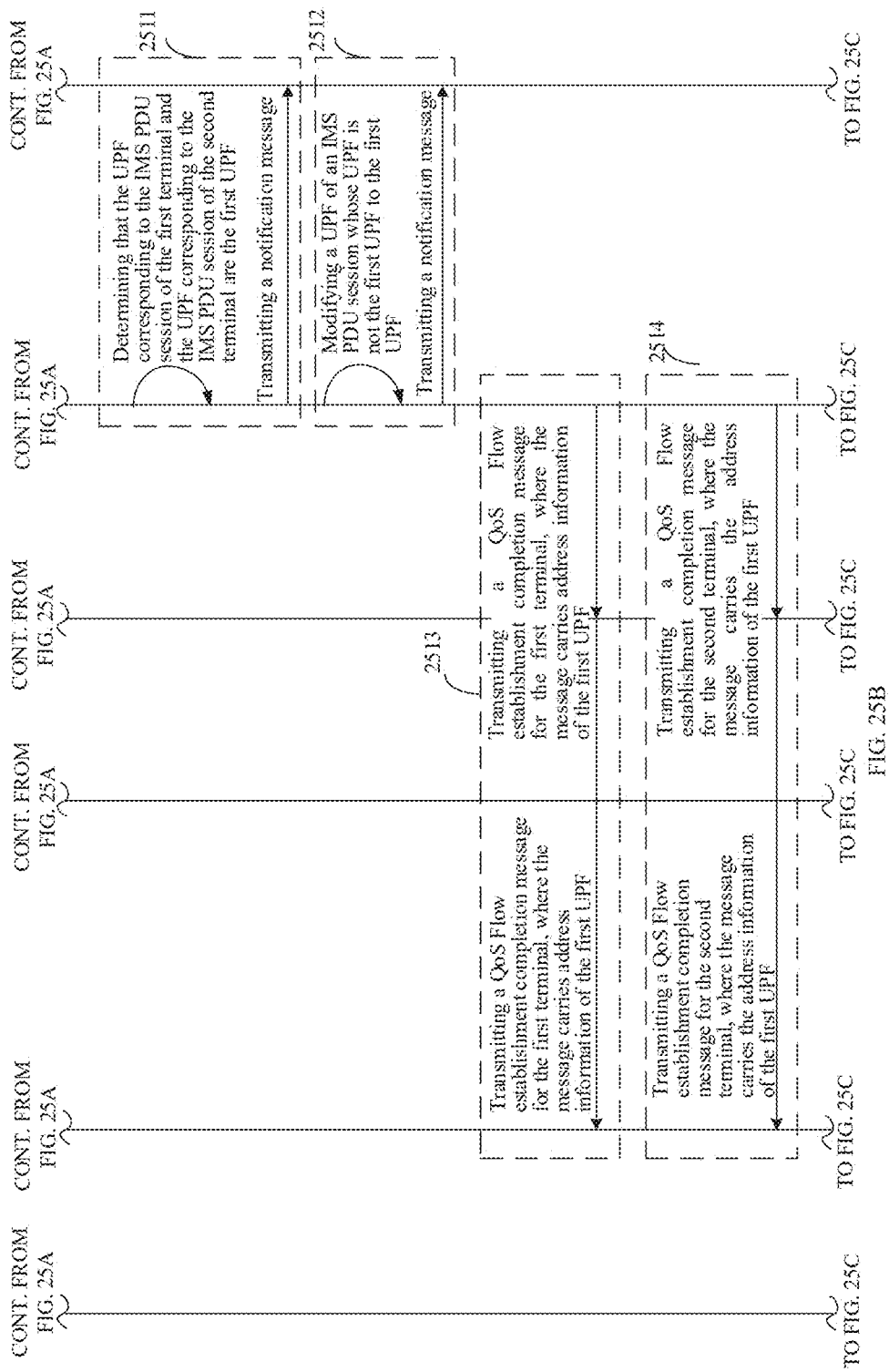

COMMUNICATION METHOD AND APPARATUS, DEVICE, SYSTEM, CHIP AND STORAGE MEDIUM

CROSS-REFERENCE TO RELATED APPLICATIONS

This application is a continuation of International Application No. PCT/CN2024/129673, filed on Nov. 4, 2024, which claims priority to Chinese Patent Application No. 202410341259.6, entitled "COMMUNICATION METHOD AND APPARATUS. DEVICE. SYSTEM. CHIP AND STORAGE MEDIUM", filed with the China National Intellectual Property Administration on Mar. 22, 2024, which is hereby incorporated by reference in its entirety.

TECHNICAL FIELD

The present disclosure relates to the field of satellite communication technologies, more particularly, to a communication method and apparatus, a device, a system, a chip, and a storage medium.

BACKGROUND

At present, after the introduction of the Internet protocol multimedia subsystem (Internet Protocol Multimedia Subsystem, IMS) call into a satellite communication network, when a first terminal and a second terminal perform an IMS call, a transmission path of media plane data is usually as follows: the first terminal→a satellite→a ground user plane function (User Plane Function, UPF)→a calling session border controller (Session Border Controller, SBC)→a called SBC→a ground UPF→a satellite→the second terminal. However, the transmission path corresponding to the IMS call between the first terminal and the second terminal is relatively long, resulting in the low call efficiency between the first terminal and the second terminal when the IMS call is performed over the satellite communication network.

SUMMARY

Embodiments of the present disclosure provide a communication method and apparatus, a device, a system, a chip, and a storage medium to solve the technical problem of low call efficiency between a first terminal and a second terminal when an IMS call is performed over a satellite communication network.

In a first aspect, an embodiment of the present disclosure provides a communication method applied in a first network element, and the method includes: receiving a first session invitation request from a first terminal, where the first session invitation request is used to request to perform an Internet protocol multimedia subsystem (IMS) call with a second terminal; determining whether the first terminal and the second terminal are connected to the same satellite, where the satellite hosts a first user plane function (UPF); upon determining that the first terminal and the second terminal are connected to the same satellite, transmitting an indication message to a second network element, where the indication message is used to indicate that a condition for the first terminal and the second terminal to perform the IMS call via the satellite is met.

In a second aspect, an embodiment of the present disclosure provides a communication method applied in a second network element, and the method includes: receiving an indication message transmitted by a first network element, where the indication message is used to indicate that a condition for a first terminal and a second terminal to perform an IMS call via a satellite is met, where the satellite hosts a first user plane function (UPF), and the indication message is transmitted by the first network element after determining that the first terminal and the second terminal are connected to the same satellite; transmitting the indication message to a third network element.

In a third aspect, an embodiment of the present disclosure provides a communication method applied in a third network element, and the method includes: receiving an indication message transmitted by a second network element, where the indication message is used to indicate that a condition for a first terminal and a second terminal to perform an IMS call via a satellite is met, where the satellite hosts a first user plane function (UPF); transmitting a notification message to the first UPF, where the notification message is used to inform the first UPF that the first terminal and the second terminal will perform the IMS call via the first UPF.

In a fourth aspect, an embodiment of the present disclosure provides a communication method is applied to a first terminal, and the method includes: transmitting a first session invitation request to a first network element, where the first session invitation request is used to request to perform an Internet protocol multimedia subsystem (IMS) call with a second terminal; receiving a response message transmitted by the first network element for the first session invitation request, where the response message carries address information of a first user plane function (UPF) on a satellite, and the response message is transmitted by the first network element after determining that the first terminal and the second terminal are connected to the same satellite; performing the IMS call based on the address information of the first UPF.

In a fifth aspect, an embodiment of the present disclosure provides a communication method applied to a second terminal, and the method includes: receiving a second session invitation request transmitted by a first network element, where the second session invitation request indicates that a first terminal requests to perform an IMS call with the second terminal; transmitting a response message for the second session invitation request to the first network element; receiving a session update message transmitted by the first network element, where the session update message includes address information of a first user plane function (UPF) on a satellite, where the first terminal and the second terminal are connected to the same satellite; performing the IMS call based on the address information of the first UPF.

In a sixth aspect, an embodiment of the present disclosure provides a communication method applied to a first user plane function (UPF) on a satellite, and the method includes: receiving a notification message transmitted by a third network element, where the notification message is used to inform the first UPF that a first terminal and a second terminal will perform an IMS call via the first UPF; receiving media plane data during the IMS call from the first terminal and forwarding the media plane data to the second terminal; or receiving media plane data during the IMS call from the second terminal and forwarding the media plane data to the first terminal.

In a seventh aspect, an embodiment of the present disclosure provides a communication apparatus applied in a first network element, and the apparatus includes: a receiving module, configured to receive a first session invitation request from a first terminal, where the first session invitation request is used to request to perform an Internet protocol multimedia subsystem (IMS) call with a second terminal; a determining module, configured to determine whether the first terminal and the second terminal are connected to the same satellite, where the satellite hosts a first user plane function (UPF); a transmitting module, configured to transmit an indication message to a second network element upon determining that the first terminal and the second terminal are connected to the same satellite, where the indication message is used to indicate that a condition for the first terminal and the second terminal to perform the IMS call via the satellite is met.

In an eighth aspect, an embodiment of the present disclosure provides a communication apparatus applied in a second network element, and the communication apparatus includes: a receiving module, configured to receive an indication message transmitted by a first network element, where the indication message is used to indicate that a condition for a first terminal and a second terminal to perform an IMS call via a satellite is met, where the satellite hosts a first user plane function (UPF); a transmitting module, configured to transmit the indication message to a third network element.

In a ninth aspect, an embodiment of the present disclosure provides a communication apparatus applied in a third network element, and the communication apparatus includes: a receiving module, configured to receive an indication message transmitted by a second network element, where the indication message is used to indicate that a condition for a first terminal and a second terminal to perform an IMS call via a satellite is met, where the satellite hosts a first user plane function (UPF); a transmitting module, configured to transmit a notification message to the first UPF, where the notification message is used to inform the first UPF that the first terminal and the second terminal will perform the IMS call via the first UPF.

In a tenth aspect, an embodiment of the present disclosure provides a communication apparatus applied in a first terminal, and the apparatus includes: a transmitting module, configured to transmit a first session invitation request to a first network element, where the first session invitation request is used to request to perform an Internet protocol multimedia subsystem (IMS) call with a second terminal; a receiving module, configured to receive a response message transmitted by the first network element for the first session invitation request, where the response message carries address information of a first user plane function (UPF) on a satellite, and the response message is transmitted by the first network element after determining that the first terminal and the second terminal are connected to the same satellite; an IMS call module, configured to perform the IMS call based on the address information of the first UPF.

In an eleventh aspect, an embodiment of the present disclosure provides a communication apparatus applied in a second terminal, and the apparatus includes: a first receiving module, configured to receive a second session invitation request transmitted by a first network element, where the second session invitation request indicates that a first terminal requests to perform an IMS call with the second terminal; a first transmitting module, configured to transmit a response message for the second session invitation request to the first network element; a second receiving module, configured to receive a session update message transmitted by the first network element, where the session update message carries address information of a first user plane function (UPF) on a satellite, where the session update message is transmitted by the first network element after determining that the first terminal and the second terminal are connected to the same satellite; an IMS call module, configured to perform the IMS call based on the address information of the first UPF.

In a twelfth aspect, an embodiment of the present disclosure provides a communication apparatus applied in a first user plane function (UPF) on a satellite, and the apparatus includes: a first receiving module, configured to receive a notification message transmitted by a third network element, where the notification message is used to inform the first UPF that a first terminal and a second terminal will perform an IMS call via the first UPF; a second receiving module, configured to receive media plane data during the IMS call from the first terminal and forward the media plane data to the second terminal; or receive media plane data during the IMS call from the second terminal and forward the media plane data to the first terminal.

In a thirteenth aspect, an embodiment of the present disclosure provides a communication device which includes a memory, a processor and a computer program stored on the memory and executable on the processor. The processor executes the computer program to implement the communication method disclosed in the embodiments of the present disclosure.

In a fourteenth aspect, an embodiment of the present disclosure provides a communication system which includes a first terminal, a second terminal, a first user plane function (UPF) on a satellite, a first network element, a second network element, and a third network element. The first network element is configured to implement the method disclosed in the first aspect of the embodiments of the present disclosure. The second network element is configured to implement the method disclosed in the second aspect of the embodiments of the present disclosure. The third network element is configured to implement the method disclosed in the third aspect of the embodiments of the present disclosure. The first terminal is configured to implement the method disclosed in the fourth aspect of the embodiments of the present disclosure. The second terminal is configured to implement the method disclosed in the fifth aspect of the embodiments of the present disclosure. The first UPF is configured to implement the method disclosed in the sixth aspect of the embodiments of the present disclosure.

In a fifteenth aspect, an embodiment of the present disclosure provides a chip which includes one or more interface circuits and one or more processors. The interface circuit is configured to receive a signal from a memory of a communication device and transmit the received signal to the processor. The received signal includes computer instructions stored in the memory, so that the communication device implements the method disclosed in the embodiments of the present disclosure when the processor executes the computer instructions.

In a sixteenth aspect, an embodiment of the present disclosure provides a computer-readable storage medium storing with computer execution instructions. When the computer program is executed by a processor, the communication method disclosed in the embodiments of the present disclosure is implemented.

In a seventeenth aspect, an embodiment of the present disclosure provides a computer program product. When instructions in the computer program product are executed by a processor, the communication method disclosed in the embodiments of the present disclosure is implemented.

The technical solution provided by the embodiments of the present disclosure brings at least the following beneficial effects.

Whether a first terminal and a second terminal are connected to the same satellite is determined when the first terminal requests to perform an IMS call with the second terminal. When it is determined that the first terminal and the second terminal are connected to the same satellite, an indication message is transmitted to a second network element. The indication message is used to indicate that a condition for the first terminal and the second terminal to perform the IMS call via the satellite is met. As a result, the second network element can easily determine through the indication message that the condition for the first terminal and the second terminal to perform the IMS call via the satellite is met, enabling the first terminal and the second terminal to directly perform the IMS call via the satellite. This reduces the transmission delay of the IMS call between the first terminal and the second terminal over a satellite communication network, and improves the communication efficiency between the two terminals.

The additional aspects and advantages of the present disclosure will be partially presented in the following description, some of which will become apparent from the following description, or learned through practice of the present disclosure.

BRIEF DESCRIPTION OF DRAWINGS

The above and/or an additional aspect and advantages of the present disclosure will become apparent and easily understood from the following description of the embodiments in conjunction with the accompanying drawings, where:

FIG. 25A-FIG. 25C are combined to form a schematic flowchart II of interactions among a first terminal, a second terminal, a P-CSCF network element, a PCF network element, an SMF network element, and a first UPF on a satellite.

DESCRIPTION OF EMBODIMENTS

Figure 1:
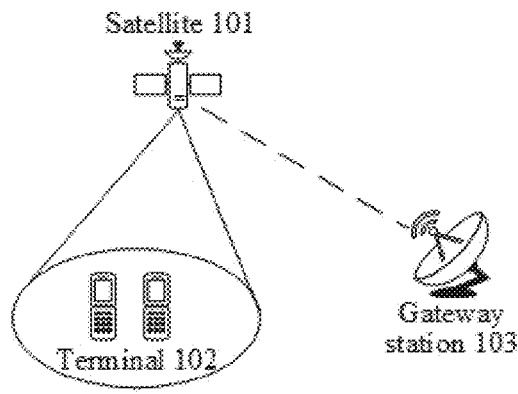
FIG. 1 is a schematic diagram of an architecture of a satellite communication system provided in an embodiment of the present disclosure.

In the following, a detailed description of embodiments of the present disclosure will be provided. Examples of the embodiments are shown in the accompanying drawings, where identical or similar reference numerals from beginning to end represent identical or similar elements or elements with identical or similar functions. The embodiments described below with reference to the accompanying drawings are exemplary and intended to explain the present disclosure, which should not be construed as limiting the present disclosure.

To better understand a communication method disclosed in the embodiments of the present disclosure, in the following, a satellite communication system applicable to the embodiment of the present disclosure will be described in the first place.

Please refer to FIG. 1, which is a schematic diagram of an architecture of a satellite communication system provided in an embodiment of the present disclosure. The satellite communication system may include a satellite 101, a terminal 102, and a gateway station 103.

The satellite 101 in the embodiments of the present disclosure is an entity configured to transmit or receive signals. The embodiments of the present disclosure are not limited to any specific technology and equipment form adopted by the satellite.

The terminal 102 in the embodiments of the present disclosure refers to a processing apparatus within a coverage beam range of the satellite and used for communication with the satellite. For example, the terminal may be a smart car, a mobile phone, a wearable device, a pad (Pad), a car with capabilities to communicate with a satellite, or the like. The embodiments of the present disclosure are not limited to any specific technology and equipment form adopted by the terminal.

Among them, it should be noted that FIG. 1 illustrates the example of two terminal devices 102.

In an embodiment of the present disclosure, the gateway station 103 in this example is connected to the satellite 101.

The gateway station 103 in the embodiments of the present disclosure is a node in the satellite communication system configured to transmit and receive data on the ground. The embodiments of the present disclosure are not limited to any specific technology and equipment form adopted by the gateway station.

It can be understood that the satellite communication system described in the embodiments of the present disclosure is provided for the purpose of clearly explaining the technical solution provided in the embodiments of the present disclosure, and does not constitute limitations on the technical solution provided in the embodiments of the present disclosure. The persons of ordinary skill in the art know that with evolution of system architecture and emergence of new business scenarios, the technical solution provided in the embodiments of the present disclosure is also applicable to similar technical problems.

In the aforementioned satellite system, after the introduction of the Internet protocol multimedia subsystem (Internet Protocol Multimedia Subsystem, IMS) call into the satellite communication network, when the two terminals shown in FIG. 1 perform an IMS call, a transmission path of media plane data is as follows: a first terminal (one of the two terminals shown in FIG. 1)→the satellite→a ground user plane function (User Plane Function, UPF)→a calling session border controller (Session Border Controller, SBC)→a called SBC→a ground UPF→the satellite→a second terminal (the other one of the two terminals shown in FIG. 1). However, the transmission path corresponding to the IMS call between the two terminals is relatively long, resulting in the low call efficiency when the two terminals perform the IMS call over the satellite communication network. Therefore, how to improve the low efficiency of an IMS call between two terminals over the satellite communication network is a problem that requires immediate resolution.

The embodiments of the present disclosure provide a communication method and apparatus, a device, a system, a chip, and a storage medium that enable a direct IMS call between two terminals via a satellite, reducing the transmission delay of the IMS call between the two terminals over a satellite communication network, and improving the communication efficiency between the two terminals.

In the following, a communication method and apparatus, a device, a system, a chip, and a storage medium according to the embodiments of the present disclosure will be described with reference to the accompanying drawings.

Figure 2:
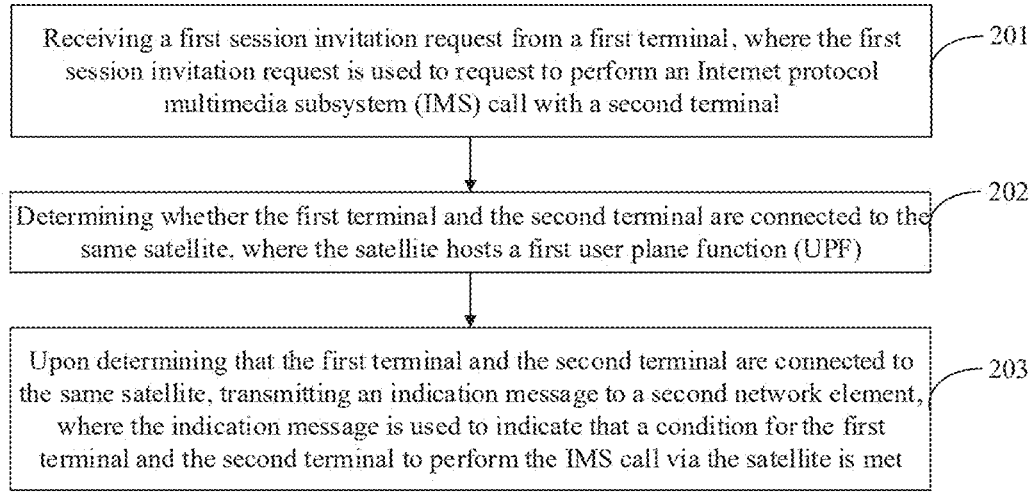
FIG. 2 is a flowchart of a communication method provided in an embodiment of the present disclosure.

FIG. 2 is a flowchart of a communication method provided in an embodiment of the present disclosure. It should be noted that the communication method in this embodiment is executed by a communication apparatus. Among them, the communication apparatus may be implemented by software and/or hardware. The communication apparatus may be located in a first network element or configured in the first network element.

It should be noted that the first network element in this example may be a P-CSCF network element in a 5G core network or other network elements which can use the communication method provided in the embodiments of the present disclosure.

Among them, in this embodiment, an example is taken where the communication method is executed by the first network element for illustrative purposes.

As shown in FIG. 2, the communication method may include the following steps.

Step 201, receiving a first session invitation request from a first terminal, where the first session invitation request is used to request to perform an Internet protocol multimedia subsystem (IMS) call with a second terminal.

The first terminal refers to a terminal device that initiates an IMS call request.

In some examples, the first terminal may also be referred to as a calling terminal, or a mobile originating user equipment (Mobile Originating User Equipment, MOUE).

Among them, the second terminal is a terminal device that answers the IMS call request.

In some examples, the second terminal may also be referred to as a called terminal or a mobile terminating user equipment (Mobile Terminating User Equipment, MTUE).

Among them, the first session invitation request carries all or a part of following information: identification information of the second terminal, an IP address of the first terminal, a port number of the first terminal, a session description protocol (Session Description Protocol, SDP), and etc. That is, the first session invitation request may include at least one or more of the identification information of the second terminal, the IP address of the first terminal, the port number of the first terminal, the session description protocol (Session Description Protocol, SDP), or other information. That is, the first session invitation request may include at least one of the following information: the identification information of the second terminal, the IP address of the first terminal, the port number of the first terminal, and the session description protocol (Session Description Protocol, SDP).

Among them, the SDP includes a media address of the first terminal, and encoding/decoding information and a media type supported by the first terminal.

Among them, the SDP is mainly used for media negotiation before the start of the session.

Among them, the media address is an address for transmitting and receiving a media stream.

In an example, the first session invitation request may be a session initiation protocol (Session Initiation Protocol, SIP) INVITE message.

Step 202: determining whether the first terminal and the second terminal are connected to the same satellite, where the satellite hosts a first user plane function (UPF).

Among them, it can be understood that implementations of determining whether the first terminal and the second terminal are connected to the same satellite vary in different application scenarios. The examples are described below.

As a possible implementation, whether the first terminal and the second terminal are connected to the same satellite may be determined based on a satellite identification of a satellite to which the first terminal is connected and a satellite identification of a satellite to which the second terminal is connected. If the satellite identification of the satellite to which the first terminal is connected is as same as the satellite identification of the satellite to which the second terminal is connected, it is determined that the first terminal and the second terminal are connected to the same satellite.

As another possible implementation, whether the first terminal and the second terminal are connected to the same satellite may be determined based on location information of the first terminal and location information of the second terminal.

Among them, the location information of the first terminal refers to relevant data used to determine a current geographical location of the first terminal.

Among them, the location information of the first terminal in this example may include at least one of: cell identification information of a cell where the first terminal is located, a base station identity of a base station to which the first terminal is connected, or access network type information corresponding to the first terminal.

In an embodiment, the base station to which the first terminal is connected may be set up on the satellite.

The location information of the second terminal refers to relevant data used to determine a current geographical location of the second terminal.

Among them, the location information of the second terminal in this example may include at least one of: cell identification information of a cell where the second terminal is located, a base station identity of a base station to which the second terminal is connected, or access network type information corresponding to the second terminal.

In an embodiment, the base station to which the second terminal is connected may be set up on the satellite.

As an example, in the case where the location information of the first terminal includes the cell identification information of the cell where the first terminal is located, and the location information of the second terminal includes the cell identification information of the cell where the second terminal is located, whether the first terminal and the second terminal are connected to the same satellite can be determined based on whether the cell identification information of both terminals is consistent.

Specifically, in the case where the cell identification information of both terminals is consistent, it is determined that the first terminal and the second terminal are connected to the same satellite. In addition, in the case where the cell identification information of both terminals is inconsistent, it is determined that the first terminal and the second terminal are connected to different satellites.

As another example, in the case where the location information of the first terminal includes the base station identity of the base station to which the first terminal is connected, and the location information of the second terminal includes the base station identity of the base station to which the second terminal is connected, whether the first terminal and the second terminal are connected to the same satellite can be determined based on whether the base station identities are consistent.

Specifically, in the case where the base station identities are consistent, it is determined that the first terminal and the second terminal are connected to the same satellite. In addition, in the case the base station identities are inconsistent, it is determined that the first terminal and the second terminal are connected to different satellites.

As another example, in the case where the location information of the first terminal includes the access network type information corresponding to the first terminal, and the location information of the second terminal includes the access network type information corresponding to the second terminal, whether the first terminal and the second terminal are connected to the same satellite may be determined based on whether the access network type information of both terminals is consistent.

Specifically, in the case where the access network type information of both terminals is consistent, it is determined that the first terminal and the second terminal are connected to the same satellite. In addition, in the case where the access network type information of both terminals is inconsistent, it is determined that the first terminal and the second terminal are connected to different satellites.

Step 203, upon determining that the first terminal and the second terminal are connected to the same satellite, transmitting an indication message to a second network element, where the indication message is used to indicate that a condition for the first terminal and the second terminal to perform the IMS call via the satellite is met.

As an example, in the case where the condition for the first terminal and the second terminal to perform the IMS call via the satellite is met, it means that the IMS call between the first terminal and the second terminal device can be directly relayed via the satellite. That is, media plane data during the IMS call between the first terminal and the second terminal can be directly forwarded via the satellite.

As an example, the indication message is used to indicate that the condition for the first terminal and the second terminal to perform the IMS call via the first UPF on the satellite is met.

In an example, the media plane data during the IMS call between the first terminal and the second terminal may be forwarded via the first UPF on the satellite.

Among them, it can be understood that in the case where it is determined that the first terminal and the second terminal are connected to different satellites, the media plane data during an IMS call between the first terminal and the second terminal cannot be forwarded via the satellite.

To enable the second network element to recognize a pairing relationship between the first terminal and the second terminal, and to facilitate other processing based on the pairing information, in an embodiment, the aforementioned indication message may further include the identification information of the first terminal and the identification information of the second terminal.

Among them, the identification information may be an IP address, an international mobile subscriber identity (International Mobile Subscriber Identity, IMSI) number, and/or other information that can be used to identify the terminal, such as, a subscription permanent identity (Subscription Permanent Identity, SUPI).

As an example, the second network element in this example may forward the indication message to a third network element. Correspondingly, in the case where the indication message includes the identification information of the first terminal and the identification information of the second terminal, the third network element can obtain the identification information of the first terminal and the identification information of the second terminal based on the indication message, and transmit a notification message to the first UPF. The notification message is used to inform the first UPF that the first terminal and the second terminal will perform the IMS call via the first UPF, and the notification message may carry the identification information of the first terminal and the identification information of the second terminal.

Among them, it can be understood that after obtaining the identification information of the first terminal and the identification information of the second terminal, the first UPF may bind the identification information of the first terminal and the identification information of the second terminal to establish a binding relationship between the identification information of the two terminals, and forward the media plane data during the IMS call between the first terminal and the second terminal based on the binding relationship.

According to the communication method provided in the embodiment of the present disclosure, a first network element determines whether a first terminal and a second terminal are connected to the same satellite when the first terminal requests to perform an IMS call with the second terminal. The satellite hosts a first UPF. The first network element transmits an indication message to a second network element when it determines that the first terminal and the second terminal are connected to the same satellite. The indication message is used to indicate that a condition for the first terminal and the second terminal to perform the IMS call via the satellite is met. In this way, the second network element can easily determine through the indication message that the condition for the first terminal and the second terminal to perform the IMS call via the satellite is met, thereby enabling the first terminal and the second terminal to directly perform the IMS call via the satellite, reducing the transmission delay of the IMS call between the first terminal and the second terminal over a satellite communication network, and improving the communication efficiency between the two terminals.

It should be noted that in the embodiments of the present disclosure, some or all of steps and optional implementations thereof may be combined with some or all of steps in another embodiment, and may also be combined with optional implementations in another embodiment.

In the embodiments of the present disclosure, each step and optional implementation thereof may also be independently implemented.

Figure 3:
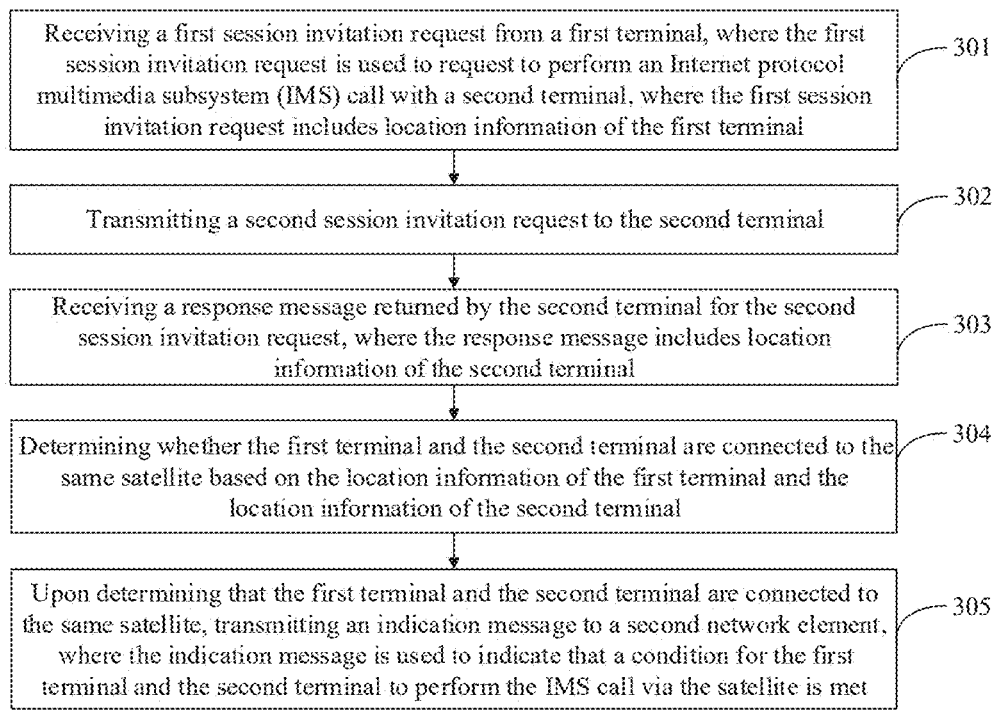
FIG. 3 is a flowchart of another communication method provided in an embodiment of the present disclosure.

FIG. 3 is a flowchart of another communication method provided in an embodiment of the present disclosure.

As shown in FIG. 3, the communication method may include the following steps.

Step 301, receiving a first session invitation request from a first terminal, where the first session invitation request is used to request to perform an Internet protocol multimedia subsystem (IMS) call with a second terminal, where the first session invitation request includes location information of the first terminal.

It should be noted that in addition to carrying the location information of the first terminal, the first session invitation request may further include identification information of the second terminal, an IP address of the first terminal, a port number of the first terminal, a session description protocol (Session Description Protocol, SDP), or the like.

Among them, the location information of the first terminal in this example may include at least one of: cell identification information of a cell where the first terminal is located, a base station identity of a base station to which the first terminal is connected, or access network type information corresponding to the first terminal.

As an example, in the case where the first terminal detects that it is connected to a satellite, the first session invitation request may carry the location information of the first terminal.

Among them, the satellite to which the first terminal is connected may include a base station.

As an example, in the case where the first terminal detects that it is connected to a base station on a satellite, the first session invitation request may carry the location information of the first terminal.

Step 302: transmitting a second session invitation request to the second terminal.

Among them, the first session invitation request and the second session invitation request in this example may be the same or different.

As an example, the second session invitation request may also be an SIP INVITE message.

Step 303: receiving a response message from the second terminal for the second session invitation request, where the response message includes location information of the second terminal.

Among them, the location information of the second terminal in this example may include at least one of: cell identification information of a cell where the second terminal is located, a base station identity of a base station to which the second terminal is connected, or access network type information corresponding to the second terminal.

Step 304: determining whether the first terminal and the second terminal are connected to the same satellite based on the location information of the first terminal and the location information of the second terminal.

For the specific implementation of determining whether the first terminal and the second terminal are connected to the same satellite based on the location information of the first terminal and the location information of the second terminal, reference may be made to related description in other embodiments, which will not be repeated here.

Step 305, upon determining that the first terminal and the second terminal are connected to the same satellite, transmitting an indication message to a second network element, where the indication message is used to indicate that a condition for the first terminal and the second terminal to perform the IMS call via the satellite is met.

Among them, the satellite hosts a first UPF.

It should be noted that, for the specific implementation of step 305, reference may be made to related description in other embodiments, which will not be repeated here.

According to the communication method provided in the embodiment of the present disclosure, a first session invitation request, used by a first terminal for requesting to perform an IMS call with a second terminal, includes location information of the first terminal. A response message for the second session invitation request, from the second terminal, includes location information of the second terminal. Therefore, whether the first terminal and the second terminal are connected to the same satellite can be quickly determined based on the location information of the first terminal and the location information of the second terminal, thereby enabling quick subsequent processing based on a result of the determination.

Figure 4:
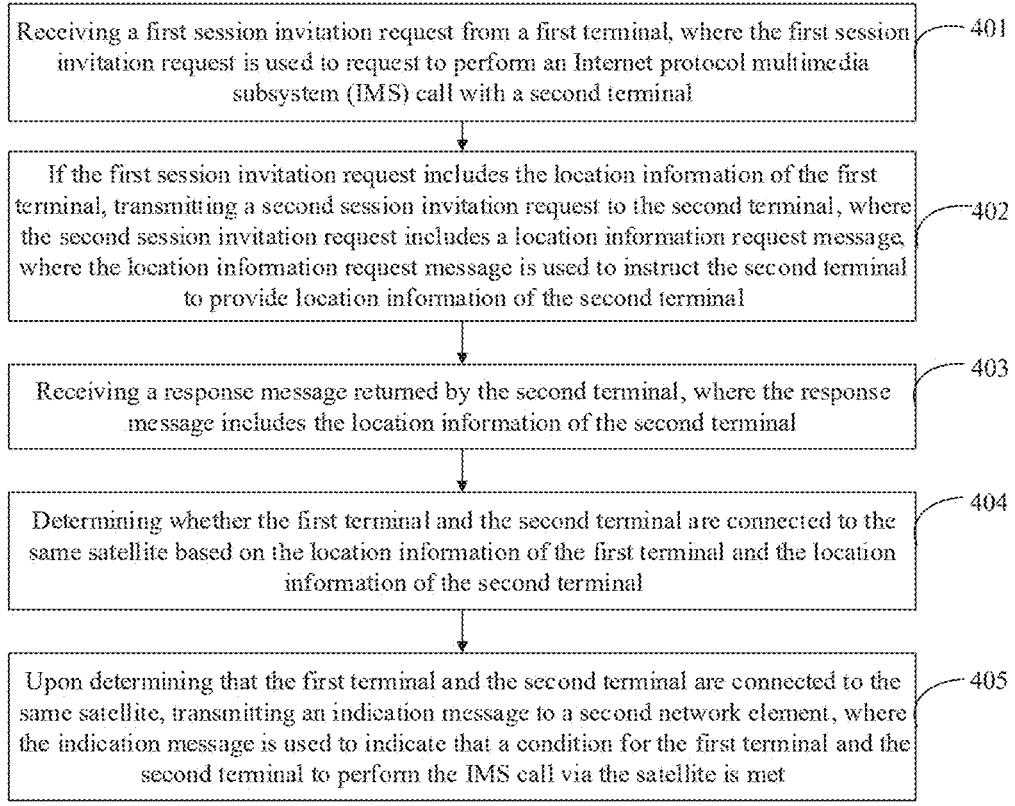
FIG. 4 is a flowchart of another communication method provided in an embodiment of the present disclosure.

FIG. 4 is a flowchart of another communication method provided in an embodiment of the present disclosure. It should be noted that the communication method in this embodiment is executed by a first network element.

As shown in FIG. 4, the communication method may include the following steps.

Step 401, receiving a first session invitation request from a first terminal, where the first session invitation request is used to request to perform an Internet protocol multimedia subsystem (IMS) call with a second terminal.

It should be noted that, for the specific implementation of step 401, reference may be made to related description in other embodiments, which will not be repeated here.

Step 402, if the first session invitation request includes the location information of the first terminal, transmitting a second session invitation request to the second terminal, where the second session invitation request includes a location information request message, where the location information request message is used to instruct the second terminal to provide location information of the second terminal.

In an example, the second session invitation request may be obtained by processing the first session invitation request.

As an example, the second session invitation request may be obtained by inserting the location information request message into the first session invitation request.

In this example, it is possible to determine whether the first session invitation request includes the location information of the first terminal device, if it is determined that the first session invitation request includes the location information of the first terminal, the second session invitation request is transmitted to the second terminal, the second session invitation request includes the location information request message, and the location information request message is used to instruct the second terminal to provide the location information of the second terminal.

Step 403: receiving a response message from the second terminal, where the response message includes the location information of the second terminal.

As an example, when the second terminal detects that it is connected to a satellite, the response message may carry the location information of the second terminal.

Among them, the satellite to which the second terminal is connected may include a base station.

As an example, when the second terminal device detects that it is connected to a base station on a satellite, the response message may carry the location information of the second terminal.

For the related description of the location information of the second terminal, reference may be made to related description in other embodiments, which will not be repeated here.

Step 404: determining whether the first terminal and the second terminal are connected to the same satellite based on the location information of the first terminal and the location information of the second terminal.

It should be noted that, for the specific implementation of step 404, reference may be made to related description in other embodiments, which will not be repeated here.

Step 405, upon determining that the first terminal and the second terminal are connected to the same satellite, transmitting an indication message to a second network element, where the indication message is used to indicate that a condition for the first terminal and the second terminal to perform the IMS call via the satellite is met.

It should be noted that, for the specific implementation of step 405, reference may be made to related description in other embodiments, which will not be repeated here.

In this embodiment, a first terminal actively carries its own location information in a first session invitation request, and a second terminal returns a response message carrying its own location information based on a location information request message in a second session invitation request. Therefore, the first network element can quickly determine whether the first terminal and the second terminal are connected to the same satellite based on the location information of the first terminal and the location information of the second terminal.

Figure 5:
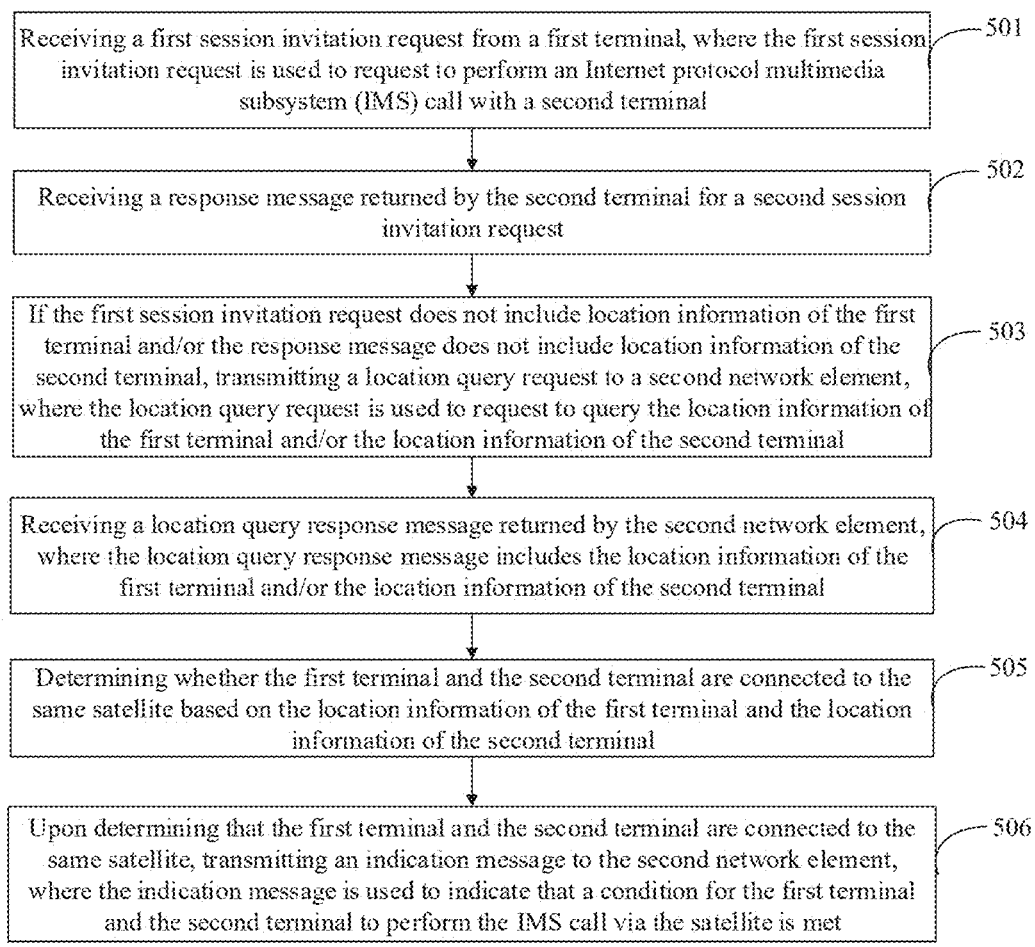
FIG. 5 is a flowchart of another communication method provided in an embodiment of the present disclosure.

FIG. 5 is a flowchart of another communication method provided in an embodiment of the present disclosure. It should be noted that the communication method in this embodiment is executed by a first network element.

As shown in FIG. 5, the communication method may include the following steps.

Step 501, receiving a first session invitation request from a first terminal, where the first session invitation request is used to request to perform an Internet protocol multimedia subsystem (IMS) call with a second terminal.

Step 502: receiving a response message from the second terminal for a second session invitation request.

Among them, it should be noted that, for the specific implementations of step 501 and step 502, reference may be made to related description in other embodiments, which will not be repeated here.

Step 503, if the first session invitation request does not include location information of the first terminal and/or the response message does not include location information of the second terminal, transmitting a location query request to a second network element, where the location query request is used to request to query the location information of the first terminal and/or the location information of the second terminal.

Step 504: receiving a location query response message from the second network element, where the location query response message includes the location information of the first terminal and/or the location information of the second terminal.

In an embodiment of the present disclosure, in the case where the first session invitation request does not carry the location information of the first terminal, while the response message carries the location information of the second terminal, a first location query request is transmitted to the second network element, and a first location query response message from the second network element for the first location query request is received. The first location query request is used to request to query the location information of the first terminal, and the first location query response message includes the location information of the first terminal.

In another embodiment of the present disclosure, in the case where the first session invitation request carries the location information of the first terminal, while the response message does not carry the location information of the second terminal, a second location query request is transmitted to the second network element, and a second location query response message from the second network element for the second location query request is received. The second location query request is used to request to query the location information of the second terminal, and the second location query response message includes the location information of the second terminal.

In another embodiment of the present disclosure, in the case where the first session invitation request does not carry the location information of the first terminal and the response message does not carry the location information of the second terminal, a third location query request is transmitted to the second network element, and a third location query response message from the second network element for the third location query request is received. The third location query request is used to request to query the location information of the first terminal and the location information of the second terminal, and the third location query response message includes the location information of the first terminal and the location information of the second terminal.

Among them, it should be noted that the second network element may subscribe to the location information of the first terminal and the location information of the second terminal from an access and mobility management function (Access and Mobility Management Function, AMF) network element. A base station mounted on the satellite may transmit a location report to the AMF network element upon detecting a change in a service message corresponding to the first terminal and/or the second terminal. Correspondingly, the AMF network element transmits the location report to the second network element.

In an example, the location report includes one or more of: a cell identity of a cell where the first terminal and/or the second terminal is located, a base station identity of a base station to which the first terminal and/or the second terminal is connected, and access network type information of the first terminal and/or the second terminal.

Step 505: determining whether the first terminal and the second terminal are connected to the same satellite based on the location information of the first terminal and the location information of the second terminal.

Step 506, upon determining that the first terminal and the second terminal are connected to the same satellite, transmitting an indication message to the second network element, where the indication message is used to indicate that a condition for the first terminal and the second terminal to perform the IMS call via the satellite is met.

Among them, it should be noted that for the specific implementations of step 505 and step 506, reference may be made to related description in other embodiments, which will not be repeated here.

In this embodiment, by acquiring location information of a first terminal and/or a second terminal from a second network element, it is possible to quickly determine whether the first terminal and the second terminal are connected to the same satellite based on the location information of the first terminal and the location information of the second terminal. This enables subsequent processing based on a result of the determination and improves the efficiency of directly forwarding media plane data during an IMS call between the first terminal and the second terminal via the satellite.

Figure 6:
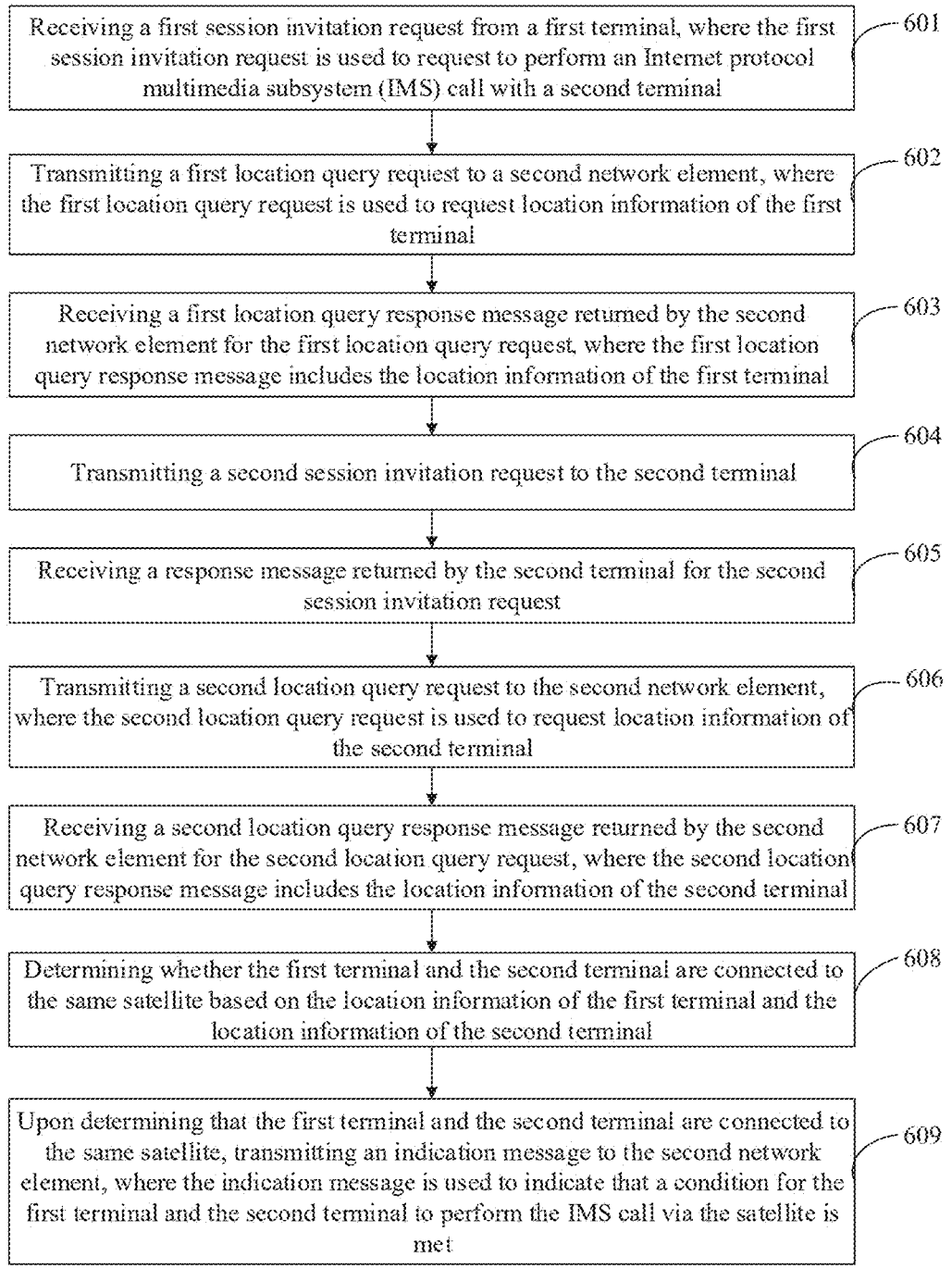
FIG. 6 is a flowchart of another communication method provided in an embodiment of the present disclosure.

FIG. 6 is a flowchart of another communication method provided in an embodiment of the present disclosure. It should be noted that the communication method in this embodiment is executed by a first network element.

As shown in FIG. 6, the communication method may include the following steps.

Step 601, receiving a first session invitation request from a first terminal, where the first session invitation request is used to request to perform an Internet protocol multimedia subsystem (IMS) call with a second terminal.

It should be noted that for the specific implementation of step 601, reference may be made to related description in other embodiments, which will not be repeated here.

Step 602: transmitting a first location query request to a second network element, where the first location query request is used to request location information of the first terminal.

Step 603: receiving a first location query response message from the second network element for the first location query request, where the first location query response message includes the location information of the first terminal.

In this embodiment, after the first session invitation request is received from the first terminal, regardless of whether the first session invitation request actively carries the location information of the first terminal, the location information of the first terminal may be obtained from the second network element.

For the related description of the location information of the first terminal, reference may be made to related description in other embodiments, which will not be repeated here.

In an embodiment of the present disclosure, a first authentication authorization request (Authentication Authorization Request, AAR) message may be transmitted to the second network element, and a first re-authentication request (Re-Authentication Request, RAR) message from the second network element for the first AAR message may be received. Among them, the first RAR message includes the location information of the first terminal. The first AAR message includes a first location query request, and the first location query request is used to query the location information of the first terminal.

Step 604: transmitting a second session invitation request to the second terminal.

Among them, the first session invitation request and the second session invitation request in this example may be the same or different. This embodiment does not impose specific limitations in this regard.

Step 605: receiving a response message from the second terminal for the second session invitation request.

In an embodiment of the present disclosure, the response message may carry the location information of the second terminal.

Step 606: transmitting a second location query request to the second network element, where the second location query request is used to request location information of the second terminal.

Step 607: receiving a second location query response message from the second network element for the second location query request, where the second location query response message includes the location information of the second terminal.

In an embodiment of the present disclosure, in order to improve the accuracy of the location information of the second terminal acquired, after the response message from the second terminal for the second session invitation request is received, regardless of whether the response message from the second terminal carries the location information of the second terminal, the location information of the second terminal may be acquired from the second network element.

In an embodiment of the present disclosure, a second AAR message may be transmitted to the second network element and a second RAR message from the second network element for the second AAR message may be received. Among them, the second AAR message includes a second location query request, and the second location query request is used to query the location information of the second terminal. The second RAR message includes the location information of the second terminal.

Among them, it should be noted that for the description of the location information of the second terminal, reference may be made to related description in other embodiments, which will not be repeated here.

Step 608: determining whether the first terminal and the second terminal are connected to the same satellite based on the location information of the first terminal and the location information of the second terminal.

Step 609, upon determining that the first terminal and the second terminal are connected to the same satellite, transmitting an indication message to the second network element, where the indication message is used to indicate that a condition for the first terminal and the second terminal to perform the IMS call via the satellite is met.

Among them, it should be noted that for the specific implementations of step 608 and step 609, reference may be made to related description in other embodiments, which will not be repeated here.

Based on the aforementioned description, it can be seen that in this embodiment, by communicating with a second network element, location information of a first terminal and location information of a second terminal may be quickly obtained, and it is possible to quickly determine, based on the location information of the first terminal and the location information of the second terminal, whether the first terminal and the second terminal are connected to the same satellite, thus enabling subsequent processing based on a result of the determination.

Figure 7:
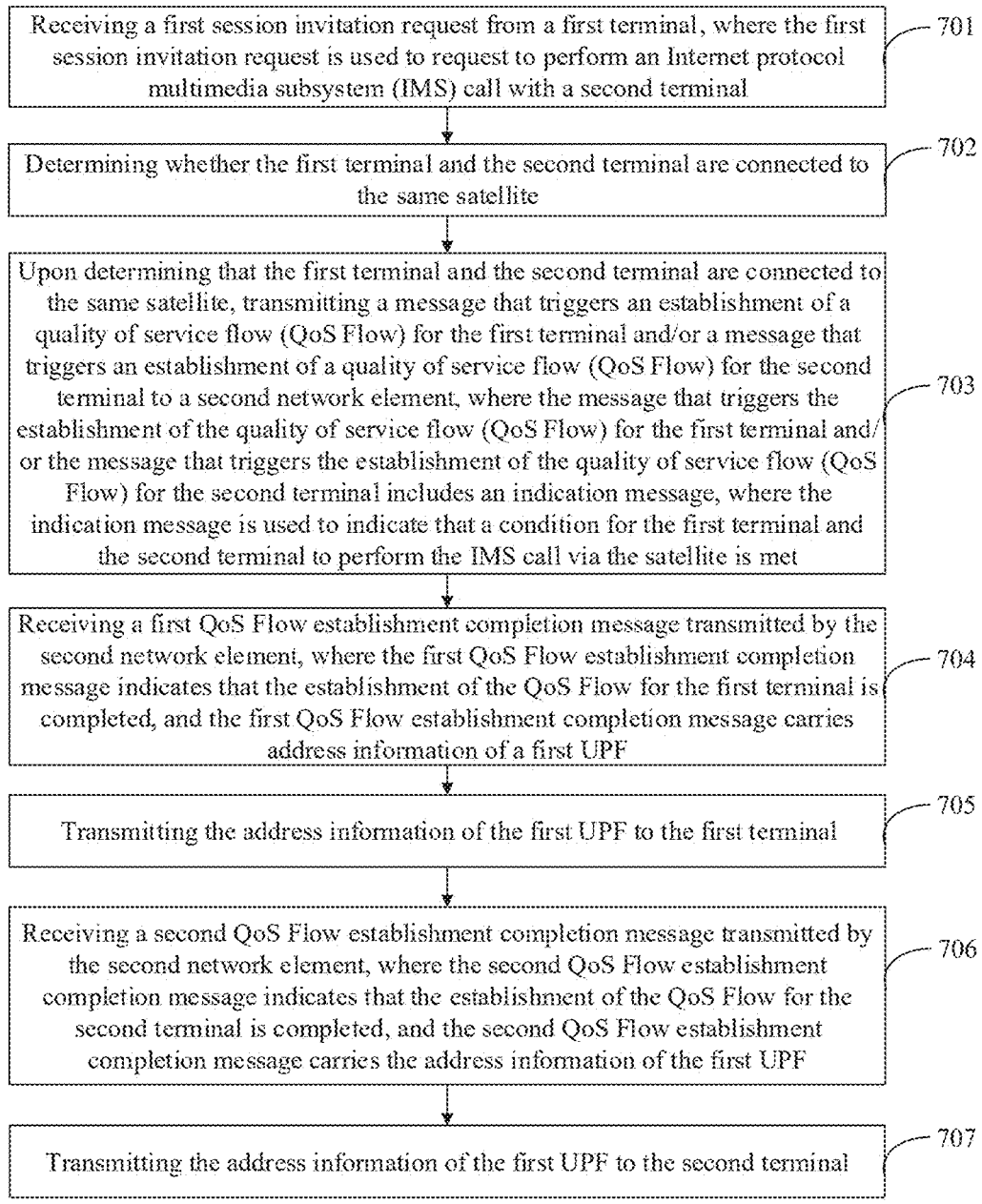
FIG. 7 is a flowchart of another communication method provided in an embodiment of the present disclosure.

FIG. 7 is a flowchart of another communication method provided in an embodiment of the present disclosure. It should be noted that the communication method in this embodiment is executed by a first network element. It should be noted that this embodiment is a further description of any of the aforementioned embodiments.

As shown in FIG. 7, the communication method may include the following steps.

Step 701, receiving a first session invitation request from a first terminal, where the first session invitation request is used to request to perform an Internet protocol multimedia subsystem (IMS) call with a second terminal.

Step 702: determining whether the first terminal and the second terminal are connected to the same satellite.

Among them, it should be noted that for the specific implementations of step 701 and step 702, reference may be made to related description in other embodiments, which will not be repeated here.

Step 703, upon determining that the first terminal and the second terminal are connected to the same satellite, transmitting a message that triggers an establishment of a quality of service flow (QoS Flow) for the first terminal and/or a message that triggers an establishment of a quality of service flow (QoS Flow) for the second terminal to a second network element, where the message that triggers the establishment of the quality of service flow (QoS Flow) for the first terminal and/or the message that triggers the establishment of the quality of service flow (QoS Flow) for the second terminal includes an indication message, where the indication message is used to indicate that a condition for the first terminal and the second terminal to perform the IMS call via the satellite is met.

In an embodiment of the present disclosure, a message that triggers an establishment of a quality of service flow (QoS Flow) for the first terminal may be transmitted to the second network element. The message that triggers the establishment of the quality of service flow (QoS Flow) for the first terminal includes the indication message.

In an embodiment of the present disclosure, a message that triggers an establishment of a quality of service flow (QoS Flow) for the second terminal may be transmitted to the second network element. The message that triggers the establishment of the quality of service flow (QoS Flow) for the second terminal includes the indication message.

In an embodiment of the present disclosure, a message that triggers an establishment of a quality of service flow (QoS Flow) for the first terminal and a message that triggers an establishment of a quality of service flow (QoS Flow) for the second terminal may be transmitted to the second network element, where the message that triggers the establishment of the quality of service flow (QoS Flow) for the first terminal and the message that triggers the establishment of the quality of service flow (QoS Flow) for the second terminal include the indication message.

In an embodiment of the present disclosure, the message that triggers the establishment of the quality of service flow (QoS Flow) for the first terminal may be an AAR message or other type of message that triggers the establishment of the quality of service flow (QoS Flow) for the first terminal, which is not specifically limited here.

In an embodiment of the present disclosure, the message that triggers the establishment of the quality of service flow (QoS Flow) for the second terminal may be an AAR message or other type of message that triggers the establishment of the quality of service flow (QoS Flow) for the second terminal, which is not specifically limited here.

Step 704: receiving a first QoS Flow establishment completion message transmitted by the second network element, where the first QoS Flow establishment completion message indicates that the establishment of the QoS Flow for the first terminal is completed, and the first QoS Flow establishment completion message carries address information of a first UPF.

In an embodiment of the present disclosure, after receiving the message that triggers the establishment of the quality of service flow (QoS Flow) for the first terminal and the message that triggers the establishment of the quality of service flow (QoS Flow) for the second terminal, the second network element may transmit a message that requests the establishment of the quality of service flow (QoS Flow) for the first terminal and a message that requests the establishment of the quality of service flow (QoS Flow) for the second terminal to a third network element. Correspondingly, after receiving the message that requests the establishment of the quality of service flow (QoS Flow) for the first terminal and the message that requests the establishment of the quality of service flow (QoS Flow) for the second terminal, the third network element may establish, based on the message that requests the establishment of the quality of service flow (QoS Flow) for the first terminal and the message that requests the establishment of the quality of service flow (QoS Flow) for the second terminal respectively, the QoS Flow for the first terminal and the QoS Flow for the second terminal.

In an embodiment of the present disclosure, the message that triggers the establishment of the quality of service flow (QoS Flow) for the first terminal and/or the message that triggers the establishment of the quality of service flow (QoS Flow) for the second terminal further includes a call mode of the IMS call. The call mode is an IMS voice call or an IMS video call.

In an embodiment of the present disclosure, the message that requests the establishment of the quality of service flow (QoS Flow) for the first terminal and/or the message that requests the establishment of the quality of service flow (QoS Flow) for the second terminal may further carry a call mode of the IMS call. The call mode is an IMS voice call or an IMS video call.

In the case where the call mode is the IMS voice call, the third network element may establish, based on the message that requests the establishment of the quality of service flow (QoS Flow) for the first terminal, a QoS Flow for carrying voice data during the IMS voice call for the first terminal, and the third network element may also establish, based on the message that requests the establishment of the quality of service flow (QoS Flow) for the second terminal, a QoS Flow for carrying voice data during the IMS voice call for the second terminal.

Among them, a 5G quality of service identifier (5G QoS identifier. 5QI) of a quality of service flow (QoS Flow) for carrying the voice data is equal to 1. That is, a QoS Flow with 5QI=1 may be established and the voice data may be carried over the QoS Flow.

In the case where the call mode is the IMS video call, the third network element may establish, based on the message that requests the establishment of the quality of service flow (QoS Flow) for the first terminal, a QoS Flow for carrying video data during the IMS video call for the first terminal, and the third network element may also establish, based on the message that requests the establishment of the quality of service flow (QoS Flow) for the second terminal, a QoS Flow for carrying video data during the IMS video call for the second terminal.

Among them, a 5G quality of service identifier (5G QoS identifier. 5QI) of a quality of service flow (QoS Flow) for carrying the video data is equal to 2. That is, a QoS Flow with 5QI=2 may be established and the video data may be carried over the QoS Flow.

Step 705: transmitting the address information of the first UPF to the first terminal.

In order to enable the first terminal to perform the IMS call with the second terminal via the first UPF on the satellite, it is also possible to transmit the address information of the first UPF to the first terminal, so that the first terminal can perform the IMS call with the second terminal based on the address information of the first UPF.

As an example, a response message from the second terminal may be transmitted to the first terminal. The response message includes the address information of the first UPF, so that the first terminal can route media plane data, during the IMS call transmitted to the second terminal, to the first UPF on the satellite based on the address information of the first UPF.

Step 706: receiving a second QoS Flow establishment completion message transmitted by the second network element, where the second QoS Flow establishment completion message indicates that the establishment of the QoS Flow for the second terminal is completed, and the second QoS Flow establishment completion message carries the address information of the first UPF.

Step 707: transmitting the address information of the first UPF to the second terminal.

In order to enable the second terminal to perform the IMS call with the first terminal via the first UPF on the satellite, it is also possible to transmit the address information of the first UPF to the second terminal, so that the second terminal can perform the IMS call with the first terminal based on the address information of the first UPF.

As an example, a session update message may be transmitted to the second terminal. The session update message includes the address information of the first user plane function (UPF) on the satellite, so that the second terminal can perform the IMS call with the second terminal based on the address information of the first UPF.

As an example, the session update message may be an updated session invitation request. The updated session invitation request includes the address information of the first UPF, and the updated session invitation request is obtained by inserting the address information of the first UPF into the first session invitation request.

For example, in the case where the first session invitation request is an SIP INVITE message, the updated session invitation request may be a corresponding INVITE update message.

Figure 8:
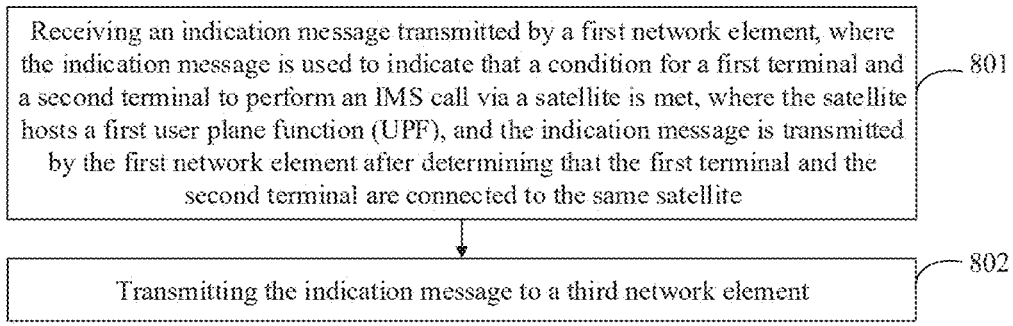
FIG. 8 is a flowchart of another communication method provided in an embodiment of the present disclosure.

FIG. 8 is a flowchart of another communication method provided in an embodiment of the present disclosure. It should be noted that the communication method in this embodiment is executed by a communication apparatus. It should be noted that the communication apparatus in this embodiment may be implemented by software and/or hardware. Among them, the communication apparatus may be a second network element, or it may be configured in the second network element. Among them, in this embodiment, an example is taken where the communication method is executed by the second network element for illustrative purposes.

It should be noted that the second network element in this example may be a PCF network element in the 5G core network or other network elements that can use the communication method provided in the embodiment of the present disclosure.

As shown in FIG. 8, the communication method may include the following steps.

Step 801: receiving an indication message transmitted by a first network element, where the indication message is used to indicate that a condition for a first terminal and a second terminal to perform an IMS call via a satellite is met, where the satellite hosts a first user plane function (UPF), and the indication message is transmitted by the first network element after determining that the first terminal and the second terminal are connected to the same satellite.

Among them, it can be understood that in this example, the first terminal and the second terminal are connected to said satellite, that is, the first terminal and the second terminal are connected to the same satellite.

Among them, the satellite in this embodiment includes the first UPF.

It should be noted that the indication message is transmitted by the first network element upon determining that the first terminal and the second terminal are connected to the same satellite.

Among them, it should be noted that for the related description of determining whether the first terminal and the second terminal are connected to the same satellite by the first network element, reference may be made to related description in other embodiments, which will not be repeated here.

In an embodiment of the present disclosure, a message that triggers an establishment of a quality of service flow (QoS Flow) for the first terminal and/or a message that triggers an establishment of a quality of service flow (QoS Flow) for the second terminal transmitted by the first network element may be received. The message that triggers the establishment of the quality of service flow (QoS Flow) for the first terminal and/or the message that triggers the establishment of the quality of service flow (QoS Flow) for the second terminal includes the indication message.

In an embodiment of the present disclosure, the message that triggers the establishment of the quality of service flow (QoS Flow) for the first terminal and/or the message that triggers the establishment of the quality of service flow (QoS Flow) for the second terminal may further include a call mode of the IMS call. The call mode is an IMS voice call or an IMS video call.

Step 802, transmitting the indication message to a third network element.

In an embodiment of the present disclosure, in order to enable the third network element to bind identification information of the first terminal and identification information of the second terminal, and manage the first terminal and the second terminal based on a binding relationship obtained from the binding, the indication message in this embodiment may include the identification information of the first terminal and the identification information of the second terminal.

Among them, the identification information may be an IP address, an international mobile subscriber identity (International Mobile Subscriber Identity, IMSI) number, and/or other information that can be used to identify the terminal, such as, a subscription permanent identity (Subscription Permanent Identity, SUPI).

Among them, it should be noted that for related operation (s) performed by the third network element after receiving the indication message, reference may be made to related description in other embodiments.

Based on the aforementioned description, it can be seen that in this embodiment, the second network element forwards the indication message transmitted by the first network element to the third network element, so that the third network element can quickly know that the condition for the first terminal and the second terminal to perform the IMS call via the satellite is met, facilitating subsequent processing based on this condition. This, in turn, enables the first terminal and the second terminal to directly perform the IMS call via the satellite, reducing the transmission delay of the IMS call between the first terminal and the second terminal over a satellite communication network, and improving the communication efficiency between the two terminals.

According to a communication method provided in an embodiment of the present disclosure, a second network element receives an indication message transmitted by a first network element and forwards indication message to a third network element, so that the third network element can easily know through the indication message that a condition for the first terminal and the second terminal to perform an IMS call via a satellite is met, thereby enabling the first terminal and the second terminal to directly perform the IMS call via the satellite, reducing the transmission delay of the IMS call between the first terminal and the second terminal over a satellite communication network, and improving the communication efficiency between the two terminals.

Figure 9:
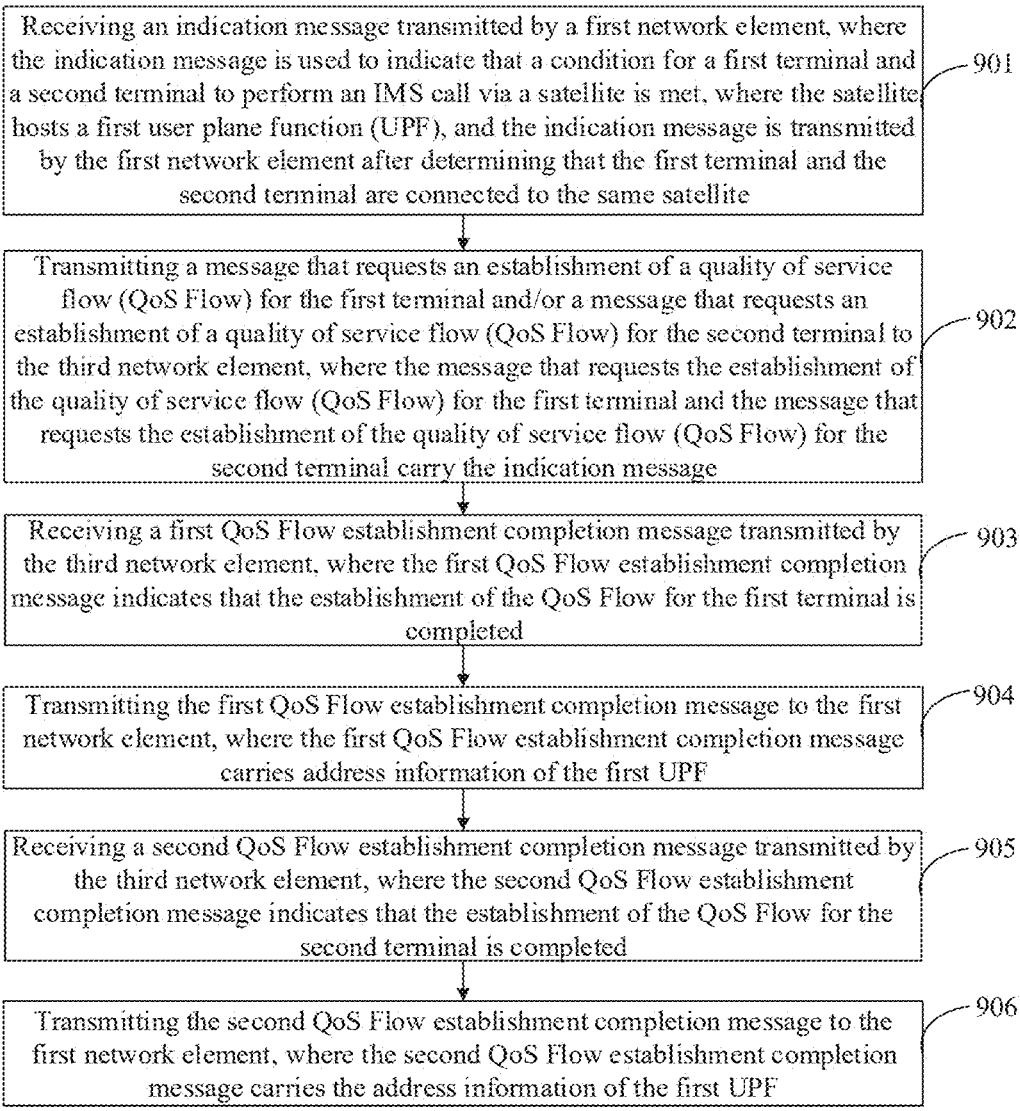
FIG. 9 is a flowchart of another communication method provided in an embodiment of the present disclosure.

FIG. 9 is a flowchart of another communication method provided in an embodiment of the present disclosure. It should be noted that the communication method in this embodiment is executed by a second network element. It should be noted that this embodiment is a further detailed description of the aforementioned embodiment.

As shown in FIG. 9, the communication method may include the following steps.

Step 901: receiving an indication message transmitted by a first network element, where the indication message is used to indicate that a condition for a first terminal and a second terminal to perform an IMS call via a satellite is met, where the satellite hosts a first user plane function (UPF), and the indication message is transmitted by the first network element after determining that the first terminal and the second terminal are connected to the same satellite.

For the specific implementation of step 901, reference may be made to related description in other embodiments, which will not be repeated here.

Step 902, transmitting a message that requests an establishment of a quality of service flow (QoS Flow) for the first terminal and/or a message that requests an establishment of a quality of service flow (QoS Flow) for the second terminal to the third network element, where the message that requests the establishment of the quality of service flow (QoS Flow) for the first terminal and the message that requests the establishment of the quality of service flow (QoS Flow) for the second terminal carry the indication message.

In an embodiment of the present disclosure, in order to enable the third network element to bind identification information of the first terminal and identification information of the second terminal, and manage the first terminal and the second terminal based on a binding relationship obtained from the binding, the indication message in this embodiment may include the identification information of the first terminal and the identification information of the second terminal.

Among them, the identification information may be an IP address, an international mobile subscriber identity (International Mobile Subscriber Identity, IMSI) number, and/or other information that can be used to identify the terminal, such as, a subscription permanent identity (Subscription Permanent Identity, SUPI).

In an embodiment of the present disclosure, in order to determine a call mode of the IMS call performed between the first terminal and the second terminal, the message that requests the establishment of the quality of service flow (QoS Flow) for the first terminal and/or the message that requests the establishment of the quality of service flow (QoS Flow) for the second terminal further includes a call mode of the IMS call. The call mode is an IMS voice call or an IMS video call.

Step 903: receiving a first QoS Flow establishment completion message transmitted by the third network element, where the first QoS Flow establishment completion message indicates that the establishment of the QoS Flow for the first terminal is completed.

Step 904: transmitting the first QoS Flow establishment completion message to the first network element, where the first QoS Flow establishment completion message carries address information of the first UPF.

Step 905: receiving a second QoS Flow establishment completion message transmitted by the third network element, where the second QoS Flow establishment completion message indicates that the establishment of the QoS Flow for the second terminal is completed.

Step 906: transmitting the second QoS Flow establishment completion message to the first network element, where the second QoS Flow establishment completion message carries the address information of the first UPF.

In this embodiment, a second network element receives an indication message transmitted by a first network element and forwards indication message to a third network element, so that the third network element can easily know through the indication message that a condition for the first terminal and the second terminal to perform an IMS call via a satellite is met, thereby enabling the first terminal and the second terminal to directly perform the IMS call via the satellite, reducing the transmission delay of the IMS call between the first terminal and the second terminal over a satellite communication network, and improving the communication efficiency between the two terminals.

In an embodiment of the present disclosure, in order to enable the first network element to acquire location information of the first terminal and/or location information of the second terminal from the second network element, and to enable the first network element to determine whether the first terminal and the second terminal are connected to the same satellite based on the location information of the first terminal and the location information of the second terminal, in this embodiment, the second network element may receive a location query request transmitted by the first network element. The location query request is used to query the location information of the first terminal and/or the location information of the second terminal. The second network element also transmits a location query response message for the location query request to the first network element. The location query response message includes the location information of the first terminal and/or the location information of the second terminal.

In an embodiment of the present disclosure, the second network element may also receive a first AAR message transmitted by the first network element. The first AAR message includes a location query request, where the location query request is used to query the location information of the first terminal and/or the location information of the second terminal. The second network element also transmits a first RAR message for the first AAR message to the first network element, where the first RAR message may include a location query response message, and the location query response message includes the location information of the first terminal and/or the location information of the second terminal. In this way, the first network element may acquire the location information of the first terminal and/or the location information of the second terminal from the second network element.

In an embodiment of the present disclosure, the second network element may receive a first AAR message transmitted by the first network element, where the first AAR message includes a first location query request, and the first location query request is used to query the location information of the first terminal. The second network element also transmits a first RAR message for the first AAR message to the first network element, where the first RAR message may include a first location query response message, and the first location query response message includes the location information of the first terminal. The second network element receives a second AAR message transmitted by the first network element, where the second AAR message includes a second location query request, and the second location query request is used to query the location information of the second terminal. The second network element transmits a second RAR message for the second AAR message to the first network element, where the second RAR message may include a second location query response message, and the second location query response message includes the location information of the second terminal.

In an embodiment of the present disclosure, the second network element may also receive a third AAR message transmitted by the first network element, where the third AAR message includes a location query request, and the location query request is used to query the location information of the first terminal and the location information of the second terminal. The second network element also transmits a third RAR message for the third AAR message to the first network element, where the third RAR message may include a location query response message, and the location query response message includes the location information of the first terminal and the location information of the second terminal. In this way, the first network element may acquire the location information of the first terminal and the location information of the second terminal from the second network element.

Among them, it should be noted that for the specific circumstances under which the first network element transmits the location query request, reference may be made to related description in other embodiments, which will not be repeated here.

In an embodiment of the present disclosure, the location information of the first terminal and the location information of the second terminal are used by the first network element to determine whether the first terminal and the second terminal are connected to the same satellite.

Figure 10:
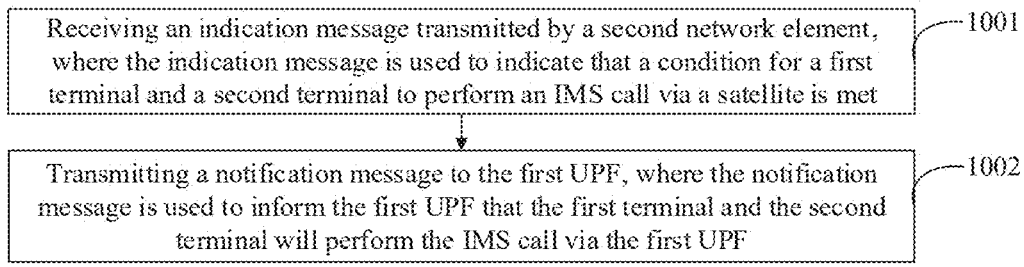
FIG. 10 is a flowchart of another communication method provided in an embodiment of the present disclosure.

FIG. 10 is a flowchart of another communication method provided in an embodiment of the present disclosure. It should be noted that the communication method in this embodiment is executed by a communication apparatus. It should be noted that the communication apparatus in this embodiment may be implemented by software and/or hardware. Among them, the communication apparatus may be a third network element, or it may be configured in the third network element. Among them, in this embodiment, an example is taken where the communication method is executed by the third network element for illustrative purposes.

It should be noted that the third network element in this example may be an SMF network element in the 5G core network or other network elements that can use the communication method provided in the embodiment of the present disclosure.

As shown in FIG. 10, the communication method may include the following steps.

Step 1001: receiving an indication message transmitted by a second network element, where the indication message is used to indicate that a condition for a first terminal and a second terminal to perform an IMS call via a satellite is met.

Among them, both the first terminal and the second terminal are connected to the satellite.

Among them, the satellite hosts a first UPF.

Among them, it should be noted that for the related description of obtaining the indication message by the second network element, reference may be made to related description in other embodiments, which will not be repeated here.

Step 1002, transmitting a notification message to the first UPF, where the notification message is used to inform the first UPF that the first terminal and the second terminal will perform the IMS call via the first UPF.

In an embodiment of the present disclosure, after receiving the indication message, the third network element can determine through the indication message that the condition for the first terminal and the second terminal to perform the IMS call via the satellite is met. At this time, the third network element may determine whether a UPF corresponding to an IMS PDU (protocol data unit) session of the first terminal and a UPF corresponding to an IMS PDU session of the second terminal are the first UPF. Correspondingly, if the UPF corresponding to the IMS PDU session of the first terminal and the UPF corresponding to the IMS PDU session of the second terminal are the first UPF, the third network element transmits the notification message to the first UPF.

In an embodiment of the present disclosure, if at least one of the UPF corresponding to the IMS PDU session of the first terminal or the UPF corresponding to the IMS PDU session of the second terminal is not the first UPF, a UPF of an IMS PDU session whose UPF is not the first UPF is modified to the first UPF, and the notification message is transmitted to the first UPF. The notification message is used to inform the first UPF that the first terminal and the second terminal will perform the IMS call via the first UPF.

In an embodiment of the present disclosure, in order to enable the third network element to obtain identification information of the first terminal and identification information of the second terminal, and to enable the third network element to perform subsequent management based on the identification information of the first terminal and the identification information of the second terminal, the indication message in this embodiment may further include the identification information of the first terminal and the identification information of the second terminal.

Among them, the identification information may be an IP address, an international mobile subscriber identity (International Mobile Subscriber Identity, IMSI) number, and/or other information that can be used to identify the terminal, such as, a subscription permanent identity (Subscription Permanent Identity, SUPI).

In an embodiment of the present disclosure, in order to enable the first UPF to obtain identification information of the first terminal and identification information of the second terminal, and to enable the first UPF to bind the identification information of the first terminal and the identification information of the second terminal to establish a binding relationship between the identification information of the two terminals, and forward media plane data during the IMS call between the first terminal and the second terminal based on the binding relationship, the notification message in this embodiment may further include the identification information of the first terminal and the identification information of the second terminal.

Among them, the identification information may be an IP address, an international mobile subscriber identity (International Mobile Subscriber Identity, IMSI) number, and/or other information that can be used to identify the terminal, such as, a subscription permanent identity (Subscription Permanent Identity, SUPI).

According to the communication method provided in the embodiment of the present disclosure, a third network element receives an indication message transmitted by a second network element, determines through the indication message that a condition for a first terminal and a second terminal to perform an IMS call via a satellite is met, and transmits a notification message to a first UPF in a case where a UPF corresponding to an IMS PDU session of the first terminal and a UPF corresponding to an IMS PDU session of the second terminal are the first UPF. In this way, the first UPF knows through the notification message that the first terminal and the second terminal will perform the IMS call via the first UPF, thereby enabling the first UPF of the satellite to directly forward media plane data during the IMS call between the first terminal and the second terminal, reducing the transmission delay of the IMS call between the first terminal and the second terminal over a satellite communication network, and improving the communication efficiency between the two terminals.

Figure 11:
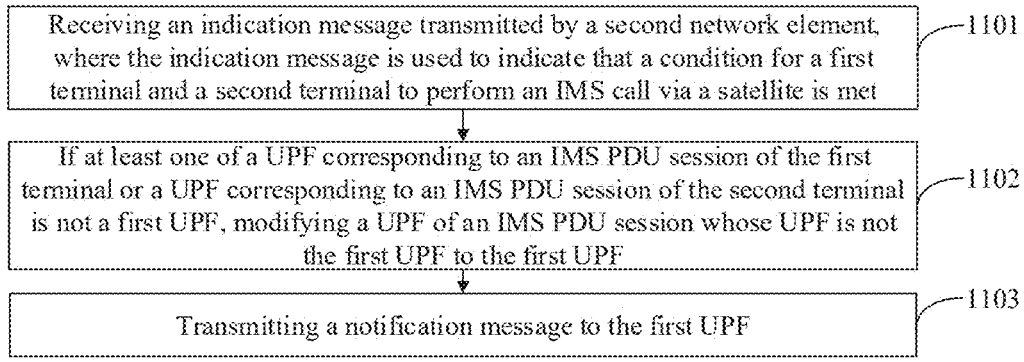
FIG. 11 is a flowchart of another communication method provided in an embodiment of the present disclosure.

FIG. 11 is a flowchart of another communication method provided in an embodiment of the present disclosure. It should be noted that the communication method in this embodiment is executed by a communication apparatus. It should be noted that the communication apparatus in this embodiment may be implemented by software and/or hardware. Among them, the communication apparatus may be a third network element, or it may be configured in the third network element. Among them, in this embodiment, an example is taken where the communication method is executed by the third network element for illustrative purposes.

As shown in FIG. 11, the communication method may include the following steps.

Step 1101: receiving an indication message transmitted by a second network element, where the indication message is used to indicate that a condition for a first terminal and a second terminal to perform an IMS call via a satellite is met.

For the specific implementation of step 1101, reference may be made to related description in other embodiments, which will not be repeated here.

Step 1102, if at least one of a UPF corresponding to an IMS PDU session of the first terminal or a UPF corresponding to an IMS PDU session of the second terminal is not a first UPF, modifying a UPF of an IMS PDU session whose UPF is not the first UPF to the first UPF.

Step 1103, transmitting a notification message to the first UPF.

Among them, the notification message is used to inform the first UPF that the first terminal and the second terminal will perform the IMS call via the first UPF.

In an example of the present disclosure, in a case where it is determined that the UPF corresponding to the IMS PDU session of the first terminal is not the first UPF, and the UPF corresponding to the IMS PDU session of the second terminal is the first UPF, that is, the IMS PDU session whose UPF is not the first UPF is the IMS PDU session of the first terminal. Correspondingly, the UPF corresponding to the IMS PDU session of the first terminal may be modified to the first UPF, so that the first terminal and the second terminal may directly perform the IMS call via the first UPF deployed on the satellite.

In an example, a modification process of the IMS PDU session of the first terminal may be initiated. This process allows for modifying the UPF corresponding to the IMS PDU session of the first terminal to the first UPF.

It should be noted that for the process of establishing the IMS PDU session of the first terminal, reference may be made to descriptions in related art, which will not be repeated here.

In another example of the present disclosure, in a case where it is determined that the UPF corresponding to the IMS PDU session of the first terminal is the first UPF, but the UPF corresponding to the IMS PDU session of the second terminal is not the first UPF, that is, the IMS PDU session whose UPF is not the first UPF is the IMS PDU session of the second terminal. Correspondingly, the UPF corresponding to the IMS PDU session of the second terminal may be modified to the first UPF, so that the first terminal and the second terminal may directly perform the IMS call via the first UPF deployed on the satellite.

It should be noted that for the process of establishing the IMS PDU session of the second terminal, reference may be made to descriptions in related art, which will not be repeated here.

In an example, a modification process of the IMS PDU session of the second terminal may be initiated. This process allows for modifying the UPF corresponding to the IMS PDU session of the second terminal to the first UPF.

In another example of the present disclosure, in a case where it is determined that the UPF corresponding to the IMS PDU session of the first terminal is not the first UPF, and the UPF corresponding to the IMS PDU session of the second terminal is not the first UPF, both of the UPF corresponding to the IMS PDU session of the first terminal and the UPF corresponding to the IMS PDU session of the second terminal may be modified to the first UPF, so that the first terminal and the second terminal may directly perform the IMS call via the first UPF deployed on the satellite.

In an example, a modification process of the IMS PDU session of the second terminal may be initiated. This process allows for modifying the UPF corresponding to the IMS PDU session of the second terminal to the first UPF. A modification process of the IMS PDU session of the first terminal may also be initiated. This process allows for modifying the UPF corresponding to the IMS PDU session of the first terminal to the first UPF.

Based on the aforementioned description, it can be seen that in this embodiment, a third network element receives an indication message transmitted by a second network element and transmits a notification message to a first UPF, so that the first UPF knows through the notification message that the first terminal and the second terminal will perform an IMS call via the first UPF, thereby enabling direct forwarding of media plane data during the IMS call between the first terminal and the second terminal via the satellite, reducing the transmission delay of the IMS call between the first terminal and the second terminal over a satellite communication network, and improving the communication efficiency between the two terminals.

Figure 12:
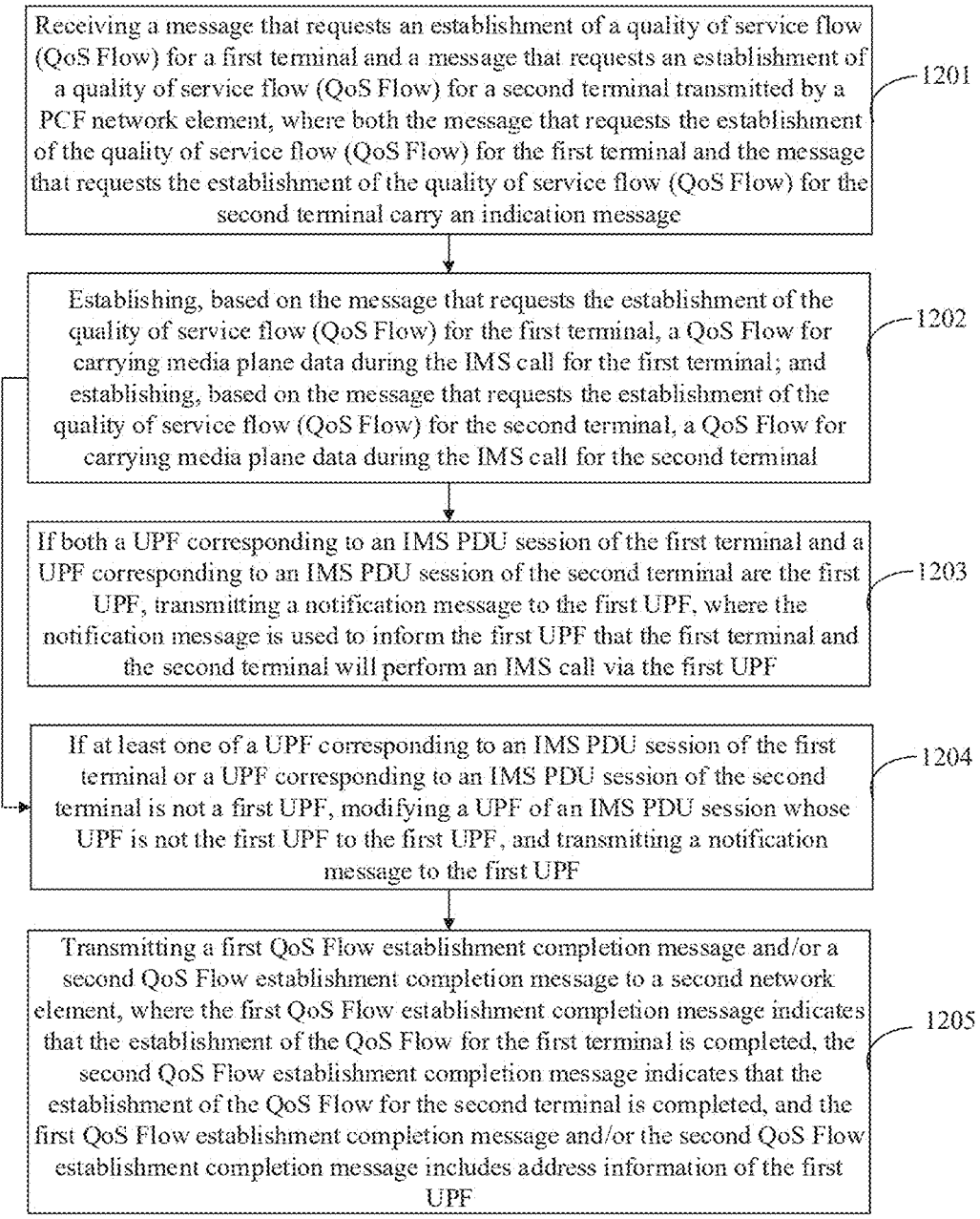
FIG. 12 is a flowchart of another communication method provided in an embodiment of the present disclosure.

FIG. 12 is a flowchart of another communication method provided in an embodiment of the present disclosure. It should be noted that the communication method in this embodiment is executed by a communication apparatus. It should be noted that the communication apparatus in this embodiment may be implemented by software and/or hardware. Among them, the communication apparatus may be a third network element, or it may be configured in the third network element. Among them, in this embodiment, an example is taken where the communication method is executed by the third network element for illustrative purposes.

As shown in FIG. 12, the communication method may include the following steps.

Step 1201: receiving a message that requests an establishment of a quality of service flow (QoS Flow) for a first terminal and/or a message that requests an establishment of a quality of service flow (QoS Flow) for a second terminal transmitted by a second network element, where both the message that requests the establishment of the quality of service flow (QoS Flow) for the first terminal and the message that requests the establishment of the quality of service flow (QoS Flow) for the second terminal carry an indication message.

Among them, the indication message is used to indicate that a condition for the first terminal and the second terminal to perform an IMS call via a satellite is met.

Among them, both the first terminal and the second terminal are connected to the satellite.

Among them, the satellite hosts a first UPF.

Step 1202: establishing, based on the message that requests the establishment of the quality of service flow (QoS Flow) for the first terminal, a QoS Flow for carrying media plane data during the IMS call for the first terminal; and establishing, based on the message that requests the establishment of the quality of service flow (QoS Flow) for the second terminal, a QoS Flow for carrying media plane data during the IMS call for the second terminal.

In an embodiment of the present disclosure, the message that requests the establishment of the quality of service flow (QoS Flow) for the first terminal and/or the message that requests the establishment of the quality of service flow (QoS Flow) for the second terminal may further carry a call mode of the IMS call. The call mode is an IMS voice call or an IMS video call.

In the case where the call mode is the IMS voice call, the third network element may establish, based on the message that requests the establishment of the quality of service flow (QoS Flow) for the first terminal, a QoS Flow for carrying voice data during the IMS voice call for the first terminal, and the third network element may also establish, based on the message that requests the establishment of the quality of service flow (QoS Flow) for the second terminal, a QoS Flow for carrying voice data during the IMS voice call for the second terminal.

Among them, a 5G quality of service identifier (5G QoS identifier. 5QI) of a quality of service flow (QoS Flow) for carrying the voice data is equal to 1. That is, a QoS Flow with 5QI=1 may be established and the voice data may be carried over the QoS Flow.

In the case where the call mode is the IMS video call, the third network element may establish, based on the message that requests the establishment of the quality of service flow (QoS Flow) for the first terminal, a QoS Flow for carrying video data during the IMS video call for the first terminal, and the third network element may also establish, based on the message that requests the establishment of the quality of service flow (QoS Flow) for the second terminal, a QoS Flow for carrying video data during the IMS video call for the second terminal.

Among them, a 5G quality of service identifier (5G QoS identifier. 5QI) of a quality of service flow (QoS Flow) for carrying the video data is equal to 2. That is, a QoS Flow with 5QI=2 may be established and the video data may be carried over the QoS Flow.

Step 1203, if both a UPF corresponding to an IMS PDU session of the first terminal and a UPF corresponding to an IMS PDU session of the second terminal are the first UPF, transmitting a notification message to the first UPF, where the notification message is used to inform the first UPF that the first terminal and the second terminal will perform an IMS call via the first UPF.

Step 1204, if at least one of the UPF corresponding to the IMS PDU session of the first terminal or the UPF corresponding to the IMS PDU session of the second terminal is not the first UPF, modifying a UPF of an IMS PDU session whose UPF is not the first UPF to the first UPF, and transmitting a notification message to the first UPF.

Step 1205, transmitting a first QoS Flow establishment completion message and/or a second QoS Flow establishment completion message to the second network element, where the first QoS Flow establishment completion message indicates that the establishment of the QoS Flow for the first terminal is completed, the second QoS Flow establishment completion message indicates that the establishment of the QoS Flow for the second terminal is completed, and the first QoS Flow establishment completion message and/or the second QoS Flow establishment completion message includes address information of the first UPF.

Among them, the first QoS Flow establishment completion message serves as a response to the message that requests the establishment of the quality of service flow (QoS Flow) for the first terminal, that is, the first QoS Flow establishment completion message is a response message for the message that requests the establishment of the quality of service flow (QoS Flow) for the first terminal.

It should be noted that for the processing operation(s) performed by the second network element after receiving the first QoS Flow establishment completion message, reference may be made to related description in other embodiments, which will not be repeated here.

Among them, the second QoS Flow establishment completion message serves as a response to the message that requests the establishment of the quality of service flow (QoS Flow) for the second terminal, that is, the second QoS Flow establishment completion message is a response message for the message that requests the establishment of the quality of service flow (QoS Flow) for the second terminal.

Among them, it should be noted that for the processing operation(s) performed by the second network element after receiving the second QoS Flow establishment completion message, reference may be made to related description in other embodiments, which will not be repeated here.

Based on the aforementioned description, it can be seen that in this embodiment, a first QoS Flow establishment completion message and/or a second QoS Flow establishment completion message that carries address information of a first UPF is transmitted to a second network element, so that the second network element may transmit the address information of the first UPF to a first terminal and a second terminal, thereby enabling the first terminal and the second terminal to perform an IMS call based on the address information of the first UPF.

Figure 13:
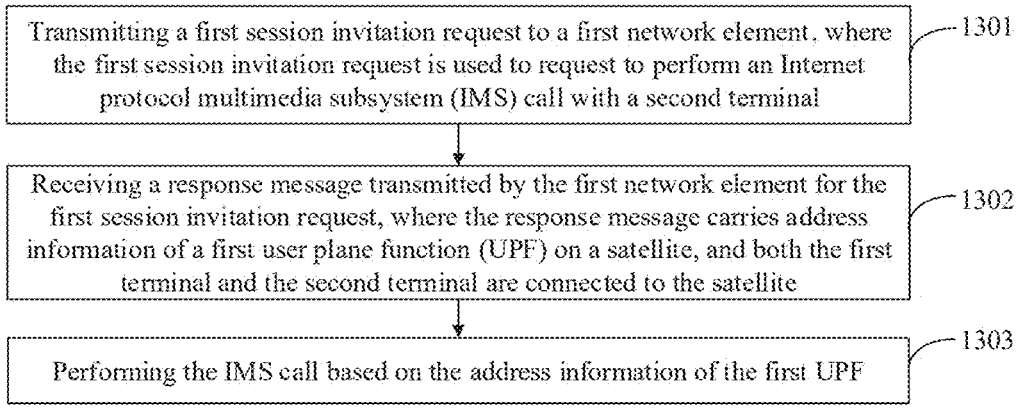
FIG. 13 is a flowchart of another communication method provided in an embodiment of the present disclosure.

FIG. 13 is a flowchart of another communication method provided in an embodiment of the present disclosure. It should be noted that the communication method in this embodiment is executed by a communication apparatus. It should be noted that the communication apparatus in this embodiment may be implemented by software and/or hardware. Among them, the communication apparatus may be a first terminal, or it may be configured in the first terminal. Among them, in this embodiment, an example is taken where the communication method is executed by the first terminal for illustrative purposes.

As shown in FIG. 13, the communication method may include the following steps.

Step 1301, transmitting a first session invitation request to a first network element, where the first session invitation request is used to request to perform an Internet protocol multimedia subsystem (IMS) call with a second terminal.

In this embodiment, the first session invitation request may carry information such as identification information of the second terminal, an IP address of the first terminal, a port number of the first terminal, and a session description protocol (Session Description Protocol. SDP).

As an example, the first session invitation request in this example may be an SIP INVITE message.

Step 1302: receiving a response message transmitted by the first network element for the first session invitation request, where the response message carries address information of a first user plane function (UPF) on a satellite, and both the first terminal and the second terminal are connected to the satellite.

In an embodiment of the present disclosure, in order to enable the first network element to conveniently obtain location information of the first terminal, and to enable the first network element to determine whether the first terminal and the second terminal are connected to the same satellite based on the location information of the first terminal and the location information of the second terminal, the first session invitation request may further carry the location information of the first terminal.

In an embodiment of the present disclosure, in order to enable the first network element to conveniently obtain location information of the first terminal, and to enable the first network element to determine whether the first terminal and the second terminal are connected to the same satellite based on the location information of the first terminal and the location information of the second terminal, the first session invitation request may further carry the location information of the first terminal when the first terminal detects that it is connected to the satellite.

In an embodiment of the present disclosure, in order to enable the first network element to conveniently obtain location information of the first terminal, and to enable the first network element to determine whether the first terminal and the second terminal are connected to the same satellite based on the location information of the first terminal and the location information of the second terminal, the first session invitation request may also carry the location information of the first terminal when the first terminal detects that it is connected to a base station on the satellite.

In an embodiment of the present disclosure, the location information of the first terminal may include at least one of: cell identification information of a cell where the first terminal is located, a base station identity of a base station to which the first terminal is connected, or access network type information corresponding to the first terminal.

In an embodiment of the present disclosure, the location information of the first terminal is used by the first network element to determine whether the first terminal and the second terminal are connected to the same satellite.

Among them, it should be noted that for a processing procedure executed by the first network element after receiving the first session invitation request, reference may be made to related description in other embodiments, which will not be repeated here.

Step 1303, performing the IMS call based on the address information of the first UPF.

In this embodiment, after receiving the response message, the first terminal may determine, based on the address information of the first UPF carried in the response message, that current media plane address information is the address information of the first UPF. Correspondingly, the first terminal may subsequently perform the IMS call based on the address information of the first UPF. Specifically, the first terminal may transmit media plane data during the IMS call based on the address information of the first UPF.

Based on the aforementioned description, it can be seen that in this embodiment, a first terminal can easily obtain address information of a first UPF on a satellite from a response message from a first network element for a first session invitation request. Therefore, the first terminal may perform an IMS call based on this address information, thereby realizing direct forwarding of media plane data during the IMS call via the satellite, reducing the transmission path over a satellite network between the first terminal and the second terminal during the IMS call, reducing the transmission delay of the IMS call between the first terminal and the second terminal over a satellite communication network, and improving the communication efficiency between the two terminals.

Figure 14:
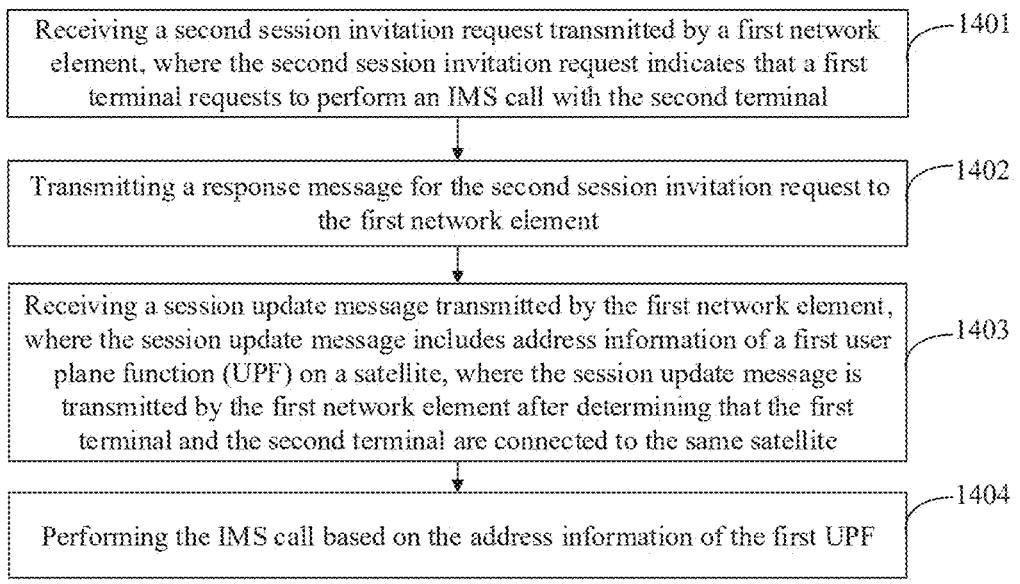
FIG. 14 is a flowchart of another communication method provided in an embodiment of the present disclosure.

FIG. 14 is a flowchart of another communication method provided in an embodiment of the present disclosure. It should be noted that the communication method in this embodiment is executed by a communication apparatus. It should be noted that the communication apparatus in this embodiment may be implemented by software and/or hardware. Among them, the communication apparatus may be a second terminal, or it may be configured in the second terminal. Among them, in this embodiment, an example is taken where the communication method is executed by the second terminal for illustrative purposes.

As shown in FIG. 14, the communication method may include the following steps.

Step 1401, receiving a second session invitation request transmitted by a first network element, where the second session invitation request indicates that a first terminal requests to perform an IMS call with the second terminal.

As an example, the second session invitation request may be transmitted by the first network element after receiving a first session invitation request transmitted by the first terminal.

Among them, the first session invitation request and the second session invitation request in this example may be the same or different. As an example, the second session invitation request may be obtained by the first network element as it processes the first session invitation request.

Among them, for the processing procedure executed by the first network element after receiving the first session invitation request, reference may be made to related description in other embodiments, which will not be repeated here.

For the information carried in the first session invitation request, reference may be made to related description in other embodiments.

Step 1402: transmitting a response message for the second session invitation request to the first network element.

In an embodiment of the present disclosure, in order to enable the first network element to conveniently obtain location information of the second terminal, and to enable the first network element to determine whether the first terminal and the second terminal are connected to the same satellite based on the location information of the second terminal, the response message in this embodiment may actively carry the location information of the second terminal.

As an example, when the second terminal detects that it is connected to the satellite, it may carry the location information of the second terminal in the response message.

As an example, when the second terminal detects that it is connected to a base station on the satellite, it may carry the location information of the second terminal in the response message.

In an embodiment of the present disclosure, the location information of the second terminal is used by the first network element to determine whether the first terminal and the second terminal are connected to the same satellite.

Step 1403: receiving a session update message transmitted by the first network element, where the session update message includes address information of a first user plane function (UPF) on a satellite, where the session update message is transmitted by the first network element after determining that the first terminal and the second terminal are connected to the same satellite.

In at least one embodiment, the session update message may be an updated first session invitation request.

Among them, the updated first session invitation request includes address information of the first UPF, and the updated first session invitation request is obtained by inserting the address information of the first UPF into the first session invitation request.

Among them, the address information of the first UPF on the satellite is forwarded by the third network element to the first network element through the second network element.

For the specific process of obtaining the address information of the first UPF on the satellite by the first network element, reference may be made to related description in other embodiments, which will not be repeated here.

Step 1404, performing the IMS call based on the address information of the first UPF.

In this embodiment, after receiving the session update message, the second terminal may determine, based on the address information of the first UPF carried in the session update message, that current media plane address information is the address information of the first UPF. Correspondingly, the second terminal may perform the IMS call based on the address information of the first UPF. Specifically, the second terminal may transmit media plane data during the IMS call based on the address information of the first UPF.

Based on the aforementioned description, it can be seen that in this embodiment, a second terminal can easily obtain address information of a first UPF on a satellite from a session update message transmitted by a first network element. Therefore, the second terminal may perform an IMS call based on this address information, thereby realizing direct forwarding of media plane data during the IMS call via the satellite, reducing the transmission path over a satellite network between the first terminal and the second terminal during the IMS call, reducing the transmission delay of the IMS call between the first terminal and the second terminal over a satellite communication network, and improving the communication efficiency between the two terminals.

Figure 15:
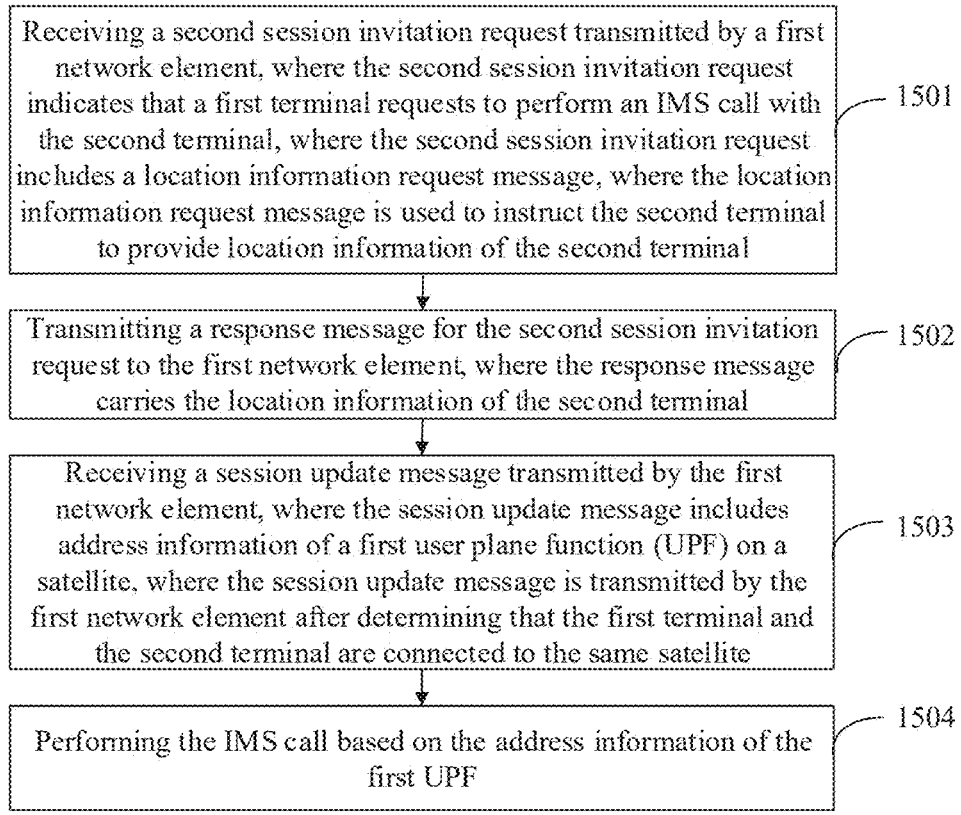
FIG. 15 is a flowchart of another communication method provided in an embodiment of the present disclosure.

FIG. 15 is a flowchart of another communication method provided in an embodiment of the present disclosure. It should be noted that the communication method in this embodiment is executed by a communication apparatus. It should be noted that the communication apparatus in this embodiment may be implemented by software and/or hardware. Among them, the communication apparatus may be a second terminal, or it may be configured in the second terminal. Among them, in this embodiment, an example is taken where the communication method is executed by the second terminal for illustrative purposes.

As shown in FIG. 15, the communication method may include the following steps.

Step 1501, receiving a second session invitation request transmitted by a first network element, where the second session invitation request indicates that a first terminal requests to perform an IMS call with the second terminal, where the second session invitation request includes a location information request message, where the location information request message is used to instruct the second terminal to provide location information of the second terminal.

Step 1502, transmitting a response message for the second session invitation request to the first network element, where the response message carries the location information of the second terminal.

Step 1503: receiving a session update message transmitted by the first network element, where the session update message includes address information of a first user plane function (UPF) on a satellite, where the session update message is transmitted by the first network element after determining that the first terminal and the second terminal are connected to the same satellite.

Step 1504, performing the IMS call based on the address information of the first UPF.

Based on the aforementioned description, it can be seen that in this embodiment, a second terminal can easily obtain address information of a first UPF on a satellite from a session update message transmitted by a first network element. Therefore, the second terminal may perform an IMS call based on this address information, thereby realizing direct forwarding of media plane data during the IMS call via the satellite, reducing the transmission path over a satellite network between the first terminal and the second terminal during the IMS call, reducing the transmission delay of the IMS call between the first terminal and the second terminal over a satellite communication network, and improving the communication efficiency between the two terminals.

Figure 16:
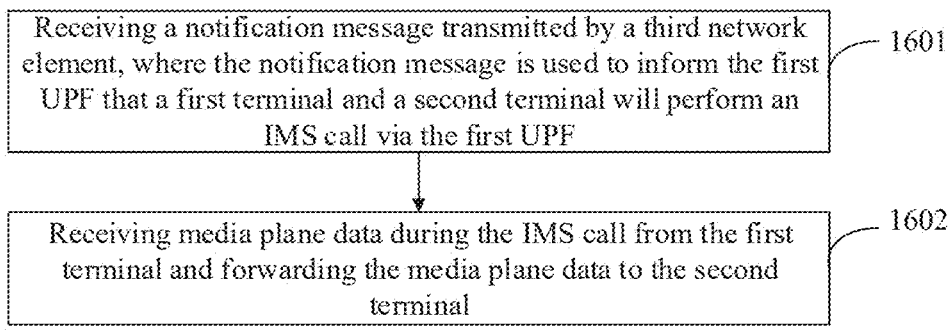
FIG. 16 is a flowchart of another communication method provided in an embodiment of the present disclosure.

FIG. 16 is a flowchart of another communication method provided in an embodiment of the present disclosure. It should be noted that the communication method in this embodiment is executed by a communication apparatus. It should be noted that the communication apparatus in this embodiment may be implemented by software and/or hardware. Among them, the communication device can be a first user plane function (UPF) on a satellite, or it may be configured in the first user plane function (UPF) of the satellite. Among them, in this embodiment, an example is taken where the communication method is executed by the first user plane function (UPF) of the satellite for illustrative purposes.

As shown in FIG. 16, the communication method may include the following steps.

Step 1601: receiving a notification message transmitted by a third network element, where the notification message is used to inform the first UPF that a first terminal and a second terminal will perform an IMS call via the first UPF.

Among them, it should be noted that for the processing procedure executed by the third network element before transmitting the notification message, reference may be made to related description in other embodiments, which will not be repeated here.

Among them, it should be noted that in this example, the first terminal and the second terminal are connected to the satellite, that is, the first terminal and the second terminal are connected to the same satellite.

In an embodiment of the present disclosure, the satellite may also include a base station. As an example, the first terminal and the second terminal may connect to the base station on the satellite.

In an embodiment of the present disclosure, in order to enable the first UPF to obtain identification information of the first terminal and identification information of the second terminal, and to enable the first UPF to establish a binding relationship between the identification information of the two terminals based on the identification information of the first terminal and the identification information of the second terminal, and forward media plane data during the IMS call between the first terminal and the second terminal based on the binding relationship, the notification message in this embodiment may further include the identification information of the first terminal and the identification information of the second terminal.

Among them, the identification information may be an IP address, an international mobile subscriber identity (International Mobile Subscriber Identity, IMSI) number, and/or other information that can be used to identify the terminal, such as, a subscription permanent identity (Subscription Permanent Identity, SUPI).

Step 1602: receiving media plane data during the IMS call from the first terminal and forwarding the media plane data to the second terminal.

In an embodiment of the present disclosure, step 1602 may further include the reception of media plane data during the IMS call from the second terminal and the forwarding of the media plane data to the first terminal.

In an example of the present disclosure, the first UPF may include all or a part of functions of a session border controller (SBC), such as, media resource management, QoS policy control, security functions, and data encryption.

Based on the aforementioned description, it can be seen that in this embodiment, a first UPF can know through a notification message that a first terminal and a second terminal will perform an IMS call via the first UPF, and forward media plane data during the IMS call between the first terminal and the second terminal. The media plane data during the IMS call between the first terminal and the second terminal may be directly forwarded via the first UPF of the satellite, thereby reducing the transmission path over a satellite network between the first terminal and the second terminal during the IMS call, reducing the transmission delay of the IMS call between the first terminal and the second terminal over a satellite communication network, and improving the communication efficiency between the two terminals.

Figure 17:
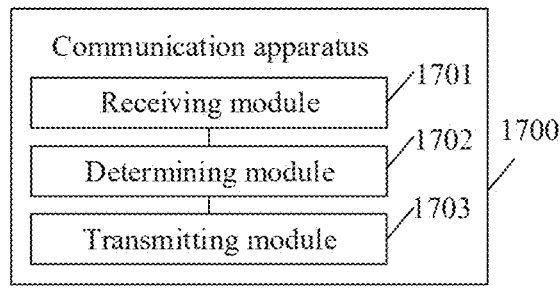
FIG. 17 is a schematic structural diagram of a communication apparatus provided in an embodiment of the present disclosure.

FIG. 17 is a schematic structural diagram of a communication apparatus provided in an embodiment of the present disclosure. It should be noted that the communication apparatus in this embodiment is applied in a first network element.

As shown in FIG. 17, the communication apparatus 1700 may include:
- a receiving module 1701, configured to receive a first session invitation request from a first terminal, where the first session invitation request is used to request to perform an Internet protocol multimedia subsystem (IMS) call with a second terminal;
- a determining module 1702, configured to determine whether the first terminal and the second terminal are connected to the same satellite, where the satellite hosts a first user plane function (UPF);
- a transmitting module 1703, configured to transmit an indication message to a second network element upon determining that the first terminal and the second terminal are connected to the same satellite, where the indication message is used to indicate that a condition for the first terminal and the second terminal to perform the IMS call via the satellite is met.

In an embodiment of the present disclosure, the transmitting module 1703 is specifically configured to transmit a message that triggers an establishment of a quality of service flow (QoS Flow) for the first terminal and/or a message that triggers an establishment of a quality of service flow (QoS Flow) for the second terminal to the second network element, where the message that triggers the establishment of the quality of service flow (QoS Flow) for the first terminal and/or the message that triggers the establishment of the quality of service flow (QoS Flow) for the second terminal carry the indication message.

In an embodiment of the present disclosure, the indication message includes identification information of the first terminal and identification information of the second terminal.

Among them, the identification information may be an IP address, an international mobile subscriber identity (International Mobile Subscriber Identity, IMSI) number, and/or other information that can be used to identify the terminal, such as, a subscription permanent identity (Subscription Permanent Identity, SUPI).

In an embodiment of the present disclosure, the determining module 1702 is specifically configured to:
  determine whether the first terminal and the second terminal are connected to the same satellite based on location information of the first terminal and location information of the second terminal.

In an embodiment of the present disclosure, the first session invitation request includes the location information of the first terminal, and the transmitting module 1703 is further configured to transmit a second session invitation request to the second terminal; the receiving module 1701 is further configured to receive a response message from the second terminal for the second session invitation request, where the response message includes the location information of the second terminal.

In an embodiment of the present disclosure, if the first session invitation request includes the location information of the first terminal, the transmitting module 1703 is further configured to transmit a second session invitation request to the second terminal, where the second session invitation request includes a location information request message, where the location information request message is used to instruct the second terminal to provide the location information of the second terminal;

the receiving module 1701 is further configured to receive a response message from the second terminal, where the response message includes the location information of the second terminal.

In an embodiment of the present disclosure, the apparatus may further include a first processing module. The first processing module is configured to:

if the first session invitation request does not include the location information of the first terminal and/or the response message does not include the location information of the second terminal, transmit a location query request to the second network element, where the location query request is used to request to query the location information of the first terminal and/or the location information of the second terminal;

receive a location query response message from the second network element, where the location query response message includes the location information of the first terminal and/or the location information of the second terminal.

In an embodiment of the present disclosure, the apparatus further includes a second processing module. The second processing module is configured to:

transmit a first location query request to the second network element, where the first location query request is used to request to query the location information of the first terminal;

receive a first location query response message from the second network element for the first location query request, where the first location query response message includes the location information of the first terminal;

transmit a second location query request to the second network element, where the second location query request is used to request to query the location information of the second terminal;

receive a second location query response message from the second network element for the second location query request, where the second location query response message includes the location information of the second terminal.

In an embodiment of the present disclosure, the location information of the first terminal includes at least one of: cell identification information of a cell where the first terminal is located, a base station identity of a base station to which the first terminal is connected, access network type information corresponding to the first terminal, or a satellite identification of a satellite to which the first terminal is connected;

the location information of the second terminal includes at least one of: cell identification information of a cell where the second terminal is located, a base station identity of a base station to which the second terminal is connected, access network type information corresponding to the second terminal, or a satellite identification of a satellite to which the second terminal is connected.

In an embodiment of the present disclosure, the message that triggers the establishment of the quality of service flow (QoS Flow) for the first terminal and/or the message that triggers the establishment of the quality of service flow (QoS Flow) for the second terminal further carries a call mode of the IMS call. The call mode is an IMS voice call or an IMS video call.

In an embodiment of the present disclosure, the receiving module 1701 is further configured to receive a first QoS Flow establishment completion message transmitted by the second network element, where the first QoS Flow establishment completion message indicates that the establishment of the QoS Flow for the first terminal is completed, and the first QoS Flow establishment completion message carries address information of the first UPF;

the transmitting module 1703 is further configured to transmit the address information of the first UPF to the first terminal;

the receiving module 1701 is further configured to receive a second QoS Flow establishment completion message transmitted by the second network element, where the second QoS Flow establishment completion message indicates that the establishment of the QoS Flow for the second terminal is completed, and the second QoS Flow establishment completion message carries the address information of the first UPF;

the transmitting module 1703 is further configured to transmit the address information of the first UPF to the second terminal.

It should be noted that the aforementioned explanation of the communication method embodiments is also applicable to the communication apparatus in this embodiment, which will not be repeated here.

The communication apparatus provided in the embodiment of the present disclosure determines whether a first terminal and a second terminal are connected to the same satellite when the first terminal requests to perform an IMS call with the second terminal. The satellite hosts a first UPF. The first network element transmits an indication message to a second network element when it determines that the first terminal and the second terminal are connected to the same satellite. The indication message is used to indicate that a condition for the first terminal and the second terminal to perform the IMS call via the satellite is met. In this way, the second network element can easily determine through the indication message that the condition for the first terminal and the second terminal to perform the IMS call via the satellite is met, thereby enabling the first terminal and the second terminal to directly perform the IMS call via the satellite, reducing the transmission delay of the IMS call between the first terminal and the second terminal over a satellite communication network, and improving the communication efficiency between the two terminals.

Figure 18:
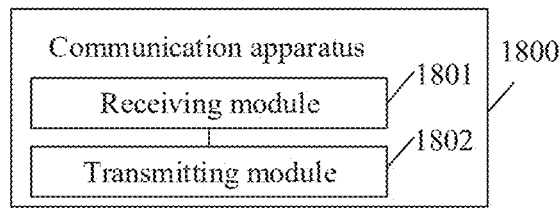
FIG. 18 is a schematic structural diagram of a communication apparatus provided in an embodiment of the present disclosure.

FIG. 18 is a schematic structural diagram of a communication apparatus provided in an embodiment of the present disclosure. It should be noted that the communication apparatus in this embodiment is applied in a second network element.

As shown in FIG. 18, the communication apparatus 1800 may include:

a receiving module 1801, configured to receive an indication message transmitted by a first network element, where the indication message is used to indicate that a condition for a first terminal and a second terminal to perform an IMS call via a satellite is met, where the satellite hosts a first user plane function (UPF), and the indication message is transmitted by the first network element after determining that the first terminal and the second terminal are connected to the same satellite;

a transmitting module 1802, configured to transmit the indication message to a third network element.

Among them, both the first terminal and the second terminal are connected to the satellite.

In an embodiment of the present disclosure, the transmitting module 1802 is specifically configured to transmit a message that requests an establishment of a quality of service flow (QoS Flow) for the first terminal and a message that requests an establishment of a quality of service flow (QoS Flow) for the second terminal to the third network element, where both the message that requests the establishment of the quality of service flow (QoS Flow) for the first terminal and the message that requests the establishment of the quality of service flow (QoS Flow) for the second terminal carry the indication message.

In an embodiment of the present disclosure, the message that requests the establishment of the quality of service flow (QoS Flow) for the first terminal and/or the message that requests the establishment of the quality of service flow (QoS Flow) for the second terminal further includes a call mode of the IMS call. The call mode is an IMS voice call or an IMS video call.

In an embodiment of the present disclosure, the indication message includes identification information of the first terminal and identification information of the second terminal. Among them, the identification information may be an IP address, an international mobile subscriber identity (International Mobile Subscriber Identity, IMSI) number, and/or other information that can be used to identify the terminal, such as, a subscription permanent identity (Subscription Permanent Identity, SUPI).

In an embodiment of the present disclosure, the receiving module 1801 is further configured to receive a location query request transmitted by the first network element, where the location query request is used to query location information of a target terminal;

the transmitting module 1802 is further configured to transmit a location query response message for the location query request to the first network element, where the location query response message includes the location information of the target terminal, and the target terminal is the first terminal and/or the second terminal.

In an embodiment of the present disclosure, the receiving module 1801 is further configured to receive a first QoS Flow establishment completion message and/or a second QoS Flow establishment completion message transmitted by the third network element, where the first QoS Flow establishment completion message indicates that the establishment of the QoS Flow for the first terminal is completed, the second QoS Flow establishment completion message indicates that the establishment of the QoS Flow for the second terminal is completed, and the first QoS Flow establishment completion message and/or the second QoS Flow establishment completion message includes address information of the first UPF;

the transmitting module 1802 is further configured to transmit the first QoS Flow establishment completion message and/or the second QoS Flow establishment completion message to the first network element.

It should be noted that the aforementioned explanation of the communication method embodiments is also applicable to the communication apparatus in this embodiment, which will not be repeated here.

The communication apparatus provided in the embodiment of the present disclosure receives an indication message transmitted by a first network element and forwards indication message to a third network element, so that the third network element can easily know through the indication message that a condition for the first terminal and the second terminal to perform an IMS call via a satellite is met, thereby enabling the first terminal and the second terminal to directly perform the IMS call via the satellite, reducing the transmission delay of the IMS call between the first terminal and the second terminal over a satellite communication network, and improving the communication efficiency between the two terminals.

Figure 19:
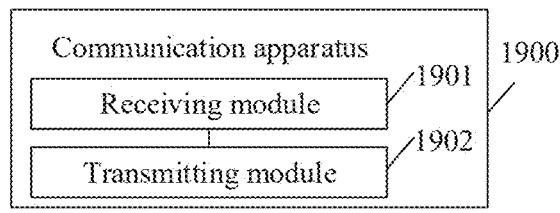
FIG. 19 is a schematic structural diagram of a communication apparatus provided in an embodiment of the present disclosure.

FIG. 19 is a schematic structural diagram of a communication apparatus provided in an embodiment of the present disclosure. It should be noted that the communication apparatus in this embodiment is applied in a third network element.

As shown in FIG. 19, the communication apparatus 1900 may include:

a receiving module 1901, configured to receive an indication message transmitted by the second network element, where the indication message is used to indicate that a condition for a first terminal and a second terminal to perform an IMS call via a satellite is met, where the satellite hosts a first user plane function (UPF);

a transmitting module 1902, configured to transmit a notification message to the first UPF, where the notification message is used to inform the first UPF that the first terminal and the second terminal will perform the IMS call via the first UPF.

In an embodiment of the present disclosure, the apparatus may further include a modifying module. The modifying module is configured to modify a UPF of an IMS PDU session whose UPF is not the first UPF to the first UPF, if at least one of a UPF corresponding to an IMS PDU session of the first terminal or a UPF corresponding to an IMS PDU session of the second terminal is not the first UPF.

In an embodiment of the present disclosure, the receiving module 1901 is specifically configured to receive a message that requests an establishment of a quality of service flow (QoS Flow) for the first terminal and/or a message that requests an establishment of a quality of service flow (QoS Flow) for the second terminal transmitted by the second network element, where the message that requests the establishment of the quality of service flow (QoS Flow) for the first terminal and/or the message that requests the establishment of the quality of service flow (QoS Flow) for the second terminal includes the indication message.

In an embodiment of the present disclosure, the message that requests the establishment of the quality of service flow (QoS Flow) for the first terminal and/or the message that requests the establishment of the quality of service flow (QoS Flow) for the second terminal further includes a call mode of the IMS call. The call mode is an IMS voice call or an IMS video call.

In an embodiment of the present disclosure, both of the notification message and the indication message include identification information of the first terminal and identification information of the second terminal. Among them, the identification information may be an IP address, an interna- tional mobile subscriber identity (International Mobile Subscriber Identity, IMSI) number, and/or other information that can be used to identify the terminal, such as, a subscription permanent identity (Subscription Permanent Identity, SUPI).

In an embodiment of the present disclosure, the transmitting module 1902 is further configured to:

- transmit a first QoS Flow establishment completion message and/or a second QoS Flow establishment completion message to the second network element, where the first QoS Flow establishment completion message indicates that the establishment of the QoS Flow for the first terminal is completed, the second QoS Flow establishment completion message indicates that the establishment of the QoS Flow for the second terminal is completed, and the first QoS Flow establishment completion message and/or the second QoS Flow establishment completion message includes address information of the first UPF.

It should be noted that the aforementioned explanation of the communication method embodiments is also applicable to the communication apparatus in this embodiment, which will not be repeated here.

The communication apparatus provided in the embodiment of the present disclosure receives an indication message transmitted by a second network element, determines through the indication message that a condition for a first terminal and a second terminal to perform an IMS call via a satellite is met, and transmits a notification message to a first UPF in a case where a UPF corresponding to an IMS PDU session of the first terminal and a UPF corresponding to an IMS PDU session of the second terminal are the first UPF. In this way, the first UPF knows through the notification message that the first terminal and the second terminal will perform the IMS call via the first UPF, thereby enabling the first UPF of the satellite to directly forward media plane data during the IMS call between the first terminal and the second terminal, reducing the transmission delay of the IMS call between the first terminal and the second terminal over a satellite communication network, and improving the communication efficiency between the two terminals.

Figure 20:
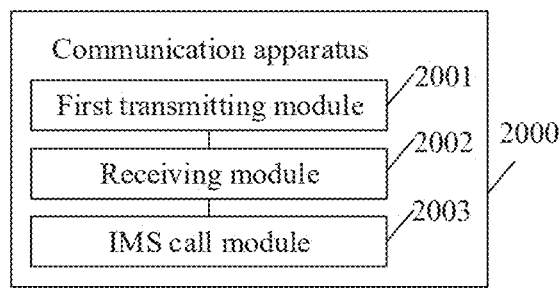
FIG. 20 is a schematic structural diagram of a communication apparatus provided in an embodiment of the present disclosure.

FIG. 20 is a schematic structural diagram of a communication apparatus provided in an embodiment of the present disclosure. It should be noted that the communication apparatus in this embodiment is applied to a first terminal.

As shown in FIG. 20, the communication apparatus 2000 may include:

- a first transmitting module 2001, configured to transmit a first session invitation request to a first network element, where the first session invitation request is used to request to perform an Internet protocol multimedia subsystem (IMS) call with a second terminal;
- a receiving module 2002, configured to receive a response message transmitted by the first network element for the first session invitation request, where the response message carries address information of a first user plane function (UPF) on a satellite, where the first terminal and the second terminal are connected to the satellite;
- an IMS call module 2003, configured to perform the IMS call based on the address information of the first UPF.

In an embodiment of the present disclosure, upon detecting that the first terminal is connected to the satellite, the first session invitation request carries location information of the first terminal.

In an embodiment of the present disclosure, the location information of the first terminal includes at least one of: cell identification information of a cell where the first terminal is located, a base station identity of a base station to which the first terminal is connected, access network type information corresponding to the first terminal, or a satellite identification of a satellite to which the first terminal is connected.

It should be noted that the aforementioned explanation of the communication method embodiments is also applicable to the communication apparatus in this embodiment, which will not be repeated here.

The communication apparatus provided in the embodiment of the present disclosure can easily obtain address information of a first UPF on a satellite from a response message from a first network element for a first session invitation request. Therefore, the first terminal may perform an IMS call based on this address information, thereby realizing forwarding of media plane data during the IMS call via the first UPF on the satellite, reducing the transmission path over a satellite network between the first terminal and the second terminal during the IMS call, reducing the transmission delay of the IMS call between the first terminal and the second terminal over a satellite communication network, and improving the communication efficiency between the two terminals.

Figure 21:
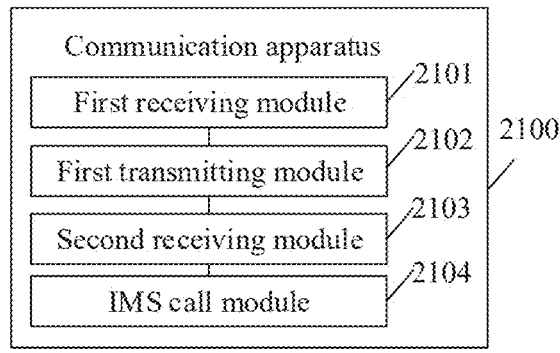
FIG. 21 is a schematic structural diagram of a communication apparatus provided in an embodiment of the present disclosure.

FIG. 21 is a schematic structural diagram of a communication apparatus provided in an embodiment of the present disclosure. It should be noted that the communication apparatus in this embodiment is applied to a second terminal.

As shown in FIG. 21, the communication apparatus 2100 may include:

- a first receiving module 2101, configured to receive a second session invitation request transmitted by a first network element, where the second session invitation request indicates that a first terminal requests to perform an IMS call with the second terminal;
- a first transmitting module 2102, configured to transmit a response message for the second session invitation request to the first network element;
- a second receiving module 2103, configured to receive a session update message transmitted by the first network element, where the session update message carries address information of a first user plane function (UPF) on a satellite, where the session update message is transmitted by the first network element after determining that the first terminal and the second terminal are connected to the same satellite;
- an IMS call module 2104, configured to perform the IMS call based on the address information of the first UPF.

In an embodiment of the present disclosure, the second session invitation request includes a location information request message, where the location information request message is used to instruct the second terminal to provide location information of the second terminal, and the response message carries the location information of the second terminal.

In an embodiment of the present disclosure, upon detecting that the second terminal is connected to the satellite, the response message carries location information of the second terminal.

In an embodiment of the present disclosure, the location information of the second terminal includes at least one of: cell identification information of a cell where the second terminal is located, a base station identity of a base station to which the second terminal is connected, access network type information corresponding to the second terminal, or a satellite identification of a satellite to which the second terminal is connected.

It should be noted that the aforementioned explanation of the communication method embodiments is also applicable to the communication apparatus in this embodiment, which will not be repeated here.

The communication apparatus provided in the embodiment of the present disclosure can easily obtain address information of a first UPF on a satellite from a session update message transmitted by a first network element. Therefore, the second terminal may perform an IMS call based on this address information, thereby realizing forwarding of media plane data during the IMS call via the first UPF on the satellite, reducing the transmission path over a satellite network between the first terminal and the second terminal during the IMS call, reducing the transmission delay of the IMS call between the first terminal and the second terminal over a satellite communication network, and improving the communication efficiency between the two terminals.

Figure 22:
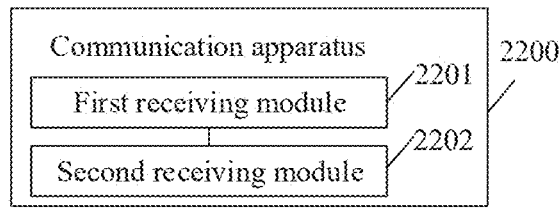
FIG. 22 is a schematic structural diagram of a communication apparatus provided in an embodiment of the present disclosure.

FIG. 22 is a schematic structural diagram of a communication apparatus provided in an embodiment of the present disclosure. Among them, it should be noted that the communication apparatus in this embodiment is applied in a first user plane function (UPF) on a satellite.

As shown in FIG. 22, the communication apparatus 2200 may include:
- a first receiving module 2201, configured to receive a notification message transmitted by a third network element, where the notification message is used to inform the first UPF that a first terminal and a second terminal will perform an IMS call via the first UPF;
- a second receiving module 2202, configured to receive media plane data during the IMS call from the first terminal and forward the media plane data to the second terminal; or receive media plane data during the IMS call from the second terminal and forward the media plane data to the first terminal.

In an embodiment of the present disclosure, the notification message carries identification information of the first terminal and identification information of the second terminal.

Among them, the identification information may be an IP address, an international mobile subscriber identity (International Mobile Subscriber Identity, IMSI) number, and/or other information that can be used to identify the terminal, such as, a subscription permanent identity (Subscription Permanent Identity, SUPI).

Among them, it should be noted that the aforementioned explanation of the communication method embodiments is also applicable to the communication apparatus in this embodiment, which will not be repeated here.

The communication apparatus provided in the embodiment of the present disclosure can know through a notification message that a first terminal and a second terminal will perform an IMS call via a first UPF, and forward media plane data during the IMS call between the first terminal and the second terminal. The media plane data during the IMS call between the first terminal and the second terminal may be directly forwarded via the first UPF of the satellite, thereby reducing the transmission path over a satellite network between the first terminal and the second terminal during the IMS call, reducing the transmission delay of the IMS call between the first terminal and the second terminal over a satellite communication network, and improving the communication efficiency between the two terminals.

Figure 23:
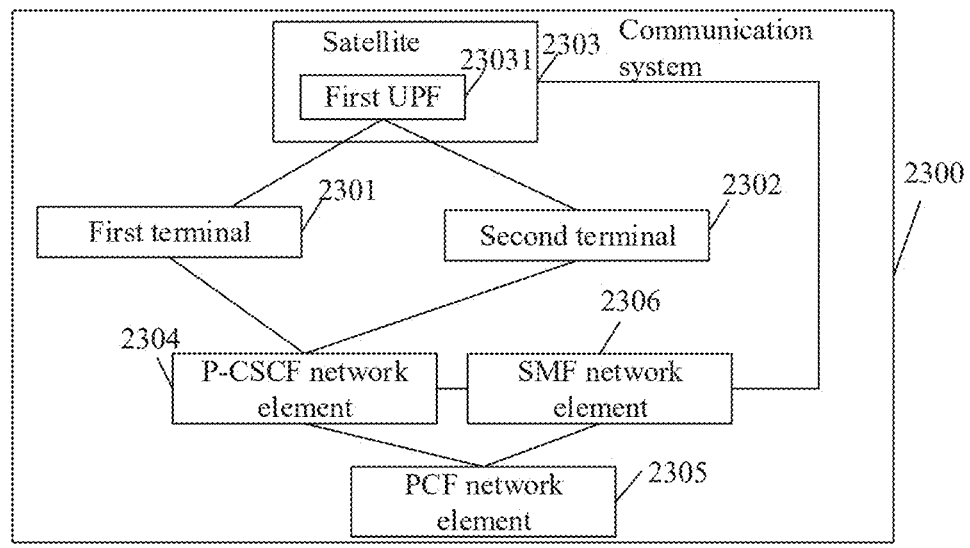
FIG. 23 is a schematic structural diagram of a communication system provided in an embodiment of the present disclosure.

FIG. 23 is a schematic structural diagram of a communication system provided in an embodiment of the present disclosure.

As shown in FIG. 23, the communication system 2300 may include a first terminal 2301, a second terminal 2302, a first user plane function (UPF) 23031 on a satellite 2303, a first network element 2304, a second network element 2305, and a third network element 2306.

The first network element 2304 is configured to implement the communication method disclosed in embodiments of a first aspect of the present disclosure.

The second network element 2305 is configured to implement the communication method disclosed in embodiments of a second aspect of the present disclosure.

The third network element 2306 is configured to implement the communication method disclosed in embodiments of a third aspect of the present disclosure.

The first terminal 2301 is configured to implement the communication method disclosed in embodiments of a fourth aspect of the present disclosure.

The second terminal 2302 is configured to implement the communication method disclosed in embodiments of a fifth aspect of the present disclosure.

The first UPF 23031 is configured to implement the communication method disclosed in embodiments of a sixth aspect of the present disclosure.

It should be noted that the aforementioned explanation of the communication method embodiments is also applicable to the communication system in this embodiment, which will not be repeated here.

According to the communication system provided in the embodiments of the present disclosure, when a first terminal requests to perform an IMS call with a second terminal, a first network element determines whether the first terminal and the second terminal are connected to the same satellite, and when it is determined that the first terminal and the second terminal are connected to the same satellite, a PCF transmits indication message to a third network element, so that the third network element knows through the indication message that a condition for the first terminal and the second terminal to perform the IMS call via a first UPF on the satellite is met, and the third network element transmits a notification message to the first UPF in a case where a UPF corresponding to an IMS PDU session of the first terminal and a UPF corresponding to an IMS PDU session of the second terminal are the first UPF. In this way, the first UPF knows through the notification message that the first terminal and the second terminal will perform the IMS call via the first UPF, thereby enabling the first UPF of the satellite to directly forward media plane data during the IMS call between the first terminal and the second terminal, reducing the transmission delay of the IMS call between the first terminal and the second terminal over a satellite communication network, and improving the communication efficiency between the two terminals.

In order to facilitate a clearer understanding of the present disclosure, an exemplary description of interactions among a first terminal, a second terminal, a first network element, a third network element, a second network element, and a first UPF on a satellite in a communication system will be provided below with reference to FIG. 23. It should be noted that in this embodiment, an example is taken where the first network element is a proxy call session control function (Proxy Call Session Control Function, P-CSCF) network element, the second network element is a policy control function (Policy Control Function, PCF) network element, and the third network element is a session management function (Session Management Function, SMF) network element for illustrative purposes.

Figure 24A:
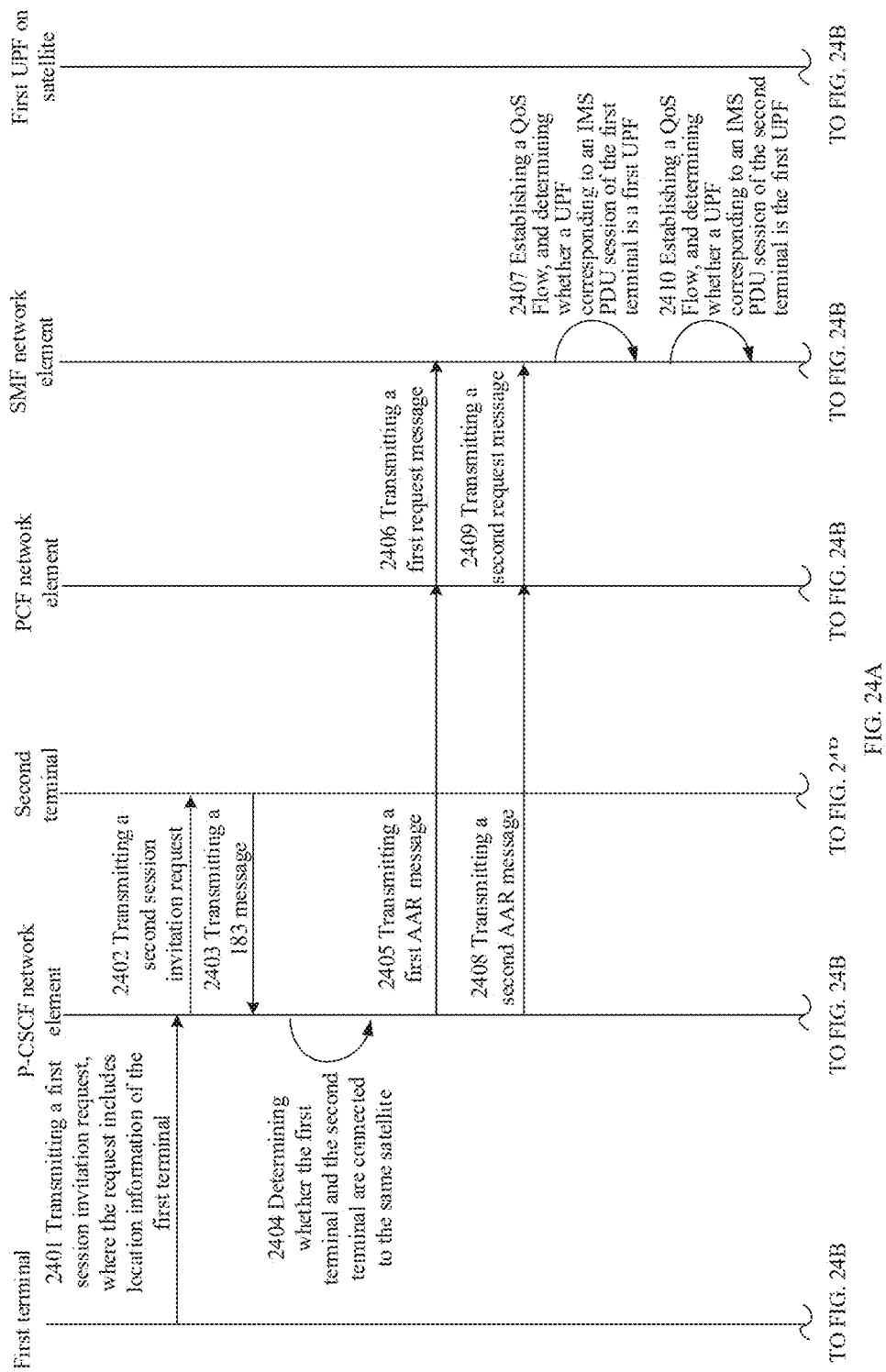
FIG. 24A-FIG. 24C are combined to form a schematic flowchart I of interactions among a first terminal, a second terminal, a P-CSCF (Proxy Call Session Control Function) network element, a PCF (Policy Control Function) network element, an SMF (Session Management Function) network element, and a first UPF on a satellite.
Figure 24B:
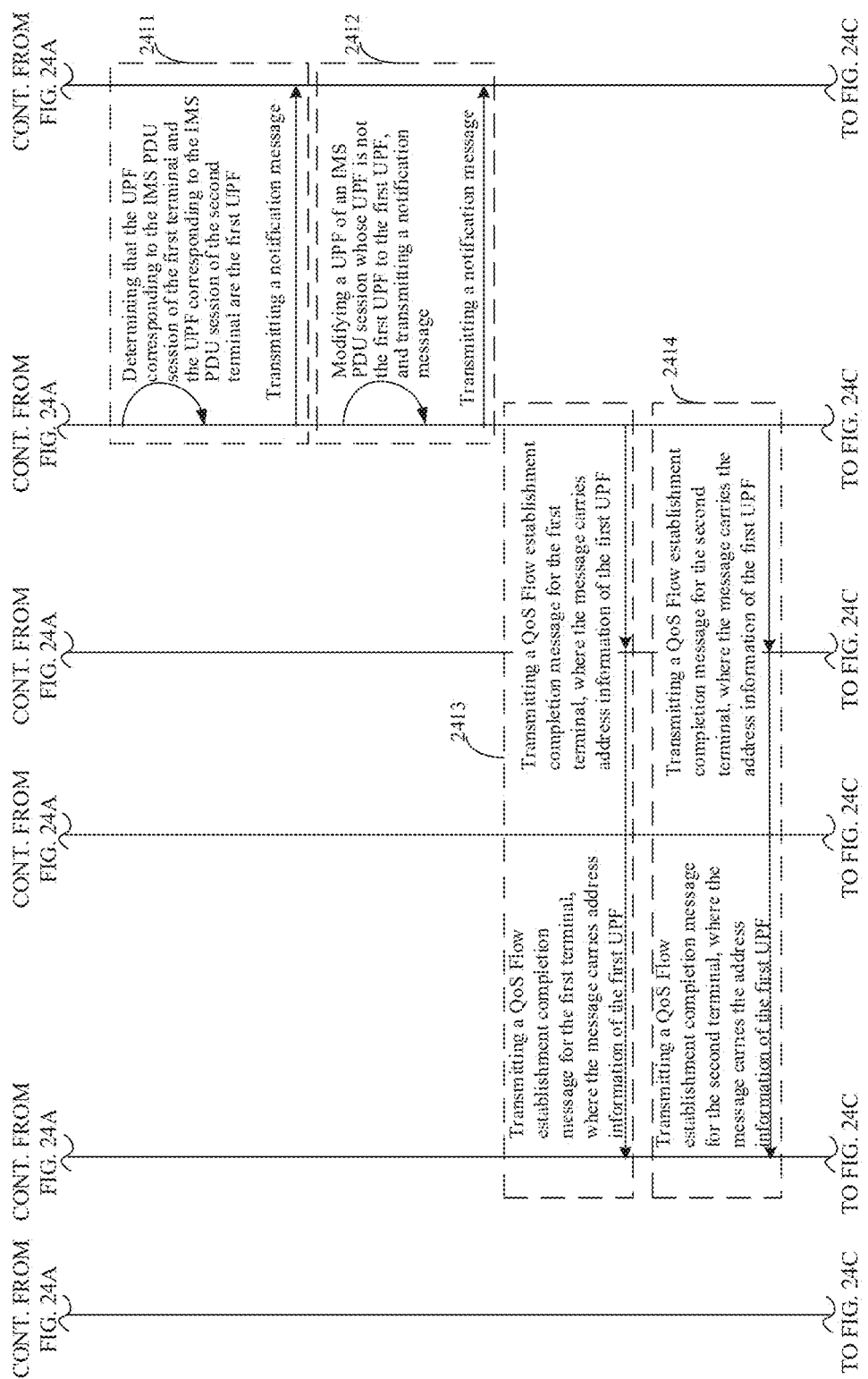
Figure 24C:
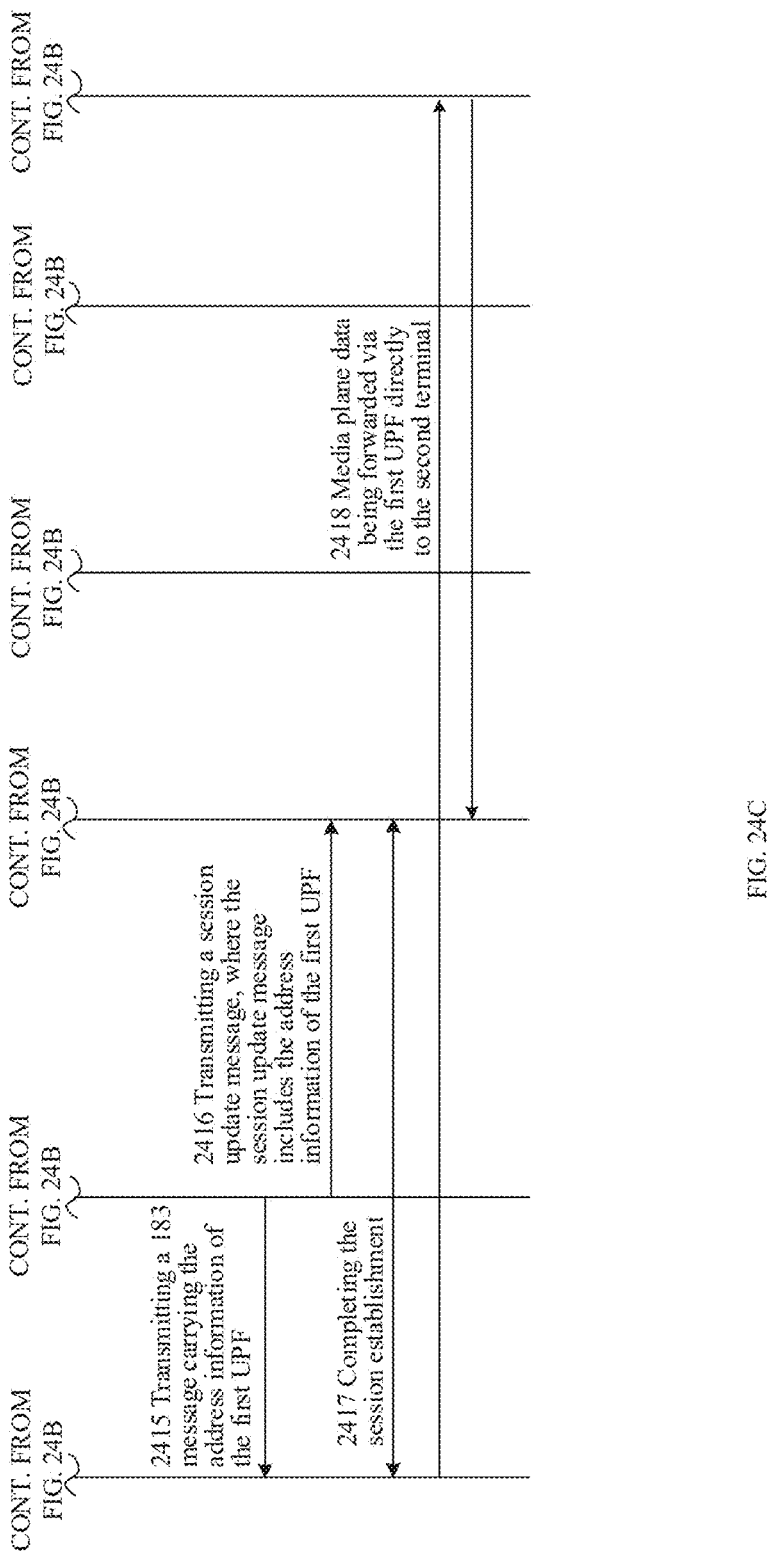

FIG. 24A-FIG. 24C are combined to form a schematic flowchart I of interactions among a first terminal, a second terminal, a P-CSCF network element, a PCF network element, an SMF network element, and a first UPF on a satellite.

As shown in FIG. 24A-FIG. 24C, the method may include following steps.

Step 2401, the first terminal transmits a first session invitation request to the P-CSCF network element.

Among them, the first session invitation request carries all or a part of following information: identification information of the second terminal, an IP address of the first terminal, a port number of the first terminal, a session description protocol (SDP), location information of the first terminal, and etc. That is, the first session invitation request may include at least one or more of the identification information of the second terminal, the IP address of the first terminal, the port number of the first terminal, the session description protocol (Session Description Protocol, SDP), or other information. That is, the first session invitation request may include at least one of the following information: the identification information of the second terminal, the IP address of the first terminal, the port number of the first terminal, and the session description protocol (Session Description Protocol, SDP).

Among them, the SDP includes a media address of the first terminal, and encoding/decoding information and a media type supported by the first terminal.

Among them, the SDP is mainly used for media negotiation before the start of the session. The media address is an address for transmitting and receiving a media stream.

In at least one embodiment, the location information of the first terminal in this example may include at least one of: cell identification information of a cell where the first terminal is located, a base station identity of a base station to which the first terminal is connected, or access network type information corresponding to the first terminal.

In at least one embodiment, the identification information may follow a format of a session initiation protocol uniform resource identifier (Session Initiation Protocol Uniform Resource Identifier, sip-uri) or a format of a telephone uniform resource identifier (Telephone Uniform Resource Identifier, tel-uri).

In at least one embodiment, the SDP further includes required bandwidth information, when this information is received by a network side, the network side determines a quality of service (Quality of Service, QoS) bandwidth required for a dedicated bearer based on this information.

Step 2402, the P-CSCF network element transmits a second session invitation request to the second terminal.

Among them, the first session invitation request and the second session invitation request in this example are the same or different.

As an example, the second session invitation request may be obtained by processing the first session invitation request.

Among them, the second session invitation request in this example further carries port information and a media plane address of a called session border controller (Session Border Controller, SBC) corresponding to the second terminal. The second session invitation request also carries SDP information.

Among them, the session boundary controller (SBC) in the present disclosure may also be referred to as an Internet protocol multimedia subsystem access gateway (IMS Access Gate Way, IMS AGW).

Step 2403, the P-CSCF network element receives a 183 message from the second terminal for the second session invitation request.

Among them, the 183 message in this example is a response message corresponding to the second session invitation request.

Among them, the 183 message may include an SDP response message, location information of the second terminal.

Among them, the SDP response message includes a media type supported by a called UE and codec information supported by the called UE.

In this example, the location information of the second terminal may include at least one of: cell identification information of a cell where the second terminal is located, a base station identity of a base station to which the second terminal is connected, or access network type information corresponding to the second terminal.

Step 2404, the P-CSCF network element checks whether the first terminal and the second terminal are connected to the same satellite based on the location information of the first terminal and the location information of the second terminal. If so, the P-CSCF network element proceeds with step 2405 and step 2408.

Among them, the satellite in this example is deployed with a first user plane function (UPF).

Step 2405, the P-CSCF network element transmits a first AAR message to the PCF network element. The first AAR message is used to trigger an establishment of a quality of service flow (QoS Flow) for carrying voice data during an IMS voice call for the first terminal. The first AAR message includes the indication message, and the indication message is used to indicate that a condition for the first terminal and the second terminal to perform an IMS call via the satellite is met.

Among them, the indication message includes identification information of the first terminal and identification information of the second terminal.

Among them, the identification information may be an IP address, an international mobile subscriber identity (International Mobile Subscriber Identity, IMSI) number, and/or other information that can be used to identify the terminal, such as, a subscription permanent identity (Subscription Permanent Identity, SUPI).

In an embodiment of the present disclosure, the first AAR message further includes a call mode of the IMS call between the first terminal and the second terminal. The call mode is a mode of calling, which is an IMS voice call or an IMS video call.

Step 2406, the PCF network element transmits a first request message to the SMF network element. The first request message is a message for establishing a quality of service flow (QoS Flow) which is used for carrying voice data during an IMS voice call for the first terminal. The first request message includes the indication message, and the indication message indicates that the condition for the first terminal and the second terminal to perform an IMS call via the satellite is met.

Among them, the indication message includes the identification information of the first terminal and the identification information of the second terminal.

Among them, the identification information may be an IP address, an international mobile subscriber identity (International Mobile Subscriber Identity, IMSI) number, and/or other information that can be used to identify the terminal, such as, a subscription permanent identity (Subscription Permanent Identity, SUPI).

Among them, a 5G quality of service identifier (5G QoS identifier, 5QI) of a quality of service flow (QoS Flow) for carrying the voice data is equal to 1. That is, a QoS Flow with 5QI=1 may be established and the voice data may be carried over the QoS Flow.

In an embodiment of the present disclosure, the first request message further includes a call mode of the IMS call between the first terminal and the second terminal. The call mode is a mode of calling, which is an IMS voice call or an IMS video call.

Step 2407, the SMF network element initiates the establishment of the QoS Flow for the first terminal based on the first request message, and checks whether a UPF corresponding to an IMS PDU session of the first terminal is the first UPF after determining, based on the indication message carried in the first request message, that the condition for the first terminal and the second terminal to perform the IMS call via the satellite is met.

For the process of establishing the QoS Flow for the first terminal, reference may be made to the description in relevant technologies, which will not be repeated here.

Step 2408, the P-CSCF network element transmits a second AAR message to the PCF network element. The second AAR message is used to trigger an establishment of a quality of service flow (QoS Flow) for carrying voice data during an IMS voice call for the second terminal. The second AAR message includes the indication message, and the indication message is used to indicate that the condition for the first terminal and the second terminal to perform the IMS call via the satellite is met.

Among them, the indication message includes the identification information of the first terminal and the identification information of the second terminal.

Among them, the identification information may be an IP address, an international mobile subscriber identity (International Mobile Subscriber Identity, IMSI) number, and/or other information that can be used to identify the terminal, such as, a subscription permanent identity (Subscription Permanent Identity, SUPI).

Step 2409, the PCF network element transmits a second request message to the SMF network element. The second request message is a message for establishing a quality of service flow (QoS Flow) which is used for carrying voice data during an IMS voice call for the second terminal. The second request message includes the indication message, and the indication message indicates that the condition for the first terminal and the second terminal to perform the IMS call via the satellite is met.

Step 2410, the SMF network element initiates the establishment of the QoS Flow for the second terminal based on the second request message, and checks whether a UPF corresponding to an IMS PDU session of the second terminal is the first UPF after determining, based on the indication message carried in the second request message, that the condition for the first terminal and the second terminal to perform the IMS call via the satellite is met.

Step 2411, upon determining that the UPF corresponding to the IMS PDU session of the first terminal and the UPF corresponding to the IMS PDU session of the second terminal are the first UPF, the SMF network element transmits a notification message to the first UPF, where the notification message is used to inform the first UPF that the first terminal and the second terminal will perform the IMS call via the first UPF.

Among them, the notification message includes the identification information of the first terminal and the identification information of the second terminal.

Among them, the identification information may be an IP address, an international mobile subscriber identity (International Mobile Subscriber Identity, IMSI) number, and/or other information that can be used to identify the terminal, such as, a subscription permanent identity (Subscription Permanent Identity, SUPI).

Step 2412, upon determining that at least one of the UPF corresponding to the IMS PDU session of the first terminal or the UPF corresponding to the IMS PDU session of the second terminal is not the first UPF, the SMF network element modifies a UPF of an IMS PDU session whose UPF is not the first UPF to the first UPF, and transmits a notification message to the first UPF, where the notification message is used to inform the first UPF that the first terminal and the second terminal will perform the IMS call via the first UPF.

Among them, the notification message includes the identification information of the first terminal and the identification information of the second terminal.

Among them, the identification information may be an IP address, an international mobile subscriber identity (International Mobile Subscriber Identity, IMSI) number, and/or other information that can be used to identify the terminal, such as, a subscription permanent identity (Subscription Permanent Identity, SUPI).

It should be noted that for the specific implementation of step 2410, reference may be made to related description in other embodiments, which will not be repeated here.

Step 2413, the SMF network element transmits a QoS Flow establishment completion message for the first terminal to the P-CSCF network element through the PCF network element, where the message carries address information of the first UPF.

Step 2414, the SMF network element transmits a QoS Flow establishment completion message for the second terminal to the P-CSCF network element through the PCF network element, where the message carries the address information of the first UPF.

Step 2415, the P-CSCF network element transmits a 183 message carrying the address information of the first UPF to the first terminal.

In this embodiment, after receiving the 183 message, the first terminal may determine, based on the address information of the first UPF carried in the 183 message, that current media plane address information is the address information of the first UPF. Correspondingly, the first terminal may perform the IMS call based on the address information of the first UPF later. Specifically, the first terminal may transmit media plane data during the IMS call based on the address information of the first UPF.

Step 2416, the P-CSCF network element transmits a session update message to the second terminal, where the session update message includes the address information of the first UPF.

In at least one embodiment, the session update message may be an updated first session invitation request. The updated first session invitation request includes the address information of the first UPF. The updated first session invitation request is obtained by inserting the address information of the first UPF into the first session invitation request.

Among them, it should be noted that the first UPF in this example implements all or a part of functions of a SBC, such as, media resource management, QoS policy control, security functions, and data encryption.

In this embodiment, after receiving the session update message, the second terminal may determine, based on the address information of the first UPF carried in the session update message, that current media plane address information is the address information of the first UPF. Correspondingly, the second terminal may perform the IMS call based on the address information of the first UPF later. Specifically, the second terminal may transmit media plane data during the IMS call based on the address information of the first UPF.

Step 2417, completing the session establishment between the first terminal and the second terminal.

In this example, the session establishment process between the first terminal and the second terminal is as follows: after receiving the 183 message, the first terminal replies with a provisional response acknowledgment (Provisional Response Acknowledgment, PRACK) message. After transmitting the PRACK to confirm the 183 message, the first terminal checks whether an audio specific QoS flow has been established (a corresponding NAS message is a PDU Session Modification Command and a PDU Session Modification Complete). If the audio specific QoS flow has been established, it means that the resource reservation on the calling side is completed, meeting the premise of Precondition condition. The first terminal needs to transmit an UPDATE request to modify a resource state in the SDP. After detecting that the audio-related dedicated bearer has been established, the second terminal returns 200 signaling for the UPDATE. The first terminal receives a 180) Ringing provisional response indicating that a voice call setup request is being notified to the recipient, and the called terminal (the second terminal) starts ringing. When the called user answers the call, the second terminal will return a 200 confirmation command as the final response to the session invitation request. The first terminal needs to transmit an ACK to acknowledge the final response, completing the session establishment.

Step 2418, after completing the session establishment, the first terminal and the second terminal may forward the media plane data during the IMS call process via the first UPF on the satellite.

That is, the media data of the first terminal and the second terminal is directly forwarded via the first UPF on the satellite.

Based on the aforementioned description, it can be seen that in this embodiment, when it is determined that a first terminal and a second terminal are under the coverage of the same satellite, a UPF corresponding to an IMS PDU session of the first terminal and a UPF corresponding to an IMS PDU session of the second terminal are modified to a first UPF on the satellite, so that the first terminal and the second terminal may forward IMS media plane data during an IMS call process via the first UPF on the satellite. This achieves non-terrestrial forwarding of the media plane data, thereby reducing the transmission delay of the IMS media plane data during the IMS call, and improving the communication efficiency of the IMS call between the two terminals.

Figure 25A:
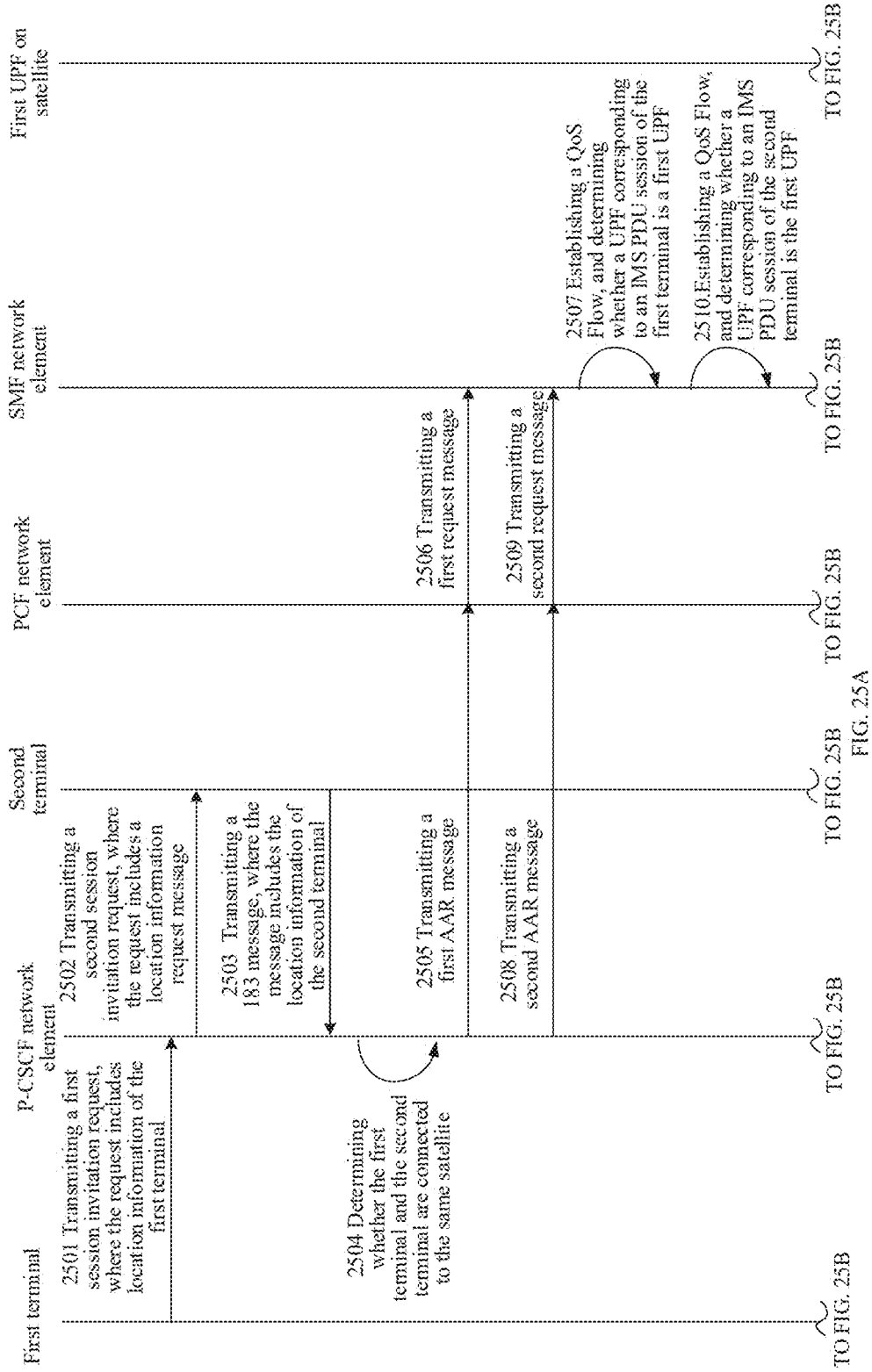
Figure 25C:
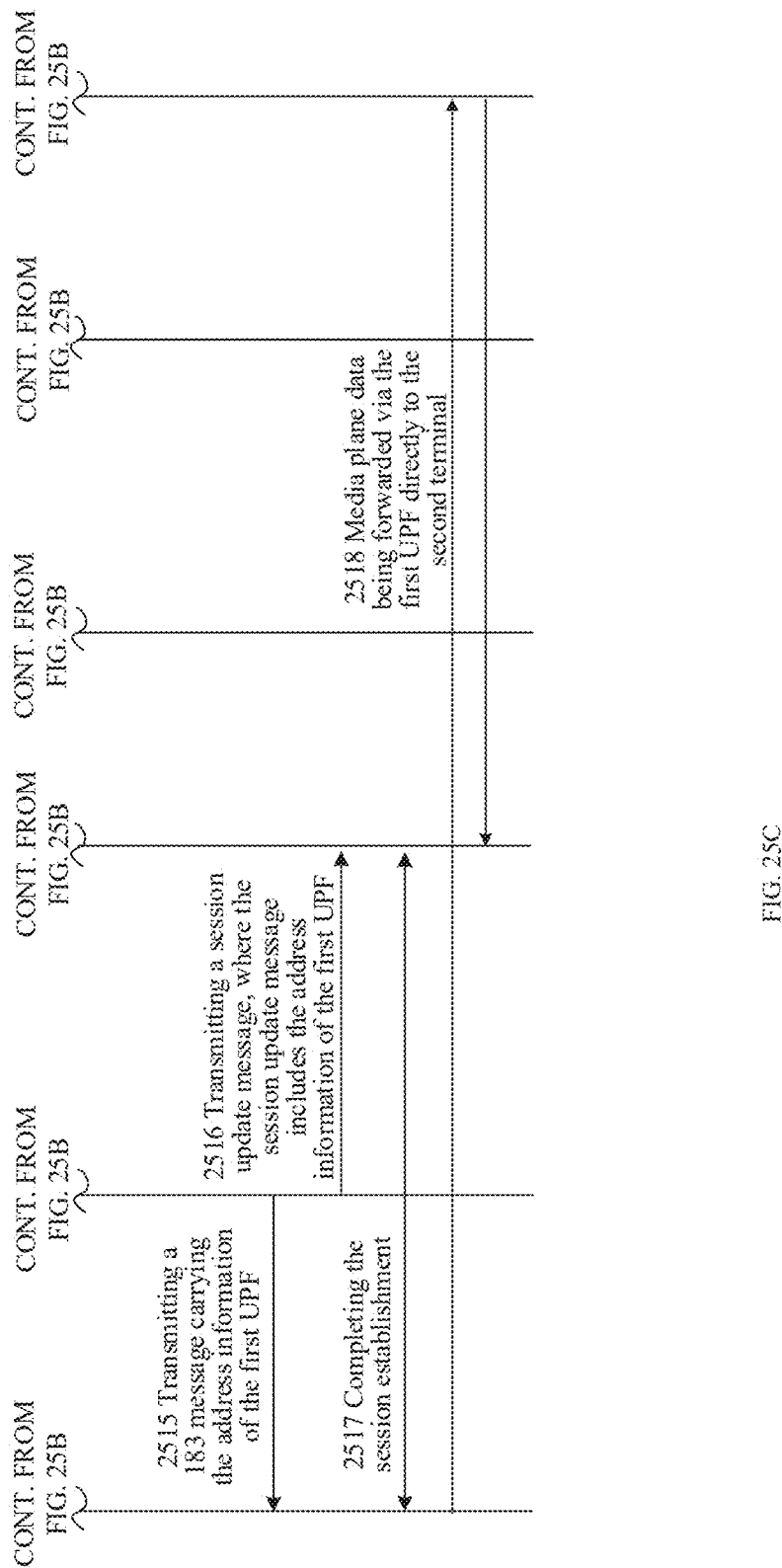

FIG. 25A-FIG. 25C are combined to form a schematic flowchart II of interactions among a first terminal, a second terminal, a P-CSCF network element, a PCF network element, an SMF network element, and a first UPF on a satellite.

Step 2501, the first terminal transmits a first session invitation request to the P-CSCF network element.

Among them, the first session invitation request carries at least one of: identification information of the second terminal, an IP address of the first terminal, a port number of the first terminal, a session description protocol (SDP), location information of the first terminal, and etc.

In at least one embodiment, the first terminal may check whether it is connected to a satellite. If detecting that it is connected to the satellite, the first terminal may carry location information of the first terminal in the first session invitation request transmitted to the P-CSCF network element.

Among them, the SDP includes a media address of the first terminal, and encoding/decoding information and a media type supported by the first terminal.

Among them, the SDP is mainly used for media negotiation before the start of the session. The media address is an address for transmitting and receiving a media stream.

In at least one embodiment, the location information of the first terminal in this example may include at least one of: cell identification information of a cell where the first terminal is located, a base station identity of a base station to which the first terminal is connected, or access network type information corresponding to the first terminal.

In at least one embodiment, the identification information may follow a format of a session initiation protocol uniform resource identifier (Session Initiation Protocol Uniform Resource Identifier, sip-uri) or a format of a telephone uniform resource identifier (Telephone Uniform Resource Identifier, tel-uri).

In at least one embodiment, the SDP further includes required bandwidth information, when this information is received by a network side, the network side determines a QoS bandwidth required for a dedicated bearer based on this information.

Step 2502, if the first session invitation request includes the location information of the first terminal, the P-CSCF network element transmits a second session invitation request to the second terminal. The second session invitation request includes a location information request message, and the location information request message is used to instruct the second terminal to provide location information of the second terminal.

Specifically, the P-CSCF network element detects whether the first session invitation request includes the location information of the first terminal. If detecting that the first session invitation request includes the location information of the first terminal, the P-CSCF network element inserts a location information request message into the first session invitation request to obtain a second session invitation request, and transmits the second session invitation request to the second terminal.

Among them, the second session invitation request in this example further carries port information and a media plane address of a called session border controller (Session Border Controller, SBC) corresponding to the second terminal. The second session invitation request also carries SDP information.

Step 2503, the P-CSCF network element receives a 183 message from the second terminal for the second session invitation request, where the 183 message includes the location information of the second terminal.

In at least one embodiment, after receiving the second session invitation request, the second terminal may detect whether it is connected to a satellite. If detecting that it is connected to the satellite, the second terminal may transmit the 183 message to the P-CSCF network element, where the 183 message includes the location information of the second terminal.

Among them, the 183 message in this example is a response message corresponding to the second session invitation request.

Among them, the 183 message may include an SDP response message, location information of the second terminal.

Among them, the SDP response message includes a media type supported by a called UE and codec information supported by the called UE.

In this example, the location information of the second terminal may include at least one of: cell identification information of a cell where the second terminal is located, a base station identity of a base station to which the second terminal is connected, or access network type information corresponding to the second terminal.

Step 2504, the P-CSCF network element checks whether the first terminal and the second terminal are connected to the same satellite based on the location information of the first terminal and the location information of the second terminal. If so, the P-CSCF network element proceeds with step 2505 and step 2508 upon determining that a call mode the IMS call is an IMS voice call.

Among them, the satellite in this example is deployed with a first user plane function (UPF).

Step 2505, the P-CSCF network element transmits a first AAR message to the PCF network element. The first AAR message is used to trigger an establishment of a quality of service flow (QoS Flow) for carrying voice data during an IMS voice call for the first terminal. The first AAR message includes the indication message, and the indication message is used to indicate that the condition for the first terminal and the second terminal to perform the IMS call via the satellite is met.

Step 2506, the PCF network element transmits a first request message to the SMF network element. The first request message is a message for establishing a quality of service flow (QoS Flow) which is used for carrying voice data during an IMS voice call for the first terminal. The first request message includes the indication message, and the indication message indicates that the condition for the first terminal and the second terminal to perform an IMS call via the satellite is met.

Step 2507, the SMF network element initiates the establishment of the QoS Flow for the first terminal based on the first request message, and checks whether a UPF corresponding to an IMS PDU session of the first terminal is the first UPF after determining, based on the indication message carried in the first request message, that the condition for the first terminal and the second terminal to perform the IMS call via the satellite is met.

Step 2508, the P-CSCF network element transmits a second AAR message to the PCF network element. The second AAR message is used to trigger an establishment of a quality of service flow (QoS Flow) for carrying voice data during an IMS voice call for the second terminal. The second AAR message includes the indication message, and the indication message is used to indicate that the condition for the first terminal and the second terminal to perform the IMS call via the satellite is met.

Step 2509, the PCF network element transmits a second request message to the SMF network element. The second request message is a message for establishing a quality of service flow (QoS Flow) which is used for carrying voice data during an IMS voice call for the second terminal. The second request message includes the indication message, and the indication message indicates that the condition for the first terminal and the second terminal to perform the IMS call via the satellite is met.

Step 2510, the SMF network element initiates the establishment of the QoS Flow for the second terminal based on the second request message, and checks whether a UPF corresponding to an IMS PDU session of the second terminal is the first UPF after determining, based on the indication message carried in the second request message, that the condition for the first terminal and the second terminal to perform the IMS call via the satellite is met.

Step 2511, upon determining that the UPF corresponding to the IMS PDU session of the first terminal and the UPF corresponding to the IMS PDU session of the second terminal are the first UPF, the SMF network element transmits a notification message to the first UPF, where the notification message is used to inform the first UPF that the first terminal and the second terminal will perform the IMS call via the first UPF.

Step 2512, upon determining that at least one of the UPF corresponding to the IMS PDU session of the first terminal or the UPF corresponding to the IMS PDU session of the second terminal is not the first UPF, the SMF network element modifies a UPF of an IMS PDU session whose UPF is not the first UPF to the first UPF, and transmits a notification message to the first UPF, where the notification message is used to inform the first UPF that the first terminal and the second terminal will perform the IMS call via the first UPF.

Step 2513, the SMF network element transmits a QoS Flow establishment completion message for the first terminal to the P-CSCF network element through the PCF network element, where the message carries address information of the first UPF.

Step 2514, the SMF network element transmits a QoS Flow establishment completion message for the second terminal to the P-CSCF network element through the PCF network element, where the message carries the address information of the first UPF.

Step 2515, the P-CSCF network element transmits a 183 message carrying the address information of the first UPF to the first terminal.

Step 2516, the P-CSCF network element transmits a session update message to the second terminal, where the session update message includes the address information of the first UPF.

Step 2517, completing the session establishment between the first terminal and the second terminal.

Step 2518, after completing the session establishment, the first terminal and the second terminal may forward the media plane data during the IMS call process via the first UPF on the satellite.

Among them, it should be noted that for the specific description of step 2505 to step 2518, reference may be made to related description in other embodiments, which will not be repeated here.

Figure 26A:
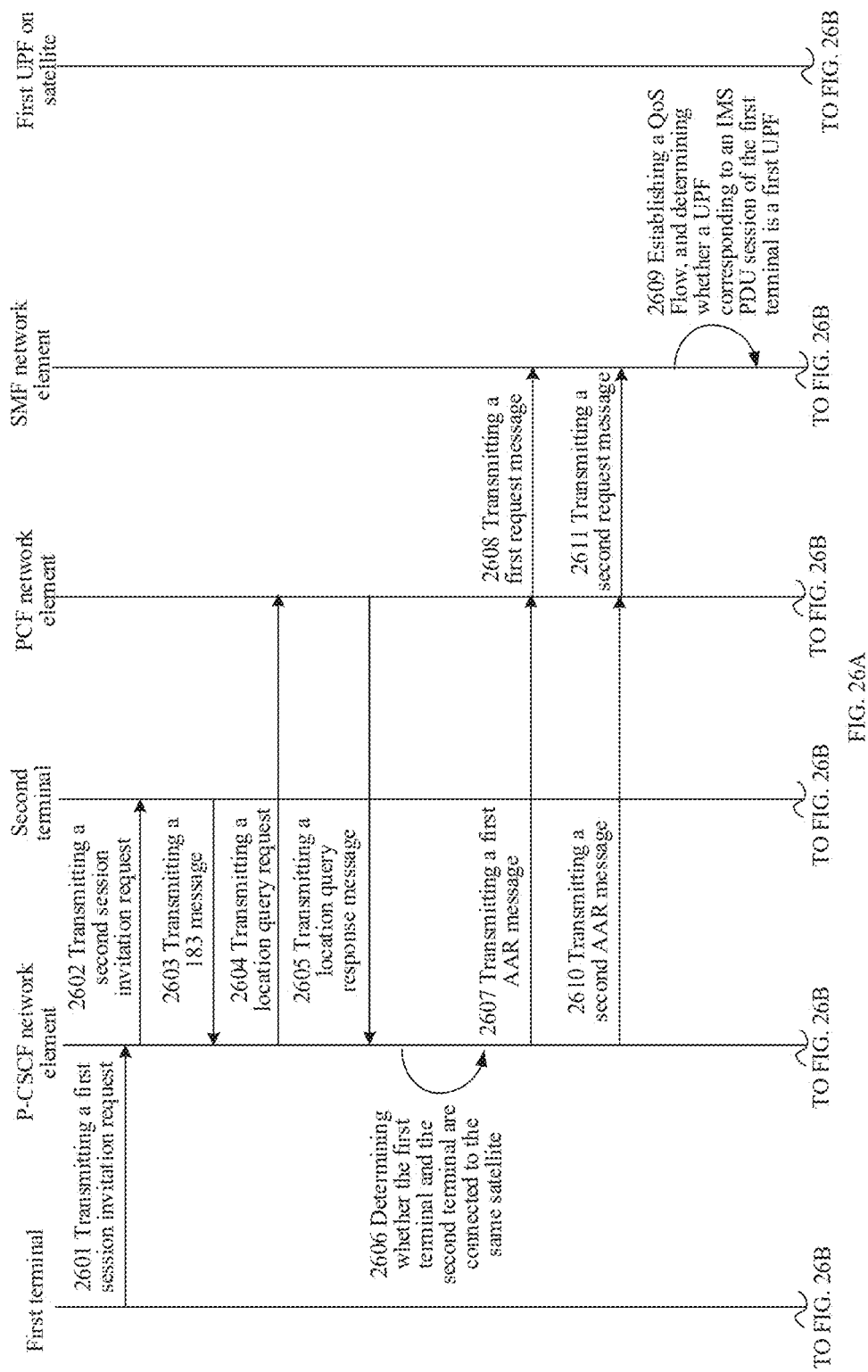
FIG. 26A-FIG. 26C are combined to form a schematic flowchart III of interactions among a first terminal, a second terminal, a P-CSCF network element, an SMF network element, a PCF network element, and a first UPF on a satellite.
Figure 26B:
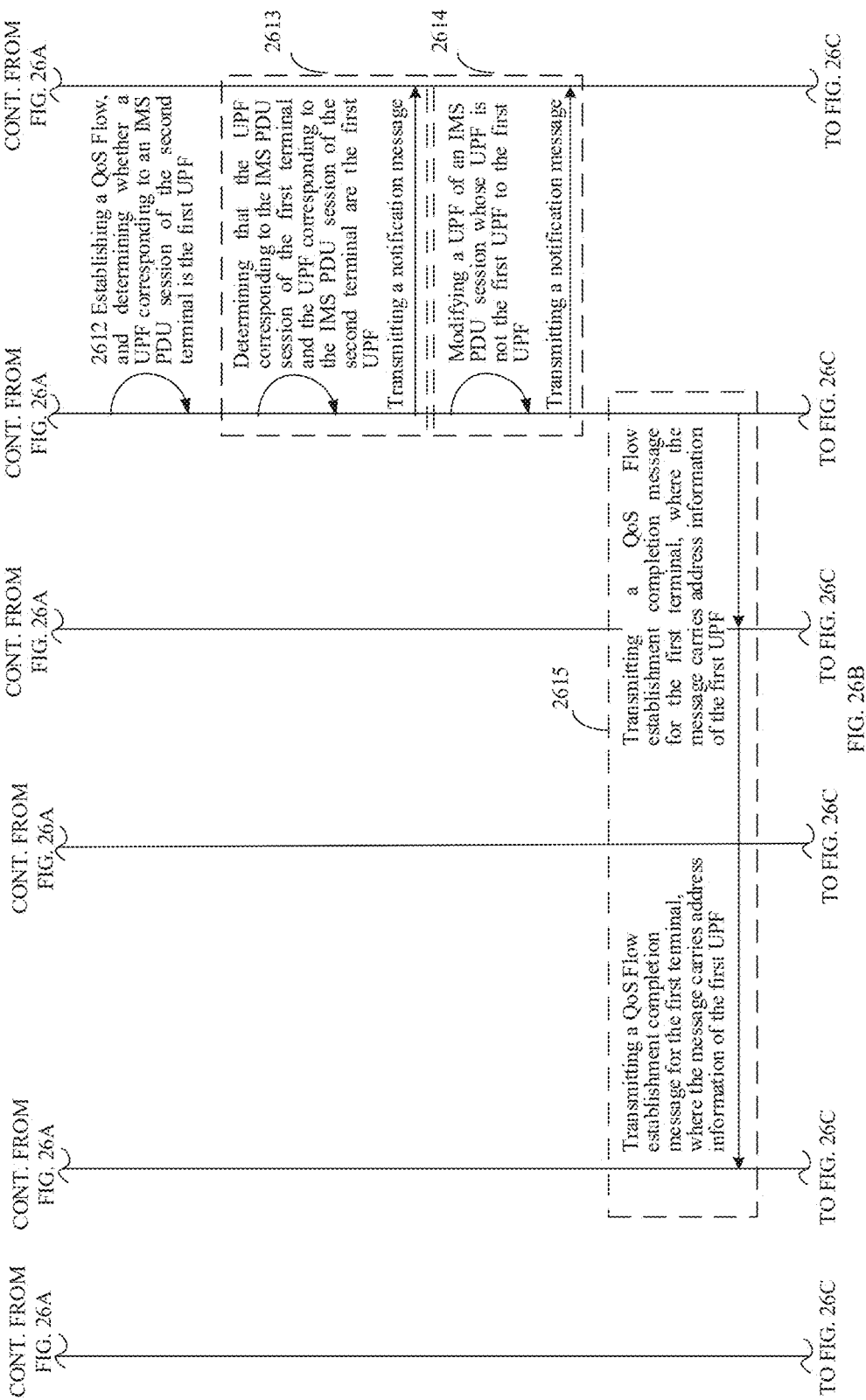
Figure 26C:
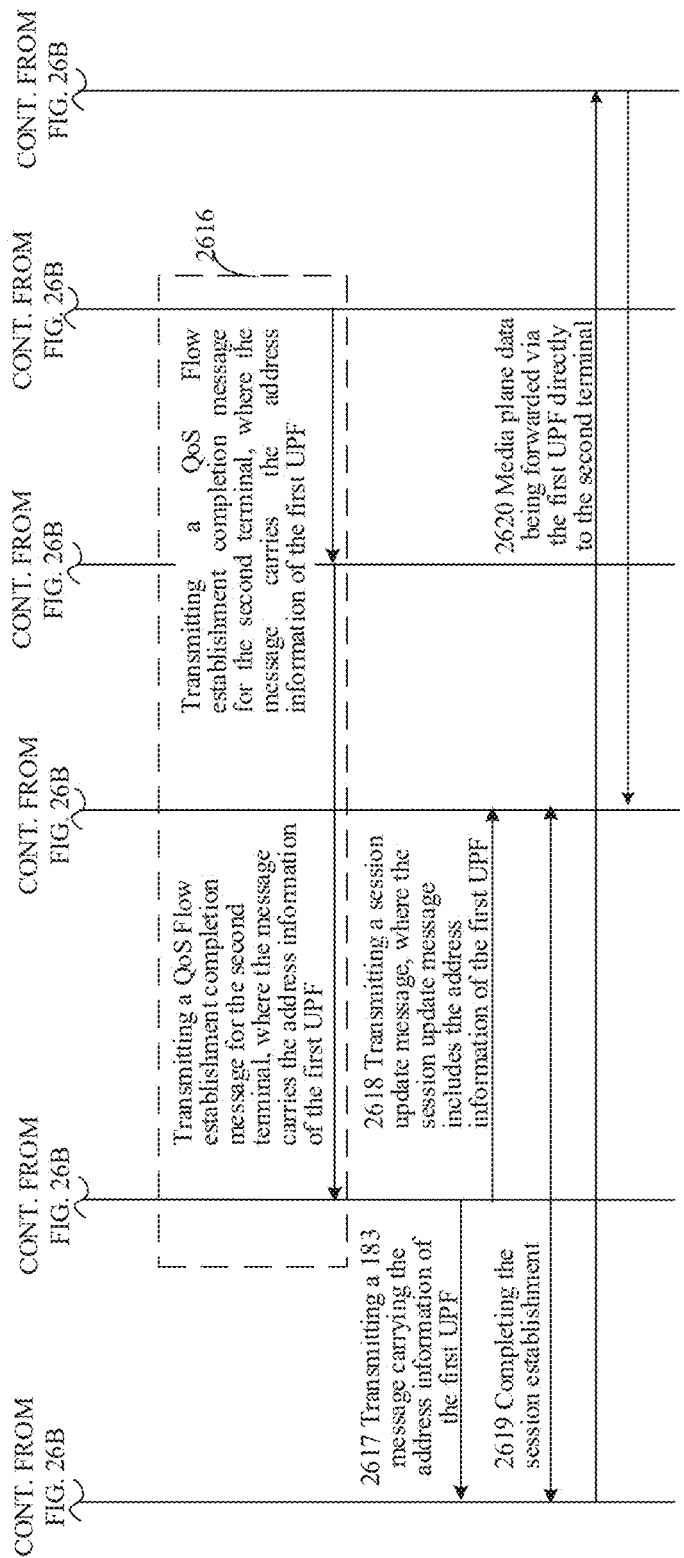

FIG. 26A-FIG. 26C are combined to form a schematic flowchart III of interactions among a first terminal, a second terminal, a P-CSCF network element, an SMF network element, a PCF network element, and a first UPF on a satellite.

As shown in FIG. 26A-FIG. 26C, the method may include following steps.

Step 2601, the first terminal transmits a first session invitation request to the P-CSCF network element.

Among them, the first session invitation request carries at least one of: identification information of the second terminal, an IP address of the first terminal, a port number of the first terminal, a session description protocol (SDP), and etc.

Among them, the SDP includes a media address of the first terminal, and encoding/decoding information and a media type supported by the first terminal.

Among them, the SDP is mainly used for media negotiation before the start of the session. The media address is an address for transmitting and receiving a media stream.

In at least one embodiment, the identification information may follow a format of a session initiation protocol uniform resource identifier (Session Initiation Protocol Uniform Resource Identifier, sip-uri) or a format of a telephone uniform resource identifier (Telephone Uniform Resource Identifier, tel-uri).

In at least one embodiment, the SDP further includes required bandwidth information, when this information is received by a network side, the network side determines a QoS bandwidth required for a dedicated bearer based on this information.

Step 2602, the P-CSCF network element transmits a second session invitation request to the second terminal.

For the specific implementation of transmitting the second session invitation request from the P-CSCF network element to the second terminal, reference may be made to related description in other embodiments, which will not be repeated here.

Step 2603, the P-CSCF network element receives a 183 message from the second terminal for the second session invitation request.

Among them, the 183 message in this example is a response message corresponding to the second session invitation request.

Among them, the 183 message may include an SDP response message.

Among them, the SDP response message includes a media type supported by a called UE and codec information supported by the called UE.

Step 2604, if the first session invitation request does not include location information of the first terminal and/or the response message does not include location information of the second terminal, the P-CSCF network element transmits a location query request to the PCF network element, where the location query request is used to request to query the location information of the first terminal and/or the location information of the second terminal.

Step 2605, the P-CSCF network element receives a location query response message from the PCF network element for the location query request, where the location query response message includes the location information of the first terminal and/or the location information of the second terminal.

Step 2606, the P-CSCF network element checks whether the first terminal and the second terminal are connected to the same satellite based on the location information of the first terminal and the location information of the second terminal, and proceeding with step 2607 and step 2610.

Step 2607, the P-CSCF network element transmits a first AAR message to the PCF network element. The first AAR message is used to trigger an establishment of a quality of service flow (QoS Flow) for carrying voice data during an IMS voice call for the first terminal. The first AAR message includes the indication message, and the indication message is used to indicate that the condition for the first terminal and the second terminal to perform the IMS call via the satellite is met.

Step 2608, the PCF network element transmits a first request message to the SMF network element. The first request message is a message for establishing a quality of service flow (QoS Flow) which is used for carrying voice data during an IMS voice call for the first terminal. The first request message includes the indication message, and the indication message indicates that the condition for the first terminal and the second terminal to perform an IMS call via the satellite is met.

Step 2609, the SMF network element initiates the establishment of the QoS Flow for the first terminal based on the first request message, and checks whether a UPF corresponding to an IMS PDU session of the first terminal is the first UPF after determining, based on the indication message carried in the first request message, that the condition for the first terminal and the second terminal to perform the IMS call via the satellite is met.

Step 2610, the P-CSCF network element transmits a second AAR message to the PCF network element. The second AAR message is used to trigger an establishment of a quality of service flow (QoS Flow) for carrying voice data during an IMS voice call for the second terminal. The second AAR message includes the indication message, and the indication message is used to indicate that the condition for the first terminal and the second terminal to perform the IMS call via the satellite is met.

Step 2611, the PCF network element transmits a second request message to the SMF network element. The second request message is a message for establishing a quality of service flow (QoS Flow) which is used for carrying voice data during an IMS voice call for the second terminal. The second request message includes the indication message, and the indication message indicates that the condition for the first terminal and the second terminal to perform the IMS call via the satellite is met.

Step 2612, the SMF network element initiates the establishment of the QoS Flow for the second terminal based on the second request message, and checks whether a UPF corresponding to an IMS PDU session of the second terminal is the first UPF after determining, based on the indication message carried in the second request message, that the condition for the first terminal and the second terminal to perform the IMS call via the satellite is met.

Step 2613, upon determining that the UPF corresponding to the IMS PDU session of the first terminal and the UPF corresponding to the IMS PDU session of the second terminal are the first UPF, the SMF network element transmits a notification message to the first UPF, where the notification message is used to inform the first UPF that the first terminal and the second terminal will perform the IMS call via the first UPF.

Step 2614, upon determining that at least one of the UPF corresponding to the IMS PDU session of the first terminal or the UPF corresponding to the IMS PDU session of the second terminal is not the first UPF, the SMF network element modifies a UPF of an IMS PDU session whose UPF is not the first UPF to the first UPF, and transmits a notification message to the first UPF, where the notification message is used to inform the first UPF that the first terminal and the second terminal will perform the IMS call via the first UPF.

Step 2615, the SMF network element transmits a QoS Flow establishment completion message for the first terminal to the P-CSCF network element through the PCF network element, where the message carries address information of the first UPF.

Step 2616, the SMF network element transmits a QoS Flow establishment completion message for the second terminal to the P-CSCF network element through the PCF network element, where the message carries the address information of the first UPF.

Step 2617, the P-CSCF network element transmits a 183 message carrying the address information of the first UPF to the first terminal.

Step 2618, the P-CSCF network element transmits a session update message to the second terminal, where the session update message includes the address information of the first UPF.

Step 2619, completing the session establishment between the first terminal and the second terminal.

Step 2620, after completing the session establishment, the first terminal and the second terminal may forward the media plane data during the IMS call process via the first UPF on the satellite.

Among them, it should be noted that for the specific description of step 2607 to step 2620, reference may be made to related description in other embodiments, which will not be repeated here.

Figure 27A:
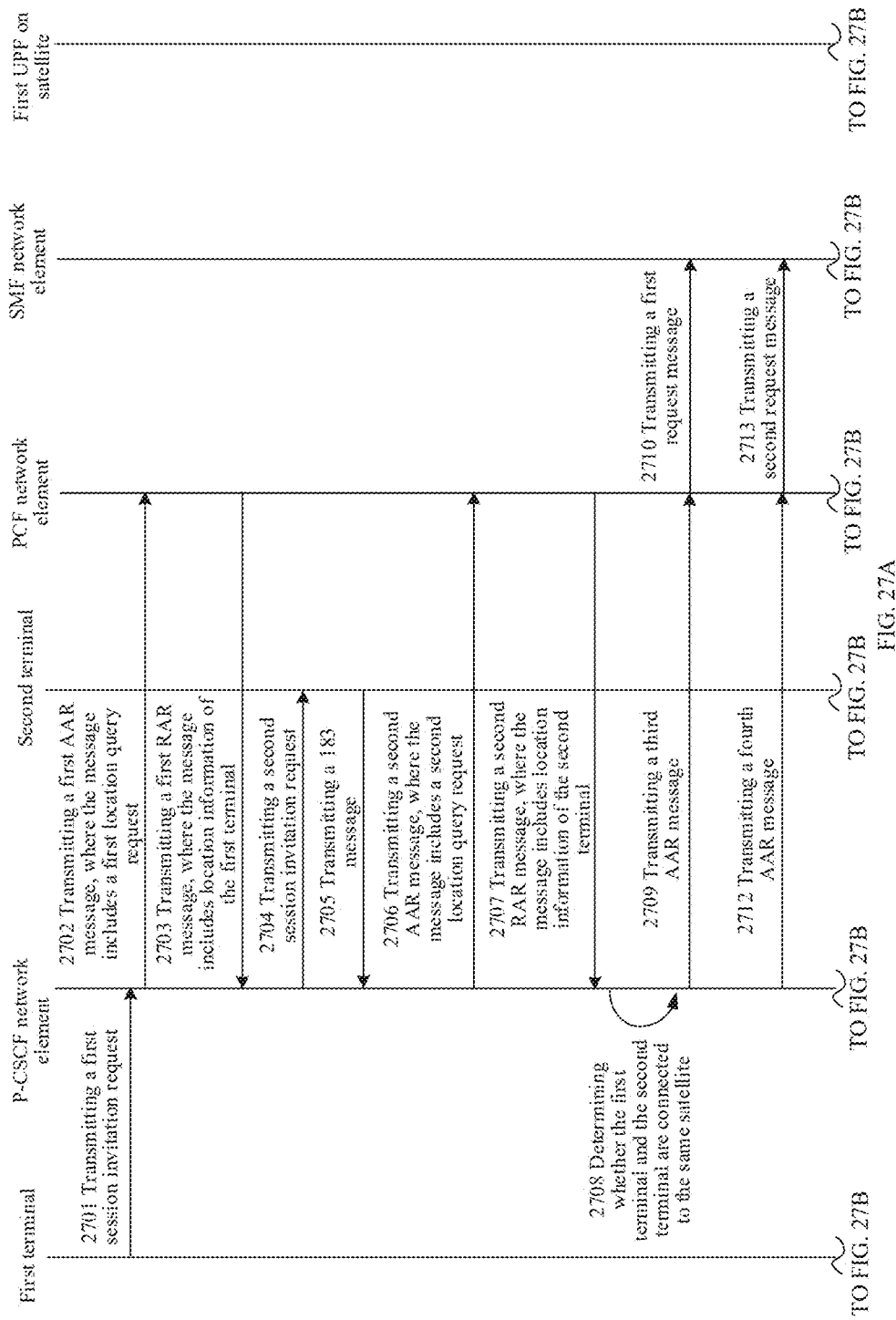
FIG. 27A-FIG. 27C are combined to form a schematic flowchart IV of interactions among a first terminal, a second terminal, a P-CSCF network element, an SMF network element, a PCF network element, and a first UPF on a satellite.
Figure 27B:
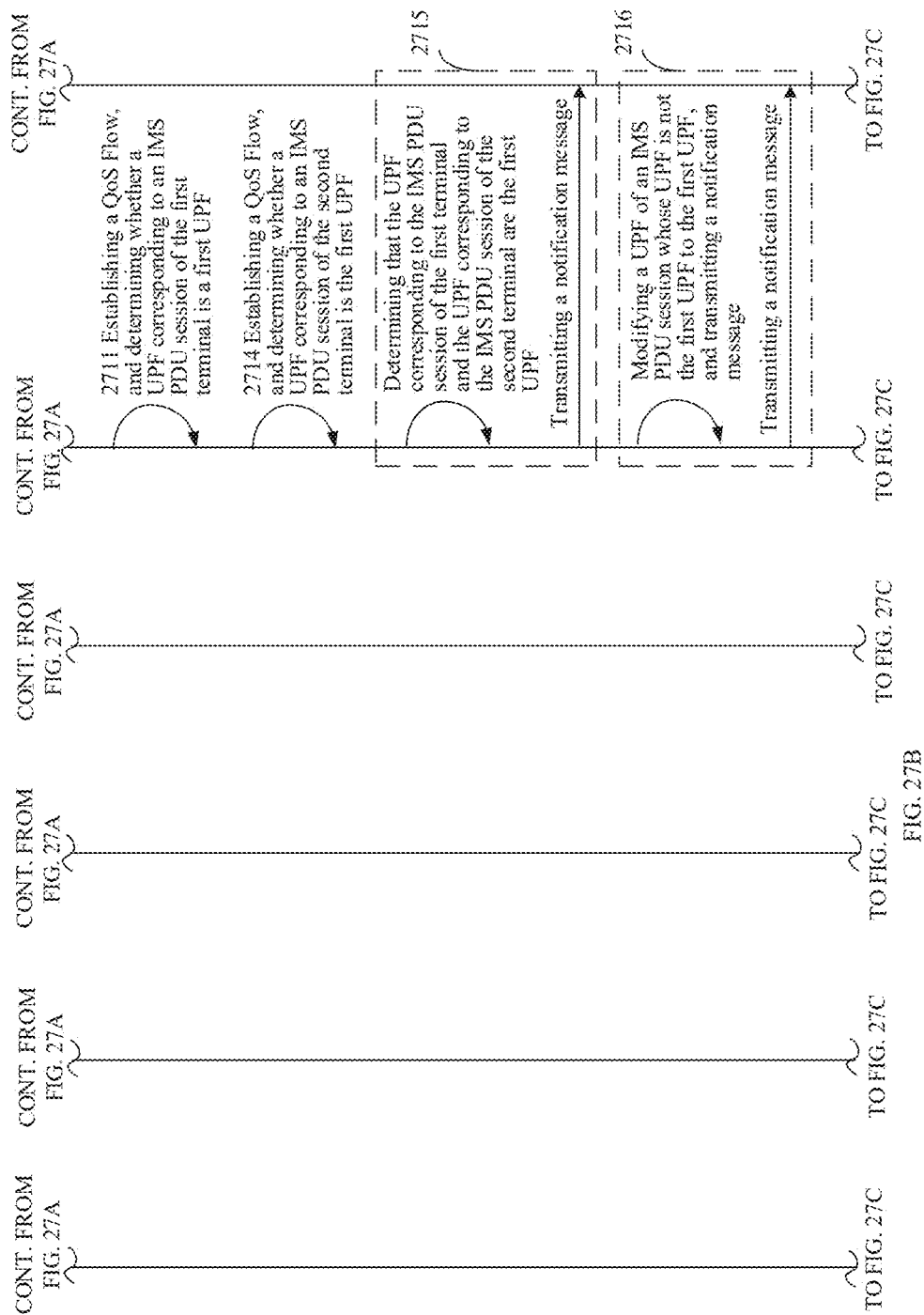
Figure 27C:
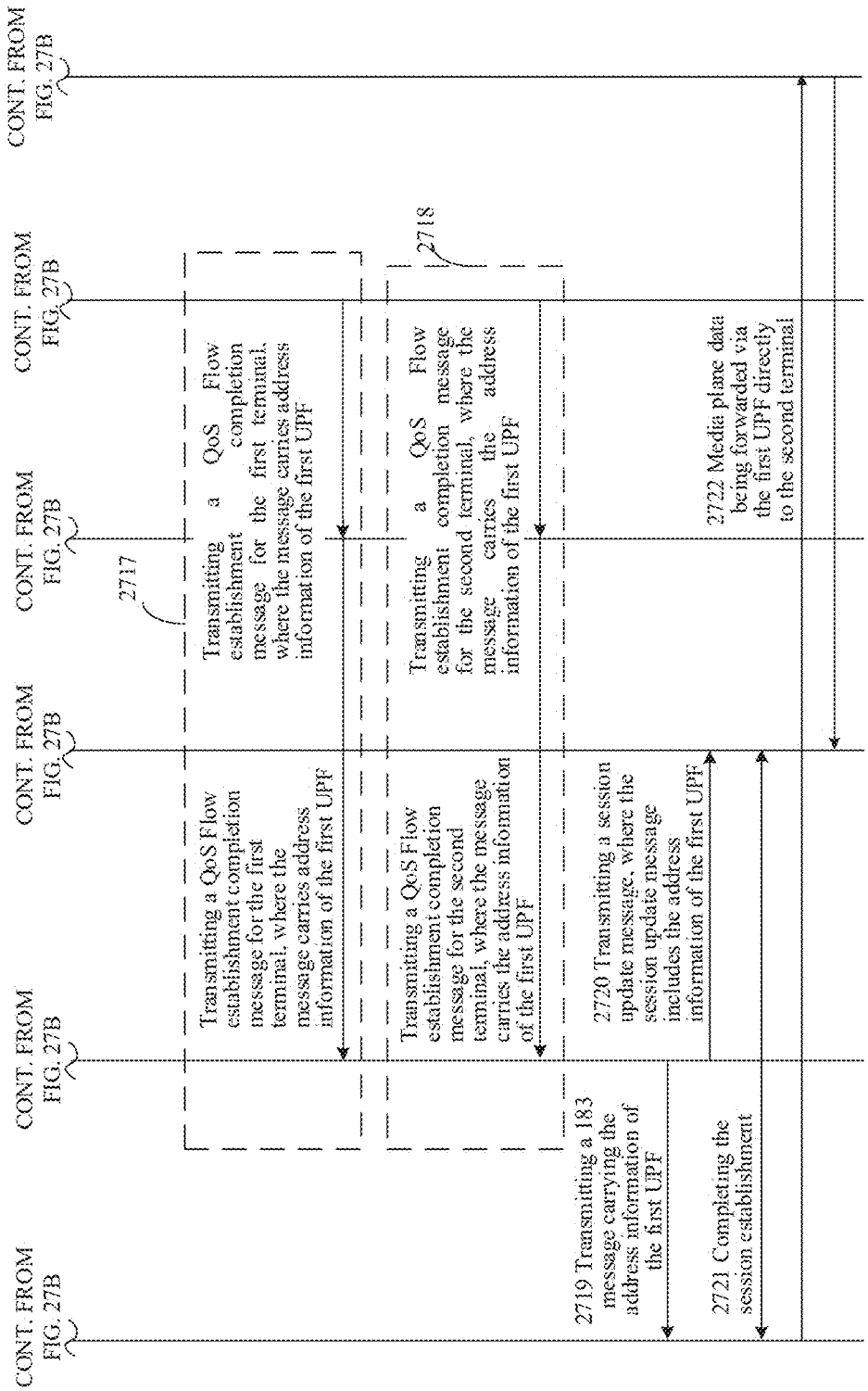

FIG. 27A-FIG. 27C are combined to form a schematic flowchart IV of interactions among a first terminal, a second terminal, a P-CSCF network element, an SMF network element, a PCF network element, and a first UPF on a satellite.

As shown in FIG. 27A-FIG. 27C, the method may include following steps.

Step 2701, the first terminal transmits a first session invitation request to the P-CSCF network element.

In an example, the first session invitation request carries identification information of the second terminal, an IP address of the first terminal, a port number of the first terminal, and a session description protocol (SDP).

In another example, the first session invitation request carries identification information of the second terminal, an IP address of the first terminal, a port number of the first terminal, a session description protocol (SDP), and location information of the first terminal.

In at least one embodiment, the first terminal may check whether it is connected to a satellite. If detecting that it is connected to the satellite, the first terminal may carry location information of the first terminal in the first session invitation request transmitted to the P-CSCF network element.

Among them, the SDP includes a media address of the first terminal, and encoding/decoding information and a media type supported by the first terminal.

Among them, the SDP is mainly used for media negotiation before the start of the session. The media address is an address for transmitting and receiving a media stream.

In this example, the location information of the first terminal in this example may include at least one of: cell identification information of a cell where the first terminal is located, a base station identity of a base station to which the first terminal is connected, access network type information corresponding to the first terminal, or a satellite identification of a satellite to which the first terminal is connected.

In at least one embodiment, the identification information may follow a format of a session initiation protocol uniform resource identifier (Session Initiation Protocol Uniform Resource Identifier, sip-uri) or a format of a telephone uniform resource identifier (Telephone Uniform Resource Identifier, tel-uri).

In at least one embodiment, the SDP further includes required bandwidth information, when this information is received by a network side, the network side determines a QoS bandwidth required for a dedicated bearer based on this information.

Step 2702, the P-CSCF network element transmits a first authentication authorization request (AAR) message to the PCF network element, where the first AAR message includes a first location query request, and the first location query request is used to request to query location information of the first terminal.

In this embodiment, after the first session invitation request is received from the first terminal, regardless of whether the location information of the first terminal is actively carried in the first session invitation request, the first authentication authorization request (Authentication Authorization Request, AAR) message may be transmitted to the PCF network element.

Step 2703: the P-CSCF network element receives a first re-authentication request (Re-Authentication Request, RAR) message from the PCF network element for the first AAR message, where the first RAR message includes the location information of the first terminal.

Step 2704, the P-CSCF network element transmits a second session invitation request to the second terminal.

For the specific implementation of transmitting the second session invitation request from the P-CSCF network element to the second terminal, reference may be made to related description in other embodiments, which will not be repeated here.

Step 2705, the P-CSCF network element receives a 183 message from the second terminal for the second session invitation request.

In an example, the second terminal may actively carry the location information of the second terminal in the 183 message.

In another example, the second session invitation request includes a location information request message, where the location information request message is used to instruct the second terminal to provide location information of the second terminal. Correspondingly, the second terminal carries the location information of the second terminal in the 183 message based on the location information request message.

Among them, the 183 message in this example is a response message corresponding to the second session invitation request.

Among them, the 183 message may further include an SDP response message.

Among them, the SDP response message includes a media type supported by a called UE and codec information supported by the called UE.

In this example, the location information of the second terminal may include at least one of: cell identification information of a cell where the second terminal is located, a base station identity of a base station to which the second terminal is connected, access network type information corresponding to the second terminal, or a satellite identification of a satellite to which the second terminal is connected.

Step 2706, the P-CSCF network element transmits a second AAR message to the PCF network element, where the second AAR message includes a second location query request, and the second location query request is used to request to query the location information of the second terminal.

In an embodiment of the present disclosure, a response message from the second terminal for the second session invitation request may be received, and regardless of whether the response message from the second terminal carries the location information of the second terminal, the second AAR message may be transmitted to the PCF network element.

Step 2707: the P-CSCF network element receives a second RAR message from the PCF network element for the second AAR message, where the second RAR message includes the location information of the second terminal.

Among them, the location information of the second terminal in this example may include, but is not limited to, at least one of: cell identification information of a cell where the second terminal is located, a base station identity of a base station to which the second terminal is connected, access network type information corresponding to the second terminal, or a satellite identification of a satellite to which the second terminal is connected.

Step 2708, the P-CSCF network element checks whether the first terminal and the second terminal are connected to the same satellite based on the location information of the first terminal and the location information of the second terminal, and proceeds with step 2709 and step 2712.

Among them, the satellite in this example is deployed with a first user plane function (UPF).

Step 2709, the P-CSCF network element transmits a third AAR message to the PCF network element, where the third AAR message is used to trigger an establishment of a quality of service flow (QoS Flow) for carrying voice data during an IMS voice call for the first terminal. The third AAR message includes an indication message, and the indication message is used to indicate that a condition for the first terminal and the second terminal to perform the IMS call via the satellite is met.

Step 2710, the PCF network element transmits a first request message to the SMF network element. The first request message is a message for establishing a quality of service flow (QoS Flow) which is used for carrying voice data during an IMS voice call for the first terminal. The first request message includes the indication message, and the indication message indicates that the condition for the first terminal and the second terminal to perform an IMS call via the satellite is met.

Step 2711, the SMF network element initiates the establishment of the QoS Flow for the first terminal based on the first request message, and checks whether a UPF corresponding to an IMS PDU session of the first terminal is the first UPF after determining, based on the indication message carried in the first request message, that the condition for the first terminal and the second terminal to perform the IMS call via the satellite is met.

Step 2712, the P-CSCF network element transmits a fourth AAR message to the PCF network element, where the fourth AAR message is used to trigger an establishment of a quality of service flow (QoS Flow) for carrying voice data during an IMS voice call for the second terminal. The fourth AAR message includes the indication message, and the indication message is used to indicate that the condition for the first terminal and the second terminal to perform the IMS call via the satellite is met.

Step 2713, the PCF network element transmits a second request message to the SMF network element. The second request message is a message for establishing a quality of service flow (QoS Flow) which is used for carrying voice data during an IMS voice call for the second terminal. The second request message includes the indication message, and the indication message indicates that the condition for the first terminal and the second terminal to perform the IMS call via the satellite is met.

Step 2714, the SMF network element initiates the establishment of the QoS Flow for the second terminal based on the second request message, and checks whether a UPF corresponding to an IMS PDU session of the second terminal is the first UPF after determining, based on the indication message carried in the second request message, that the condition for the first terminal and the second terminal to perform the IMS call via the satellite is met.

Step 2715, upon determining that the UPF corresponding to the IMS PDU session of the first terminal and the UPF corresponding to the IMS PDU session of the second terminal are the first UPF, the SMF network element transmits a notification message to the first UPF, where the notification message is used to inform the first UPF that the first terminal and the second terminal will perform the IMS call via the first UPF.

Step 2716, upon determining that at least one of the UPF corresponding to the IMS PDU session of the first terminal or the UPF corresponding to the IMS PDU session of the second terminal is not the first UPF, the SMF network element modifies a UPF of an IMS PDU session whose UPF is not the first UPF to the first UPF, and transmits a notification message to the first UPF, where the notification message is used to inform the first UPF that the first terminal and the second terminal will perform the IMS call via the first UPF.

Step 2717, the SMF network element transmits a QoS Flow establishment completion message for the first terminal to the P-CSCF network element through the PCF network element, where the message carries address information of the first UPF.

Step 2718, the SMF network element transmits a QoS Flow establishment completion message for the second terminal to the P-CSCF network element through the PCF network element, where the message carries the address information of the first UPF.

Step 2719, the P-CSCF network element transmits a 183 message carrying the address information of the first UPF to the first terminal.

Step 2720, the P-CSCF network element transmits a session update message to the second terminal, where the session update message includes the address information of the first UPF.

Step 2721, completing the session establishment between the first terminal and the second terminal.

Step 2722, after completing the session establishment, the first terminal and the second terminal may forward the media plane data during the IMS call process via the first UPF on the satellite.

Among them, it should be noted that for the specific description of step 2709 to step 2722, reference may be made to related description in other embodiments, which will not be repeated here.

In order to implement the aforementioned embodiments, the present disclosure further proposes a communication device.

Figure 28:
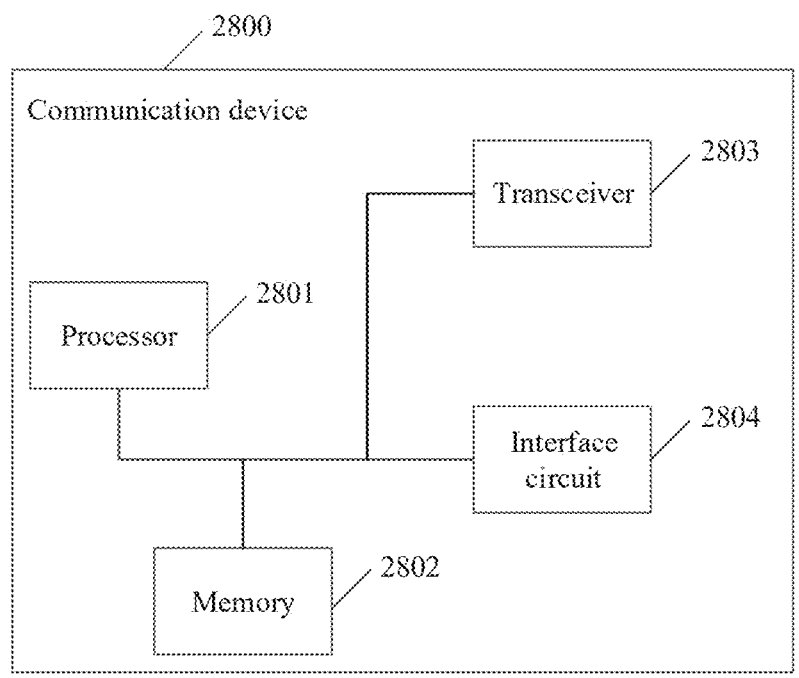
FIG. 28 is a block diagram of a communication device for implementing a communication method according to an exemplary embodiment.

FIG. 28 is a block diagram of a communication device for implementing a communication method according to an exemplary embodiment. Among them, it should be noted that the communication device 2800 in this embodiment may be configured to implement the methods described in the aforementioned method embodiments. Reference may be made to the description in the aforementioned method embodiments for details.

As shown in FIG. 28, the aforementioned communication device 2800 includes one or more processors 2801.

The processor 2801 may be a general-purpose processor or a dedicated processor, such as a baseband processor or a central processing unit. The baseband processor may be used to process a communication protocol and communication data, while the central processor may be used to control a communication apparatus (such as a base station, a baseband chip, a terminal, a terminal chip, a distributed unit (distributed unit, DU) or a central unit (central unit CU), and etc.), execute programs, and process program data. The processor 2801 is configured to call instructions to cause the communication device 2800 to execute any of the aforementioned methods.

In some embodiments, the communication device 2800 further includes one or more memories 2802 for storing instructions. In some embodiments, all or a part of the memory 2802 may also be located outside of the communication device 2800.

In some embodiments, the communication device 2800 further includes one or more transceivers 2803. When the communication device 2800 includes the one or more transceivers 2803, communication steps, such as transmitting and receiving steps in the aforementioned method, are executed by the transceiver 2803, and other steps are executed by the processor 2801.

In some embodiments, the transceiver 2803 may include a receiver and a transmitter, which may be separate or integrated together. In some embodiments, terms such as transceiver, transceiving unit, transceiving module, and transceiving circuit may be interchangeable with each other. Terms such as transmitter, transmitting unit, transmitting module, and transmitting circuit may be interchangeable with each other, and terms such as receiver, receiving unit, receiving module, and receiving circuit may be interchangeable with each other.

In some embodiments, the communication device 2800 further includes one or more interface circuits 2804, which are connected to the memory 2802. The interface circuit 2804 may be used to receive a signal from the memory 2802 or another apparatus, and may be used to transmit a signal to the memory 2802 or another apparatus. For example, the interface circuit 2804 may read an instruction stored in the memory 2802 and transmit the instruction to the processor 2801.

The communication device 2800 described in the aforementioned embodiments may be a network device or a spatial terminal, but a scope of the communication device 2800 described in the present disclosure is not limited to them, and a structure of the communication device 2800 may not be limited by FIG. 28. The communication device may be an independent device or a part of a large device. For example, the communication device may be: 1) an independent integrated circuit (Integrated Circuit, IC), or, a chip, a chip system, or a subsystem; (2) a set of one or more ICs, in some embodiments, the set of ICs may also include a storage component for storing data and programs: (3) an ASIC (Application Specific Integrated Circuit), such as a modem (modem); (4) a module which may be embedded in another device; (5) a receiver, a terminal, an intelligent terminal, a cellular phone, a wireless device, a handheld device, a mobile unit, an in vehicle device, a network device, a cloud device, an artificial intelligence device, and etc.; (6) other devices and so on.

Among them, it should be noted that for the implementation process and technical principles of the communication device in this embodiment, reference may be made to previous explanations of the communication methods in the embodiments of the present disclosure, which will not be repeated here.

An embodiment of the present disclosure further proposes a chip.

Figure 29:
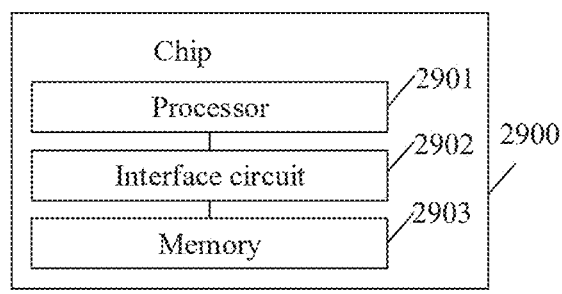
FIG. 29 is a schematic structural diagram of a chip according to an exemplary embodiment.

FIG. 29 is a schematic structural diagram of a chip according to an exemplary embodiment.

As shown in FIG. 29, a chip 2900 includes a processor 2901 and an interface circuit 2902. Among them, the processor 2901 may be one or more, and the interface circuit 2902 may be one or more.

In at least one embodiment, the chip further includes a memory 2903. The memory 2903 is configured to store necessary computer programs and data. The interface circuit 2902 is configured to receive a signal from the memory 2903 and transmit the signal to the processor 2901. The signal includes computer instructions stored in the memory 2903, so that the communication device implements the communication method described in the aforementioned embodiments of the present disclosure when the processor 2901 executes the computer instructions.

In order to implement the aforementioned embodiments, the present disclosure further proposes a computer-readable storage medium storing with a computer program, the communication methods of the aforementioned embodiments are implemented when the computer program is executed by a processor.

In order to implement the aforementioned embodiments, the present disclosure further provides a computer program product, the communication methods of the aforementioned embodiments are implemented when instructions in the computer program product are executed by a processor.

It should be noted that in the description of the present disclosure, terms "first", "second", etc, are only used for descriptive purposes and cannot be understood as indicating or implying a relative importance. In addition, in the description of the present disclosure, unless otherwise specified, the meaning of "multiple" refers to two or more.

Any process or method description in a flowchart or otherwise described herein may be understood as representing a module, a fragment, or a portion of code including executable instructions for implementing one or more steps of a specific logic function or a process, and a scope of the aforementioned embodiments of the present disclosure includes additional implementations, which may not be in the order as shown or discussed, but may be performed in a substantially simultaneous manner or in reverse order based on functions involved, which should be understood by the persons of ordinary skill in the art to which the embodiments of the present disclosure pertain.

It should be understood that each part of the present disclosure may be implemented using hardware, software, firmware, or a combination thereof. In the aforementioned embodiments, multiple steps or methods may be implemented using software or firmware stored in a memory and executed by a suitable instruction execution system. For example, if implemented in hardware, as in another implementation, any one or a combination of the following techniques known in the art may be used: a discreet logic circuit with logic gate circuits for implementing logic functions on data signals, an application specific integrated circuit with suitable combinational logic gate circuits, a programmable gate array (PGA), a field programmable gate array (FPGA), and etc.

The persons of ordinary skill in the art can understand that all or a part of steps carried by the methods in the aforementioned embodiments may be implemented by a program instructing relevant hardware. The program may be stored in a computer-readable storage medium, and when the program is executed, it includes one or a combination of the steps of the method embodiments.

In addition, various functional units in the embodiments of the present disclosure may be integrated into one processing module, or may exist separately physically, or two or more units may be integrated into one module. The integrated module mentioned above may be implemented in a form of hardware or software functional module(s). If the integrated module is implemented in a form of software functional module(s) and sold or used as an independent product, it may also be stored in a computer-readable storage medium.

The storage medium mentioned above may be a read-only memory, a magnetic disk or an optical disk, and etc.

In the description of this specification, reference terms "one embodiment", "some embodiments", "example", "specific example", or "some examples" are intended to indicate that a specific feature, structure, material, or characteristic described in conjunction with the embodiment or example is included in at least one embodiment or example of the present disclosure. In this specification, the illustrative expressions of the aforementioned terms may not necessarily refer to the same embodiment or example. Moreover, the specific feature, structure, material, or characteristic described may be combined in any one or more embodiments or examples in a suitable manner.

Although the embodiments of the present disclosure have been shown and described above, it can be understood that the aforementioned embodiments are exemplary and should not be construed as limiting the present disclosure. The persons of ordinary skill in the art may make changes, modifications, substitutions, and variations to the aforementioned embodiments within the scope of the present disclosure.

What is claimed is:

1. A communication method, wherein the method is applied in a proxy call session control function (P-CSCF), and the method comprises:
    receiving a first session invitation request corresponding to a first terminal, wherein the first session invitation request is used to request to perform an Internet protocol multimedia subsystem (IMS) call with a second terminal;
    transmitting a second location query request to a policy control function (PCF), wherein the second location query request is used to request to query location information of the second terminal;
    receiving a second location query response message from the PCF, wherein the second location query response message includes the location information of the second terminal, wherein the location information of the second terminal includes a satellite identification of a satellite to which the second terminal is connected;
    determining that the first terminal and the second terminal are connected to a same satellite based on location information of the first terminal and the location information of the second terminal, wherein the satellite that the first terminal and the second terminal are connected to hosts a first user plane function (UPF), and wherein the location information of the first terminal includes a satellite identification of a satellite to which the first terminal is connected; and
    transmitting an indication message to the PCF, wherein the indication message is used to indicate that a condition for the first terminal and the second terminal to perform the IMS call via the satellite is met.

2. The method according to claim 1, further comprising:
    transmitting a message that triggers an establishment of a quality of service flow (QOS Flow) for the second terminal to the PCF, wherein the message that triggers the establishment of the QoS Flow for the second terminal includes the indication message.

3. The method according to claim 2, wherein the message that triggers the establishment of the QoS Flow for the second terminal further includes a call mode of the IMS call, wherein the call mode is an IMS voice call or an IMS video call.

4. The method according to claim 2, further comprising:
    receiving a second QoS Flow establishment completion message transmitted by the PCF, wherein the second QoS Flow establishment completion message indicates that the establishment of the QoS Flow for the second terminal is completed, and the second QoS Flow establishment completion message includes address information of the first UPF;
    transmitting the address information of the first UPF to the second terminal.

5. The method according to claim 1, wherein the indication message includes identification information of the first terminal and identification information of the second terminal.

6. The method according to claim 1, wherein the first session invitation request includes the location information of the first terminal.

7. The method according to claim 1, wherein the first session invitation request includes the location information of the first terminal, the method further comprises:
    transmitting a second session invitation request to the second terminal, wherein the second session invitation request includes a location information request message, wherein the location information request message is used to instruct the second terminal to provide the location information of the second terminal;
    receiving a response message from the second terminal, wherein the response message includes the location information of the second terminal.

8. The method according to claim 1, wherein the method comprises:
    in a case where the first session invitation request does not include the location information of the first terminal, transmitting a location query request to the PCF, wherein the location query request is used to request to query at least one of the location information of the first terminal, or the location information of the second terminal;
    receiving a location query response message from PCF, wherein the location query response message includes the at least one of the location information of the first terminal, or the location information of the second terminal.

9. A communication apparatus, applied in a proxy call session control function (P-CSCF), comprising a memory, a processor, and a computer program stored on the memory and executable on the processor, wherein the processor is configured to execute the computer program to:
    receive a first session invitation request corresponding to a first terminal, wherein the first session invitation request is used to request to perform an Internet protocol multimedia subsystem (IMS) call with a second terminal;
    transmit a second location query request to a policy control function (PCF), wherein the second location query request is used to request to query location information of the second terminal:
    receive a second location query response message from the PCF, wherein the second location query response message includes the location information of the second terminal, wherein the location information of the second terminal includes a satellite identification of a satellite to which the second terminal is connected;

determine that the first terminal and the second terminal are connected to a same satellite based on location information of the first terminal and the location information of the second terminal, wherein the satellite that the first terminal and the second terminal are connected hosts a first user plane function (UPF), and wherein the location information of the first terminal includes a satellite identification of a satellite to which the first terminal is connected; and transmit an indication message to the PCF, wherein the indication message is used to indicate that a condition for the first terminal and the second terminal to perform the IMS call via the satellite is met.

10. The apparatus according to claim 9, wherein the processor is further configured to execute the computer program to:

transmit a message that triggers an establishment of a quality of service flow (QoS Flow) for the second terminal to the PCF, wherein the message that triggers the establishment of the QoS Flow for the second terminal includes the indication message.

11. The apparatus according to claim 9, wherein the indication message includes identification information of the first terminal and identification information of the second terminal.

12. The apparatus according to claim 9, wherein the first session invitation request includes the location information of the first terminal.

13. The apparatus according to claim 9, wherein the first session invitation request includes the location information of the first terminal, the processor is further configured to execute the computer program to transmit a second session invitation request to the second terminal, wherein the second session invitation request includes a location information request message, wherein the location information request message is used to instruct the second terminal to provide the location information of the second terminal;

receive a response message from the second terminal, wherein the response message includes the location information of the second terminal.

14. The apparatus according to claim 9, wherein the processor is further configured to execute the computer program to:

in a case where the first session invitation request does not include the location information of the first terminal, transmit a location query request to the PCF, wherein the location query request is used to request to query at least one of the location information of the first terminal, or the location information of the second terminal;

receive a location query response message from the PCF, wherein the location query response message includes the at least one of the location information of the first terminal, or the location information of the second terminal.

15. A non-transitory computer-readable storage medium storing with computer execution instructions, wherein when the computer execution instructions are executed by a processor, the processor executes the execution instructions to implement the method according to claim 1.

* * * * *